(12) United States Patent
Park et al.

(10) Patent No.: US 12,022,431 B2
(45) Date of Patent: Jun. 25, 2024

(54) WIRELESS CONNECTION STATE

(71) Applicant: Ofinno, LLC, Reston, VA (US)

(72) Inventors: Kyungmin Park, Vienna, VA (US); Esmael Hejazi Dinan, McLean, VA (US); Jinsook Ryu, Oakton, VA (US); Hua Zhou, Herndon, VA (US); Ali Cagatay Cirik, Herndon, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 413 days.

(21) Appl. No.: 17/470,712

(22) Filed: Sep. 9, 2021

(65) Prior Publication Data

US 2021/0410107 A1 Dec. 30, 2021

Related U.S. Application Data

(63) Continuation of application No. PCT/US2020/022453, filed on Mar. 12, 2020.

(60) Provisional application No. 62/821,702, filed on Mar. 21, 2019, provisional application No. 62/817,435, filed on Mar. 12, 2019.

(51) Int. Cl.
| | |
|---|---|
| *H04W 76/10* | (2018.01) |
| *H04L 5/00* | (2006.01) |
| *H04W 68/02* | (2009.01) |
| *H04W 76/28* | (2018.01) |

(52) U.S. Cl.
CPC ........... *H04W 68/02* (2013.01); *H04L 5/0048* (2013.01); *H04W 76/10* (2018.02); *H04W 76/28* (2018.02)

(58) Field of Classification Search
CPC ..... H04W 68/02; H04W 76/10; H04W 76/28; H04W 8/183; H04W 60/005; H04W 76/12; H04W 76/22; H04W 76/32; H04W 68/12; H04W 76/27; H04W 76/16; H04W 8/14; H04L 5/0048; H04L 5/0053
See application file for complete search history.

(56) References Cited

U.S. PATENT DOCUMENTS

| | | | |
|---|---|---|---|
| 8,971,961 | B2 | 3/2015 | Bishop et al. |
| 9,232,556 | B2 | 1/2016 | Su |
| 9,407,308 | B1 | 8/2016 | Su et al. |
| 9,769,867 | B2 | 9/2017 | Ramkumar et al. |

(Continued)

FOREIGN PATENT DOCUMENTS

| | | |
|---|---|---|
| CN | 105144830 A | 12/2015 |
| CN | 105659688 A | 6/2016 |

(Continued)

OTHER PUBLICATIONS

Huawei, Discussion on dual registration and issues in LTE, Aug. 20-24, 2018, 3GPP TSG-RAN WG2 Meeting #103, R2-1812618, Gothenburg, Sweden) (Year: 2018).*

(Continued)

*Primary Examiner* — Said M Elnoubi
(74) *Attorney, Agent, or Firm* — Matthew Fernandez; Kavon Nasabzadeh; Philip R. Smith

(57) ABSTRACT

A wireless device receives, from a base station, a radio resource control (RRC) message for an RRC connection with a first public land mobile network (PLMN). The wireless device transmits, to a second PLMN, a message indicating a state of the RRC connection of the wireless device with the first PLMN.

20 Claims, 36 Drawing Sheets

(56) References Cited

U.S. PATENT DOCUMENTS

| | | |
|---|---|---|
| 9,883,510 B2 | 1/2018 | Su |
| 9,985,771 B2 | 5/2018 | Olufunmilola et al. |
| 10,021,705 B2 | 7/2018 | Franz et al. |
| 10,111,119 B2 | 10/2018 | Dev et al. |
| 10,342,055 B2 | 7/2019 | Bergström et al. |
| 2009/0042576 A1 | 2/2009 | Mukherjee et al. |
| 2014/0362824 A1 | 12/2014 | Rousu et al. |
| 2015/0011236 A1 | 1/2015 | Kazmi et al. |
| 2015/0139015 A1 | 5/2015 | Kadous et al. |
| 2015/0257199 A1 | 9/2015 | Su |
| 2015/0312717 A1 | 10/2015 | Shih et al. |
| 2016/0135231 A1* | 5/2016 | Lee ............. H04W 52/0219 370/329 |
| 2016/0227547 A1 | 8/2016 | Su |
| 2016/0302114 A1 | 10/2016 | Jain et al. |
| 2017/0127305 A1 | 5/2017 | Dev et al. |
| 2017/0230932 A1 | 8/2017 | Challa et al. |
| 2018/0070327 A1 | 3/2018 | Qureshi et al. |
| 2018/0184452 A1 | 6/2018 | Bitra et al. |
| 2018/0220487 A1* | 8/2018 | Wu ................. H04W 76/27 |
| 2018/0249349 A1 | 8/2018 | Hu et al. |
| 2019/0313383 A1 | 10/2019 | Xiong et al. |

FOREIGN PATENT DOCUMENTS

| | | |
|---|---|---|
| CN | 106464611 A | 2/2017 |
| CN | 106686571 A | 5/2017 |
| CN | 108924817 A | 11/2018 |
| EP | 3364675 A1 | 8/2018 |
| EP | 3442155 B1 | 10/2019 |
| WO | 03090013 A2 | 10/2003 |
| WO | 2016118331 A1 | 7/2016 |
| WO | 2018005419 A1 | 1/2018 |
| WO | 2018170516 A2 | 9/2018 |
| WO | 2018232294 A1 | 12/2018 |
| WO | 2019/027296 A1 | 2/2019 |
| WO | 2019070503 A1 | 4/2019 |

OTHER PUBLICATIONS

Chinese Office Action, dated Sep. 15, 2023, in CN Patent Application No. 202080020491X.

R2-1808961; 3GPP TSG-RAN WG2 #102; Busan, Korea, May 21-25, 2018; CR-Form-v11.2; Change Request; 38.331 CR CRNum rev—Current version: 15.1.0; Title: Connection control TP.

3GPP TS 23.401 V15.6.0 (Dec. 2018); Technical Specification; 3rd Generation Partnership Project; Technical Specification Group Services and System Aspects; General Packet Radio Service (GPRS) enhancements for Evolved Universal Terrestrial Radio Access Network (E-UTRAN) access (Release 15).

3GPP TS 23.501 V15.4.0 (Dec. 2018); Technical Specification; 3rd Generation Partnership Project; Technical Specification Group Services and System Aspects; System Architecture for the 5G System; Stage 2; (Release 15).

3GPP TS 23.502 V15.4.1 (Jan. 2019); Technical Specification; 3rd Generation Partnership Project; Technical Specification Group Services and System Aspects; Procedures for the 5G System; Stage 2; (Release 15).

3GPP TS 24.301 V15.5.0 (Dec. 2018); Technical Specification; 3rd Generation Partnership Project; Technical Specification Group Core Network and Terminals; Non-Access-Stratum (NAS) protocol for Evolved Packet System (EPS); Stage 3 (Release 15).

3GPP TS 24.501 V15.2.1 (Jan. 2019); Technical Specification; 3rd Generation Partnership Project; Technical Specification Group Core Network and Terminals; Non-Access-Stratum (NAS) protocol for 5G System (5GS); Stage 3; (Release 15).

3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).

R1-1900072; 3GPP TSG RAN WG1 Ad-Hoc Meeting 1901; Taipei, Jan. 21-25, 2019; Source:ZTE; Title: On scheduling/HARQ processing timeline for URLLC; Agenda Item:7.2.6.1.4; Document for: Discussion and Decision.

R1-1901331; 3GPP TSG RAN WG1 Ad-Hoc Meeting 1901; Taipei, Jan. 21-25, 2019; Source:CATT; Title: Scheduling enhancements for URLLC; Agenda Item:7.2.6.1.4.

R2-115375; 3GPP TSG-RAN WG2 #75bisTdoc R2-115375; Zhuhai, China Oct. 10-14, 2011; Agenda Item:04.1; Source: Ericsson ; Title:Dual-SIM Dual-Standby UEs and their impact on the RAN.

S2-144682; SA WG2 Meeting #106; Nov. 17-21, 2014, San Francisco, California, USA(revision of S2-143930); Change Request; 23.401 CR 2731 REV 7 Current Version 13.0.0; Title: Paging policy differentiation for IMS voice; Source to WG: Alcatel-Lucent, Alcatel-Lucent Shanghai Bell, Verizon, Cisco, Nokia Networks; Source to TSG: SA WG2; Work item code: voE_UTRAN_PPD; Date: Nov. 4, 2014.

S2-164763; SA WG2 Meeting #116-BIS; Aug. 29-Sep. 2, 2016, Sanya, P. R. China(revision of S2-163492); Source:Intel, Huawei; Title:IMS paging type differentiation for PS domain; Document for:Discussion / Approval; Agenda Item: 6.28; Work Item / Release: TEI14 / Rel-14.

S2-174243; SA WG2 Meeting #122; Jun. 26-30, 2017, San Jose Del Cabo , Mexico(was S2-17xxxx); Source: Qualcomm Incorporated, Oppo, China Unicom, Vivo; Title:Avoidance of paging collisions to minimize outage of services; Document for:Discussion; Agenda Item: TEI15; Work Item / Release: Rel-15.

S2-1812346; SA WG2 Meeting #129-BIS; Nov. 26-30, 2018, West Palm Beach, FL, US(revision of S2-181xxxx); CR-Form-v11.1; Change Request; 23.401 CR 3484 rev—Current version: 16.0.0; Title: Paging cause introduction; Source to WG: Intel, Verizon, AT&T, Sony, MediaTek Inc.; Source to TSG: SA WG2; Work item code: TEI16; Date: Nov. 20, 2018; Category B: Release: Rel-16.

S2-1812349; SA WG2 Meeting #129-BIS; Nov. 26-30, 2018, West Palm Beach, FL, US(revision of S2-181xxxx); CR-Form-v11.1; Change Request; 23.501 CR 0729 rev—Current version: 15.3.0; Title: Paging cause introduction; Source to WG: Intel, Verizon, AT&T, Sony, , MediaTek Inc.; Source to TSG: SA WG2; Work item code: TEI16; Date: Nov. 20, 2018; Category B: Release: Rel-16.

S2-1812350; SA WG2 Meeting #129-BIS; Nov. 26-30, 2018, West Palm Beach, FL, US(revision of S2-181xxxx); CR-Form-v11.1; Change Request; 23.502 CR 0858 rev—Current version: 15.3.0; Title: Paging cause introduction; Source to WG: Intel, Verizon, AT&T, Sony, MediaTek Inc.; Source to TSG: SA WG2; Work item code: TEI16; Date: Nov. 20, 2018; Category B: Release: Rel-16.

S2-1813349; SA WG2 Meeting #129bis; Nov. 26-30, 2018, West Palm Beach, USA(was S2-1813346); Source: Intel, Verizon, AT&T, Sony, Samsung, Charter Communications, China Mobile, Lenovo, Motorola Mobility, NEC, vivo, OPPO, KPN, ETRI, InterDigital, Convida Wireless; Title:New SID: Study on system enablers for multi-SIM devices; Document for:Approval; Agenda Item:7.1.

S2-181868; SA WG2 Meeting #126; Feb. 26-Mar. 2, 2018, Montreal, Canada(was S2-18xxxx); Source: Qualcomm Incorporated, Intel; Title:Paging cause to the UE; Document for:Discussion/ Approval; Agenda Item: 6.5.1; Work Item / Release: 5GS_Ph1/Rel. 15.

S2-1900688; SA WG2 Meeting #130; Jan. 21-25, 2019, Kochi, India(revision of S2-1900332); Source:Intel; Title: Revised SID: Study on system enablers for multi-SIM devices; Document for:Approval; Agenda Item: 7.1; Work Item / Release: FS_MUSIM / Rel-16.

R2-1812618; (Revision of R2-1808410); 3GPP TSG-RAN WG2 Meeting #103; Gothenburg, Sweden, Aug. 20-24, 2018; Agenda Item: 9.22; Source: Huawei, HiSilicon, CTC; Title: Discussion on dual registration and issues in LTE; Document for: Discussion and decision.

R2-1901885; 3GPP TSG-RAN WG2 Meeting #105; Athens, Greece, Feb. 25-Mar. 1, 2019; Agenda Item: 11.11.3; Source: Apple; Title: UE assisted RRC state transition; Document for: Discussion, Decision.

(56) References Cited

OTHER PUBLICATIONS

RP-190248; 3GPP TSG RAN Meeting #83; Shenzhen, China, Mar. 18-21, 2019; Title: Motivation for SI on multi-SIM devices in RAN; Source: China Telecom, vivo; Agenda item: 9.1.2; Document for: Discussion and Decision.
International Search Report and Written Opinion for International Application No. PCT/US2020/022453, dated Oct. 6, 2020.
Notice of Allowance, mailed Apr. 3, 2024, in CN Patent Application No. 202080020491X.
RP-170376; 3GPP TSG RAN meeting #75; Dubrovnik, Croatia, Mar. 6-9, 2017; Status Report to TSG.

\* cited by examiner

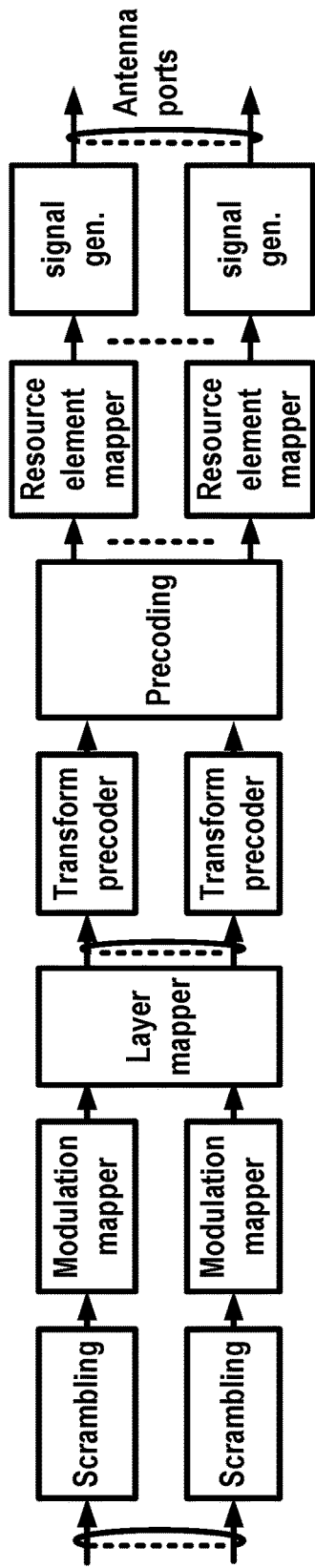
FIG. 4A
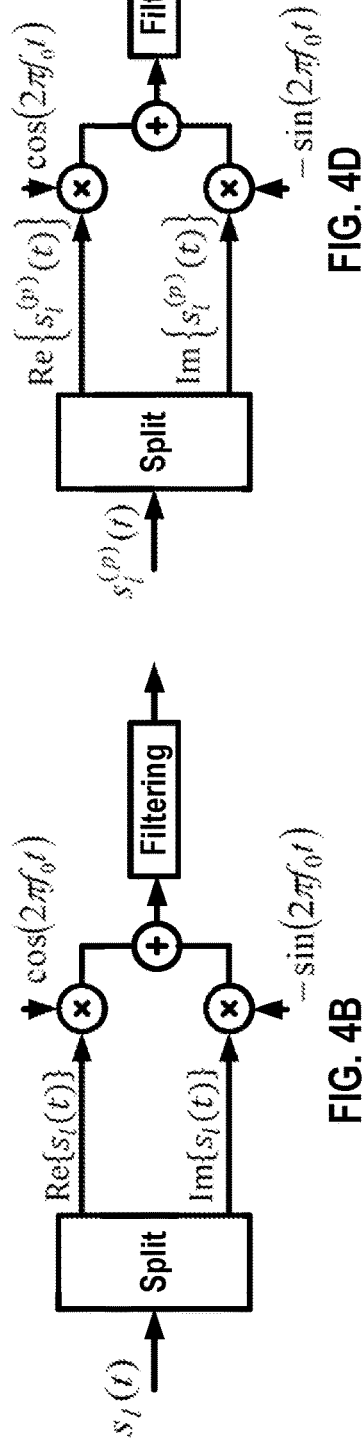
FIG. 4B
FIG. 4D
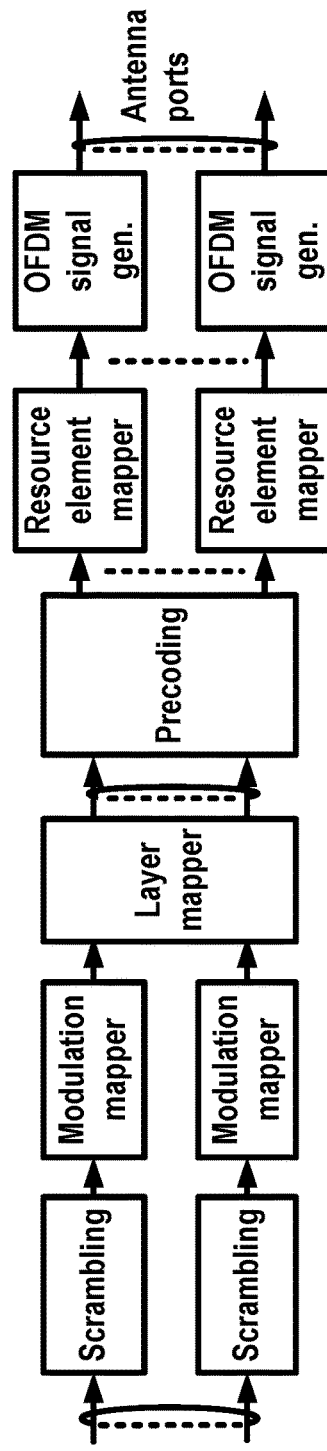
FIG. 4C
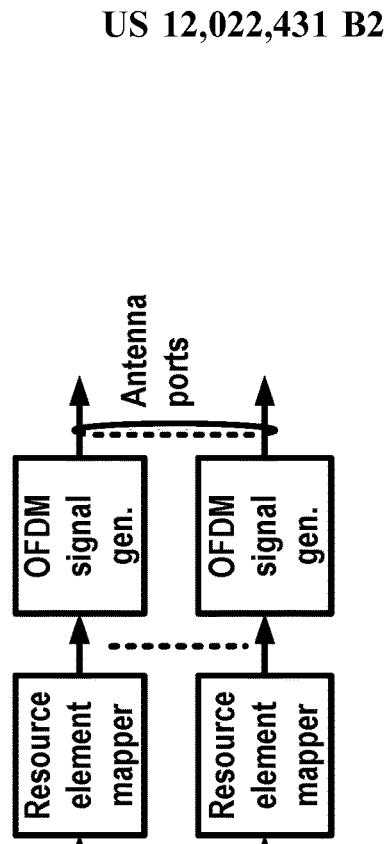

Receive, by a wireless device from a base station, a radio resource control (RRC) message for an RRC connection with a first public land mobile network (PLMN)
3610

Transmit, to a second PLMN, a message indicating a state of the RRC connection of the wireless device with the first PLMN
3620

FIG. 36

Receive, by a wireless device from a base station, a radio resource control (RRC) message for an RRC connection with a first public land mobile network (PLMN)
3710

Transmit, to a second PLMN, a message indicating a state of the RRC connection of the wireless device with the first PLMN
3720

FIG. 37

WIRELESS CONNECTION STATE

CROSS-REFERENCE TO RELATED APPLICATIONS

This application is a continuation of International Application No. PCT/US2020/022453, filed Mar. 12, 2020, which claims the benefit of U.S. Provisional Application No. 62/817,435, filed Mar. 12, 2019, and U.S. Provisional Application No. 62/821,702, filed Mar. 21, 2019, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 36 is a flow diagram of an aspect of an example embodiment of the present disclosure.

FIG. 37 is a flow diagram of an aspect of an example embodiment of the present disclosure.

DETAILED DESCRIPTION OF EMBODIMENTS

Figure 1:
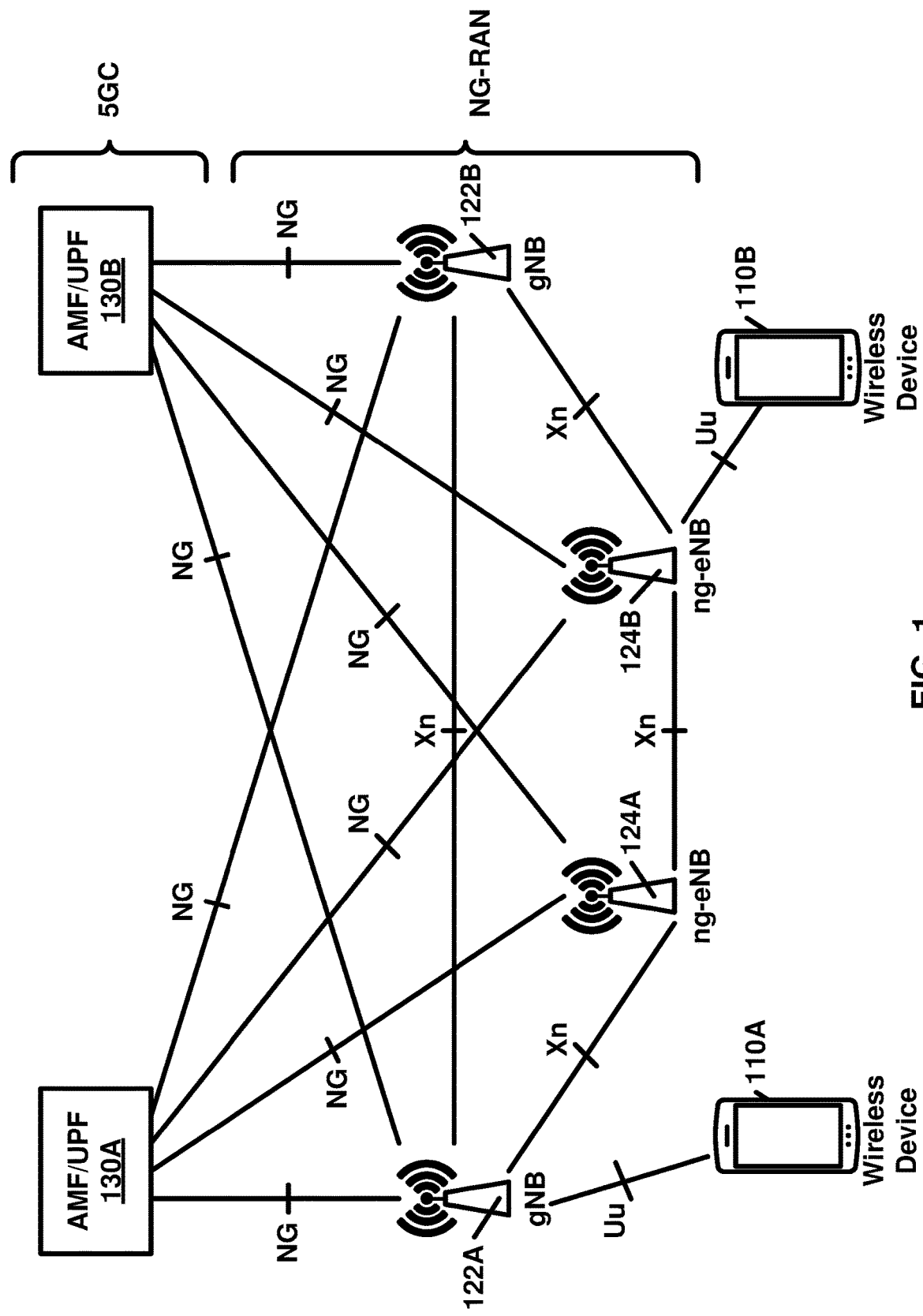
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multicarrier communication systems.

The following Acronyms are used throughout the present disclosure:

| | |
|---|---|
| 3GPP | 3rd Generation Partnership Project |
| 5GC | 5G Core Network |
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |

| | |
|---|---|
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |
| DCCH | Dedicated Control Channel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic Channel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel Identifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary Identifier |
| RB | Resource Blocks |
| RBG | Resource Block Groups |
| RI | Rank indicator |
| RLC | Radio Link Control |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TDD | Time Division Duplex |
| TDMA | Time Division Multiple Access |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between 3$^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
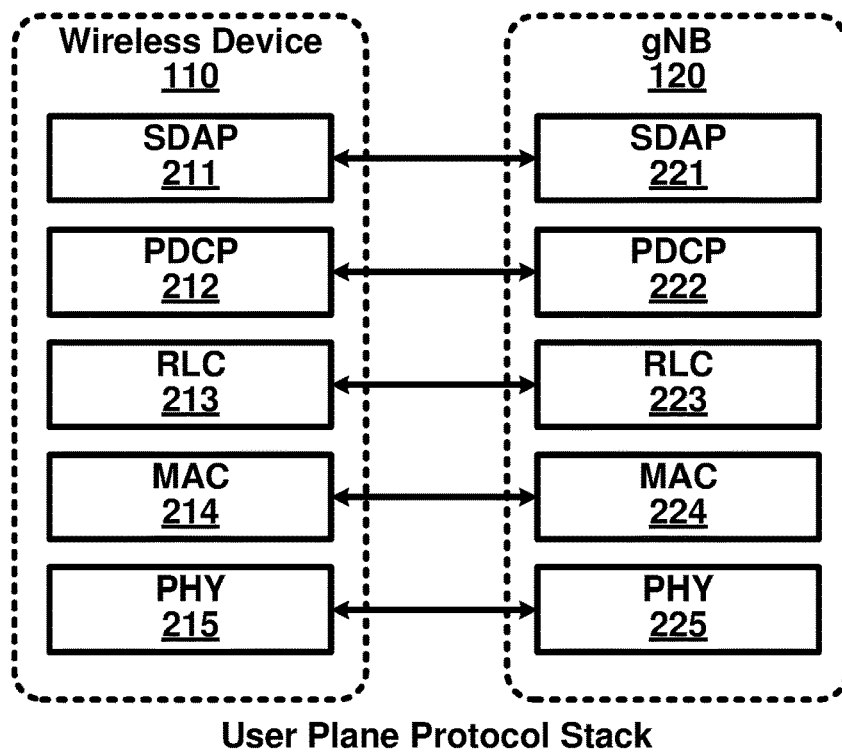
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
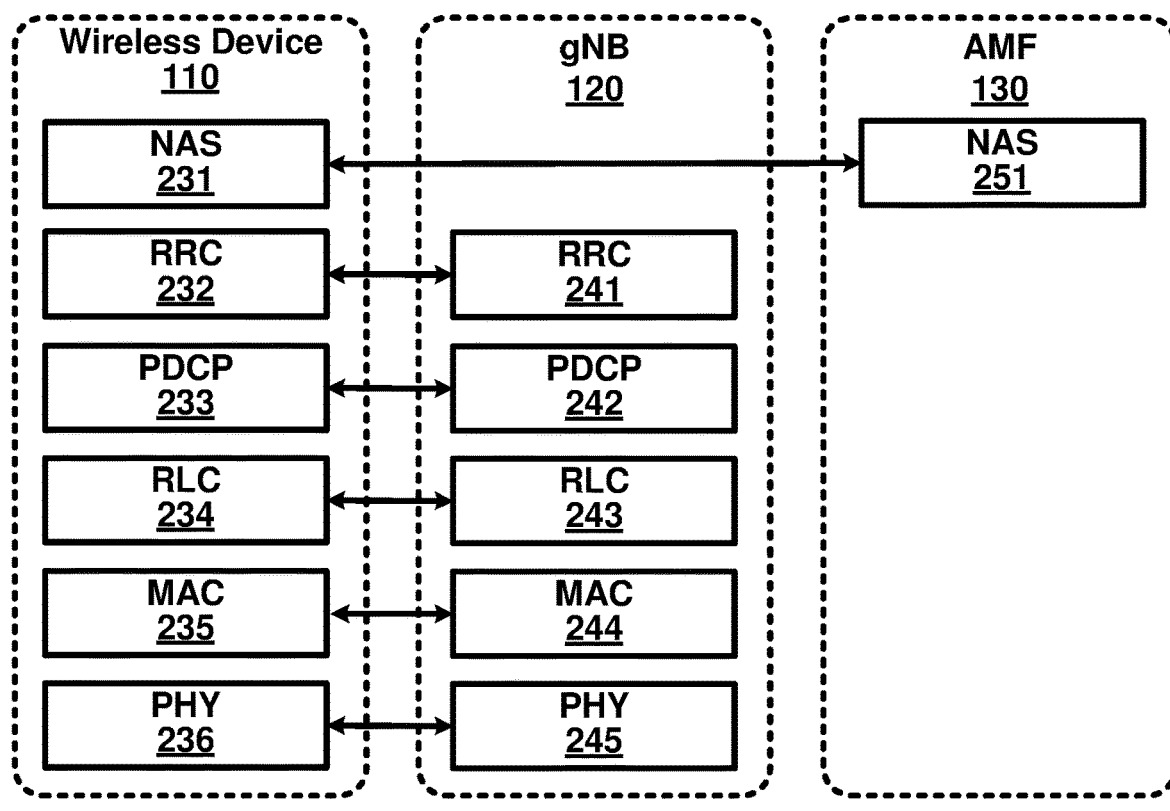
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
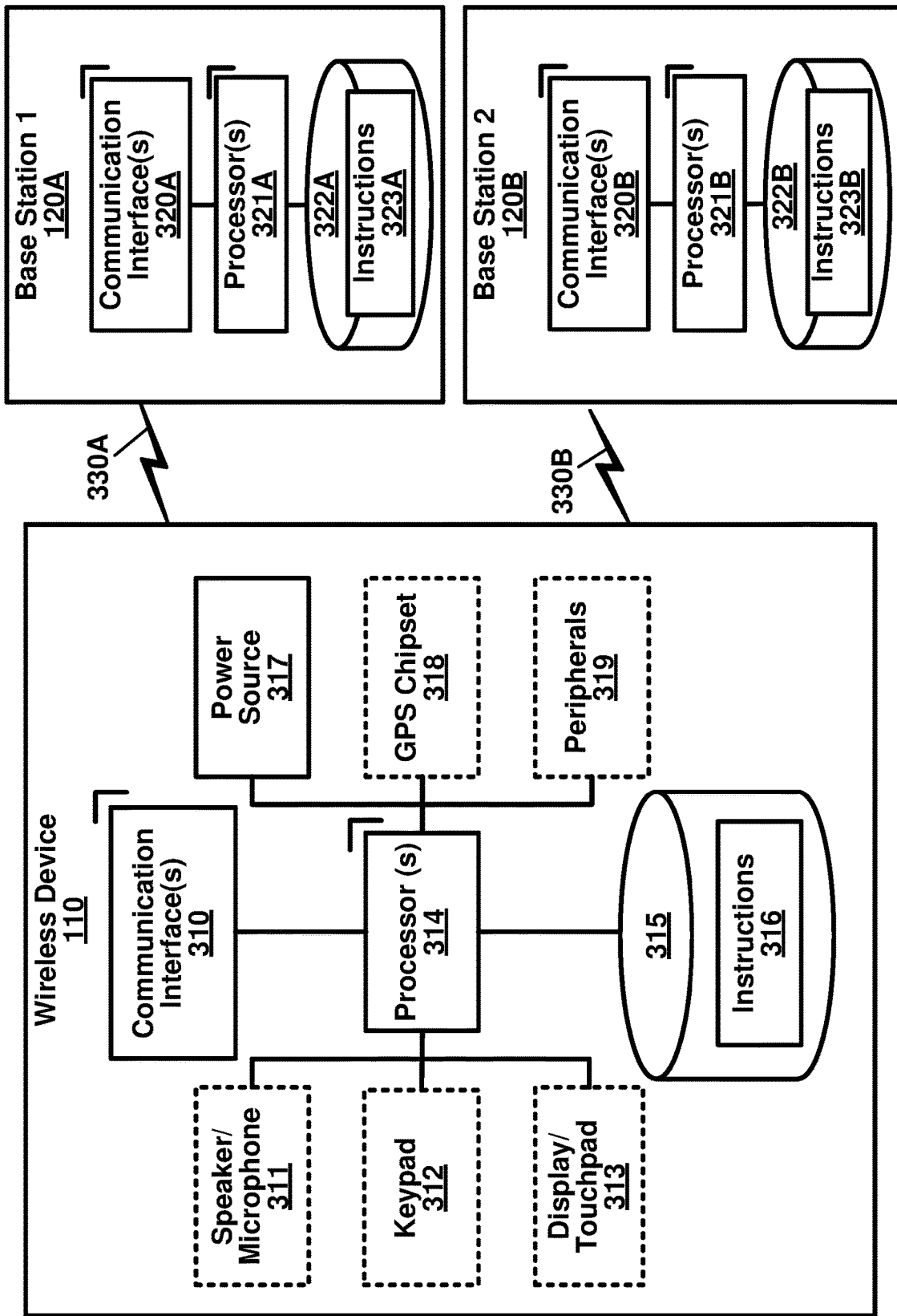
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., only static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
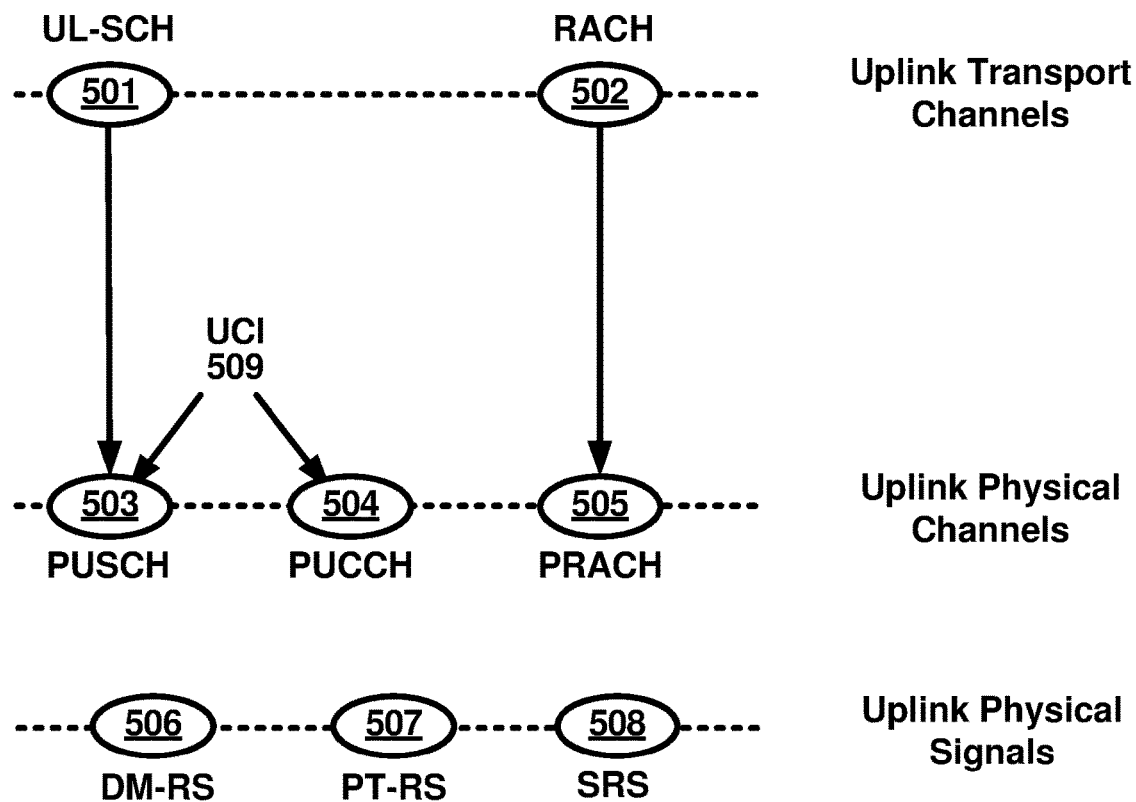
FIG. 5A is a diagram of an example uplink channel mapping and example uplink physical signals as per an aspect of an embodiment of the present disclosure.
Figure 5B:
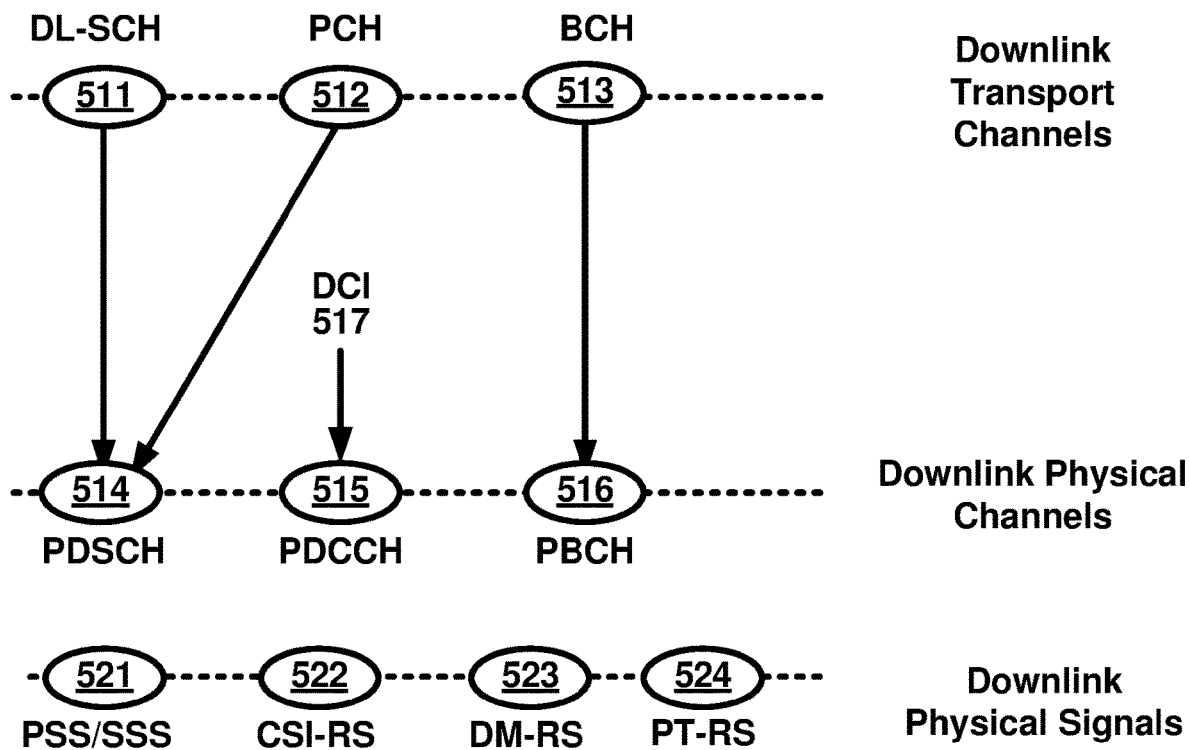
FIG. 5B is a diagram of an example downlink channel mapping and example downlink physical signals as per an aspect of an embodiment of the present disclosure.

IG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and Control Resource Set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
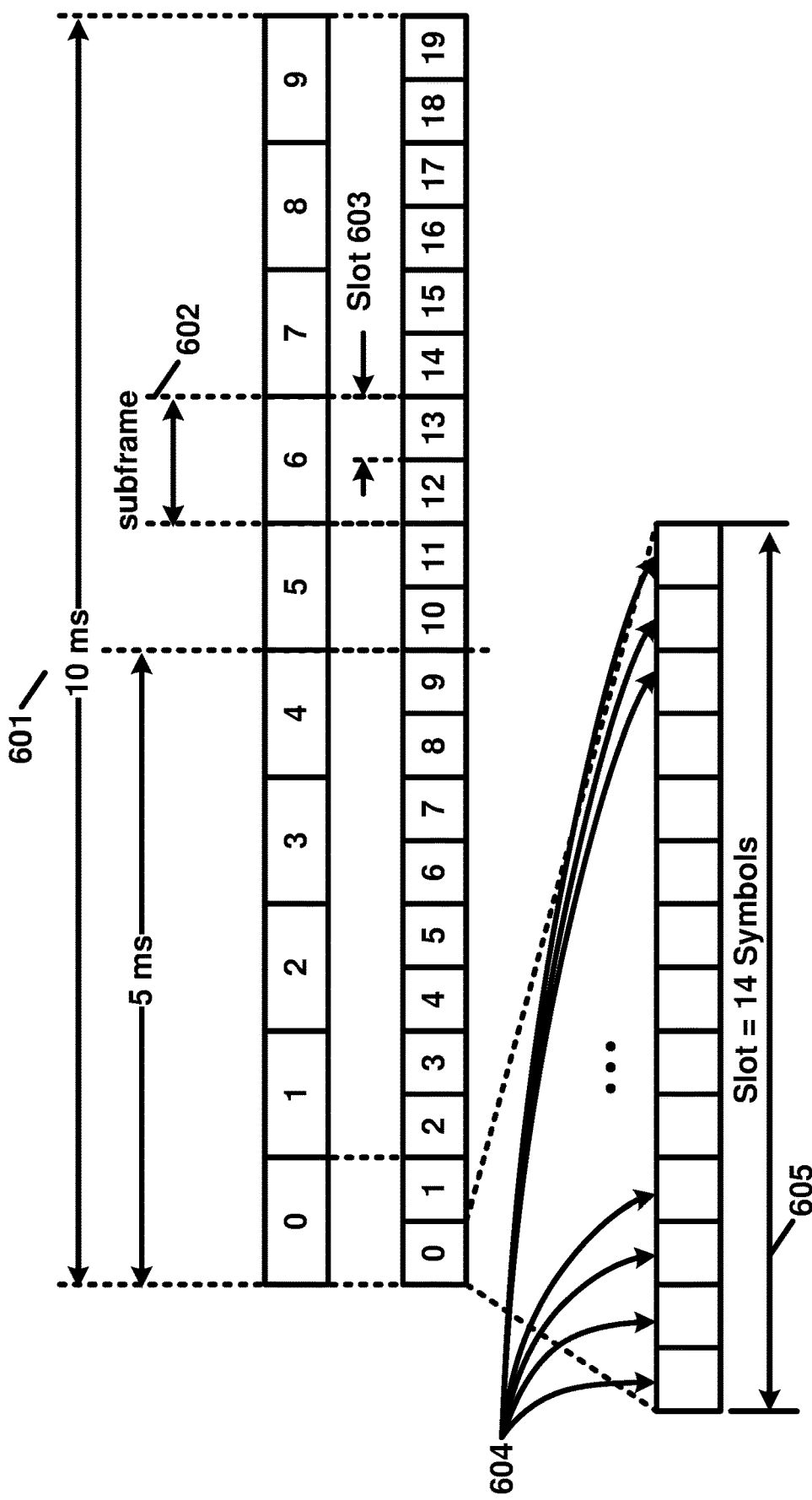
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
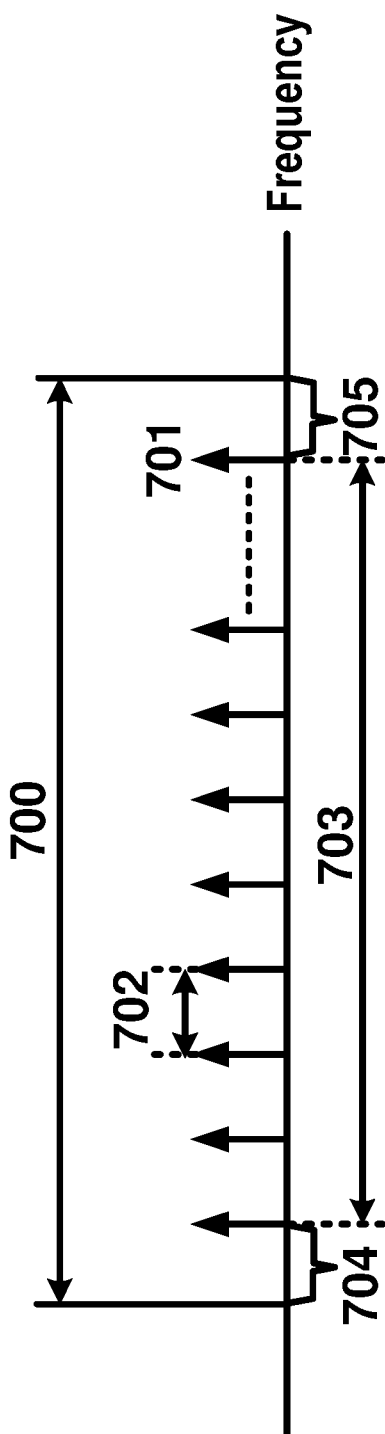
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
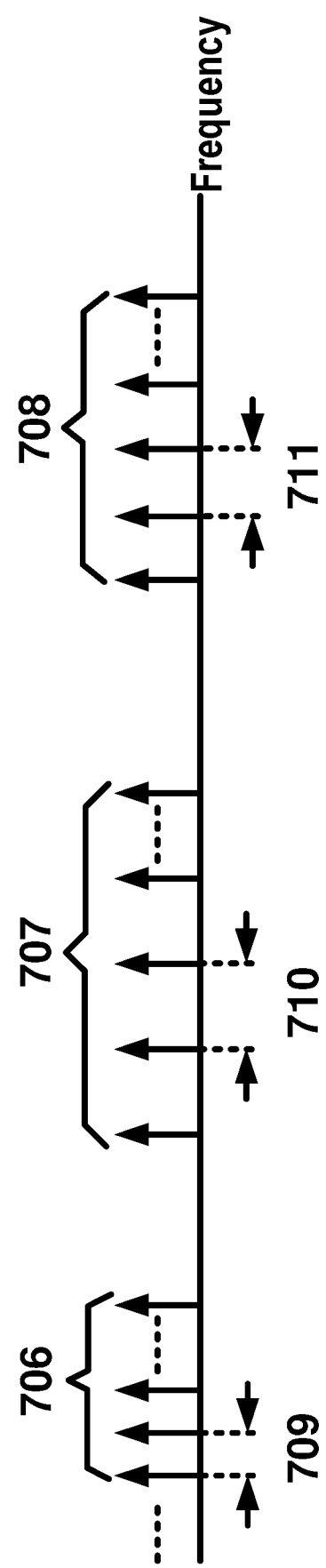

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
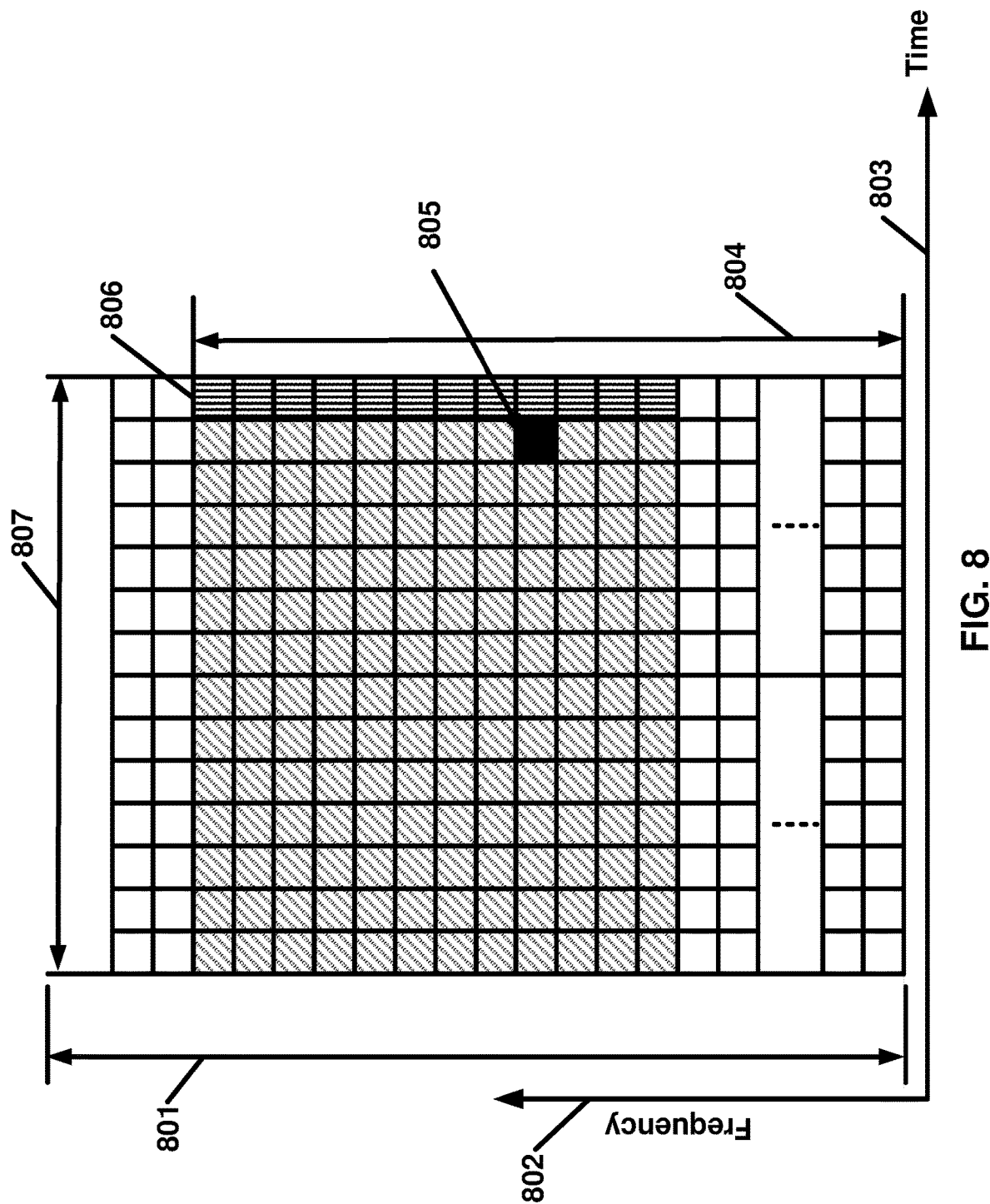
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier.

In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
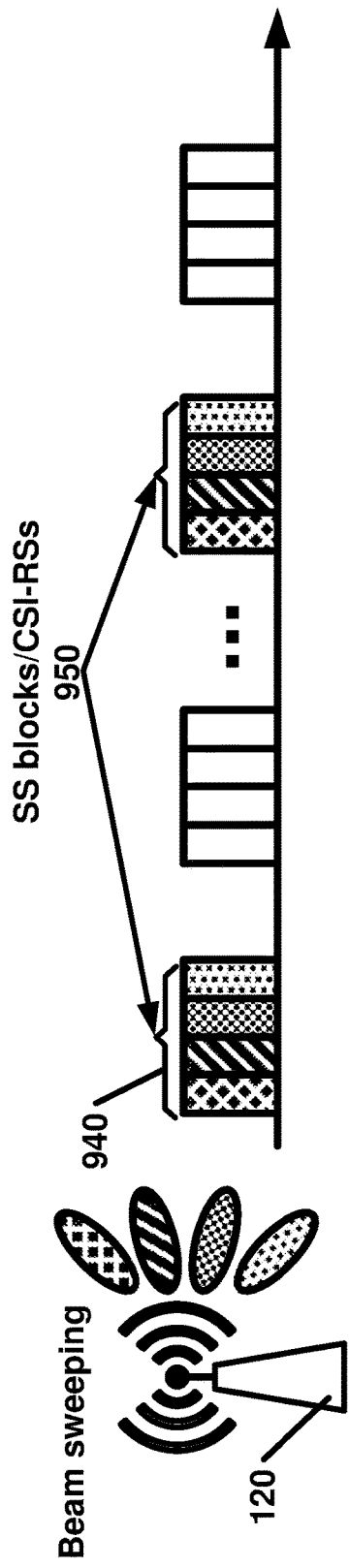
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
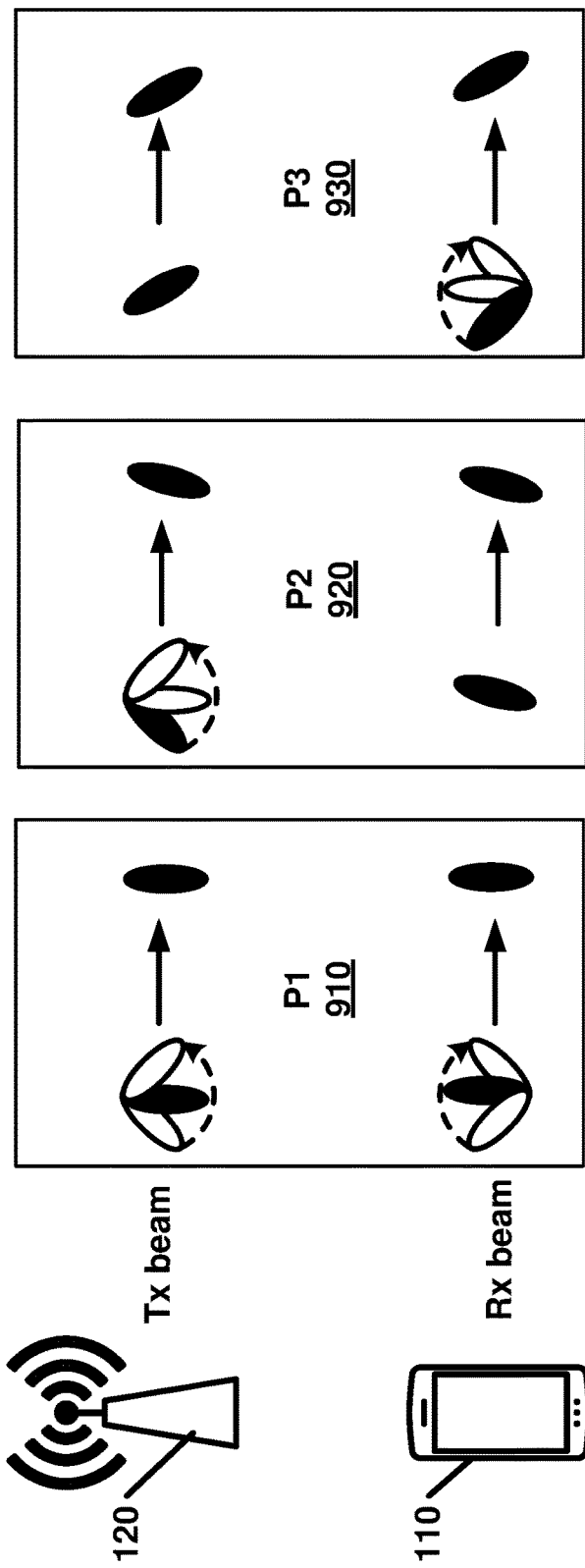
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
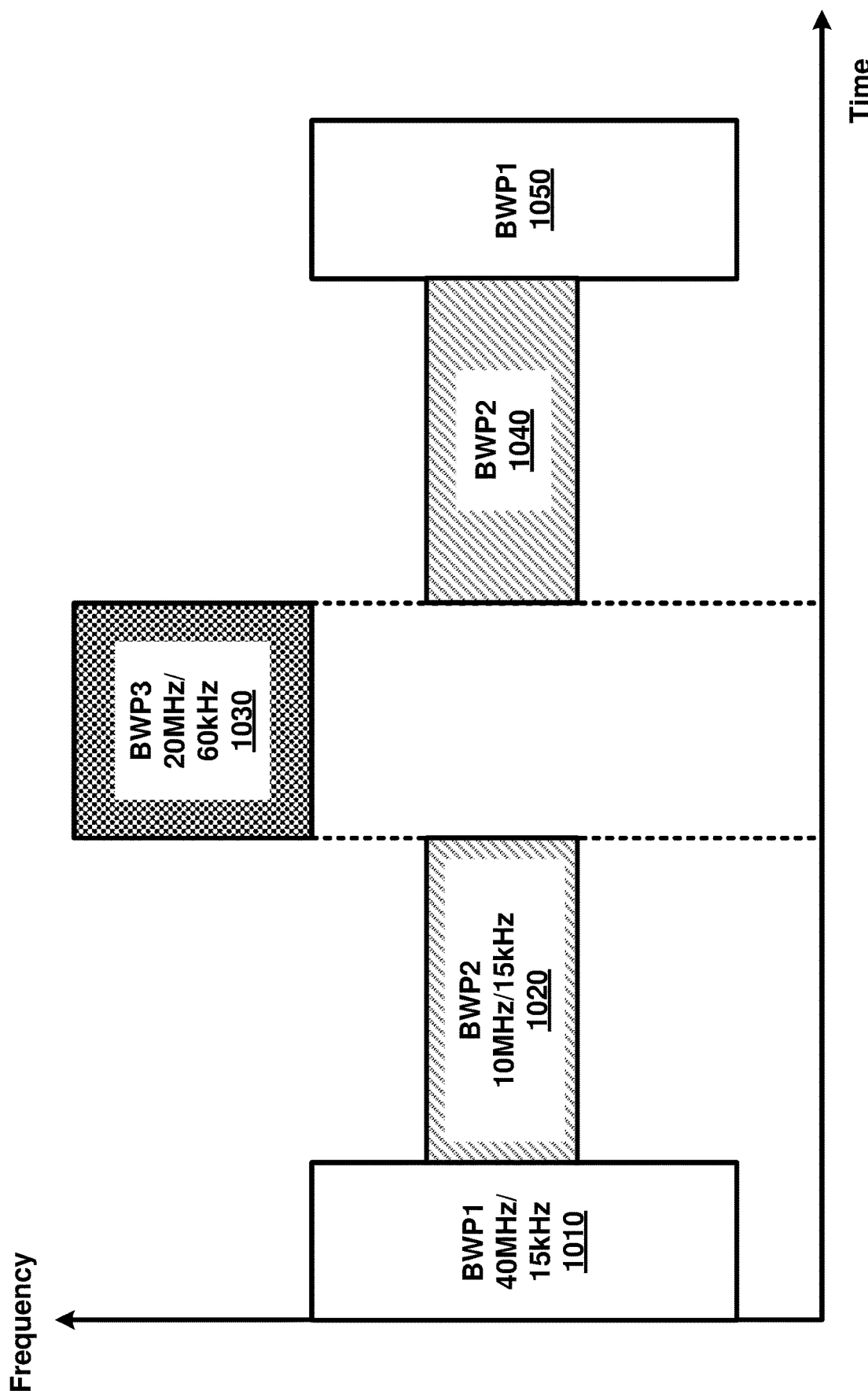
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
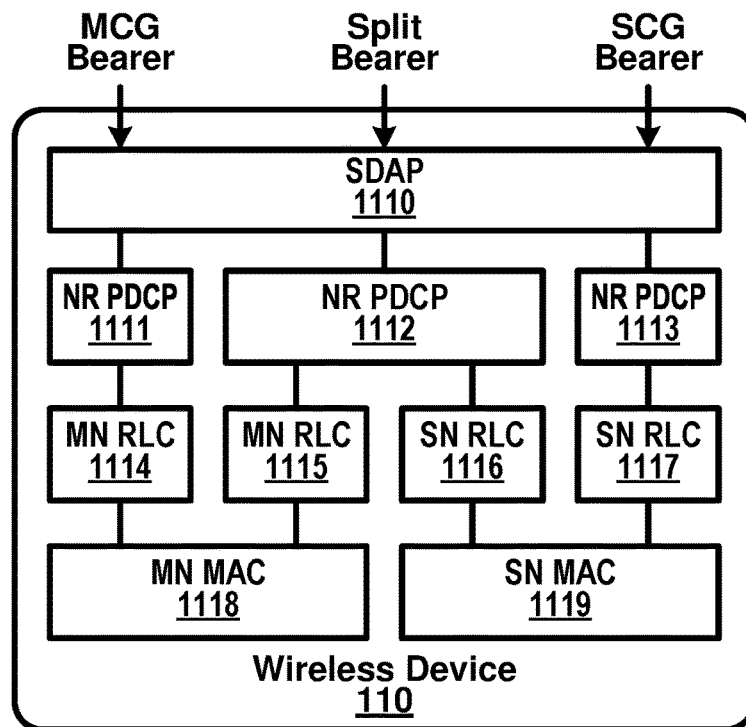
FIG. 11A, and FIG. 11B are diagrams of an example multi connectivity as per an aspect of an embodiment of the present disclosure.
Figure 11B:
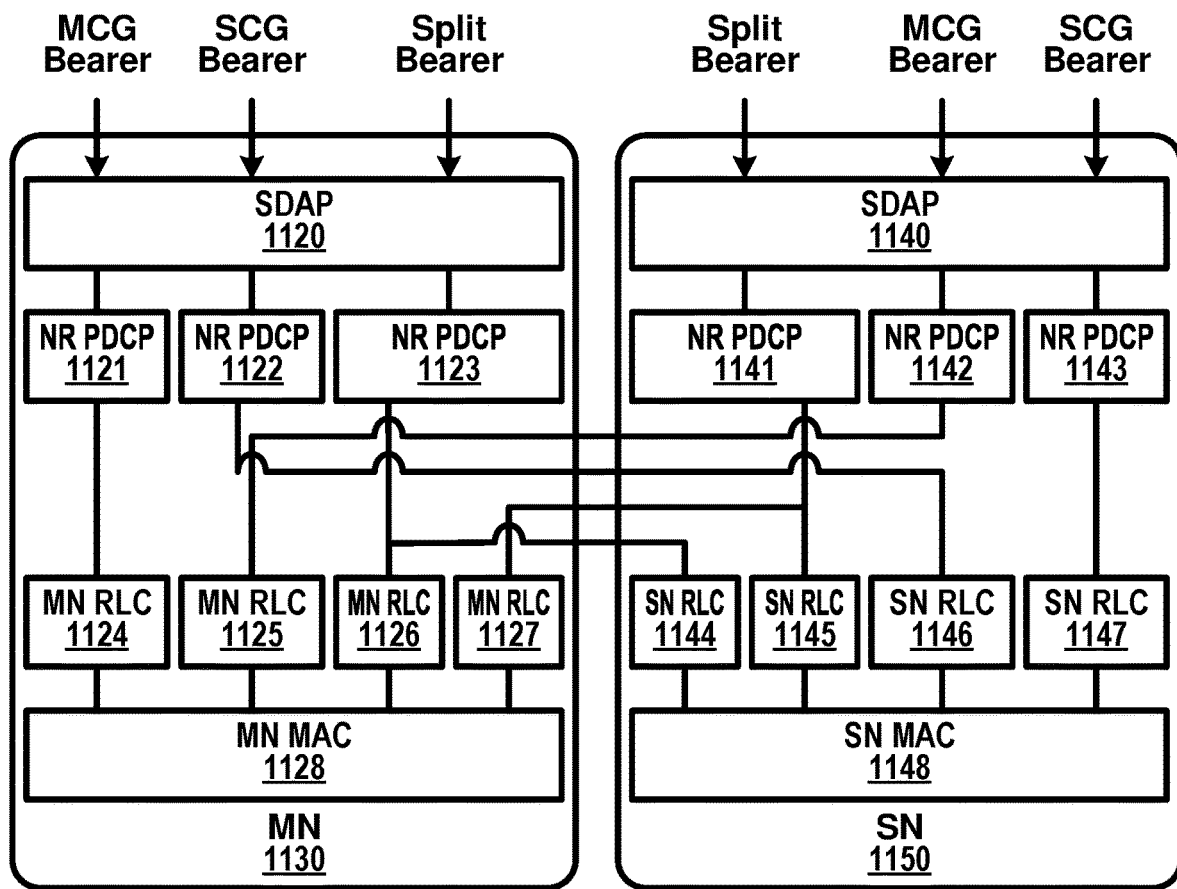

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g.

the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
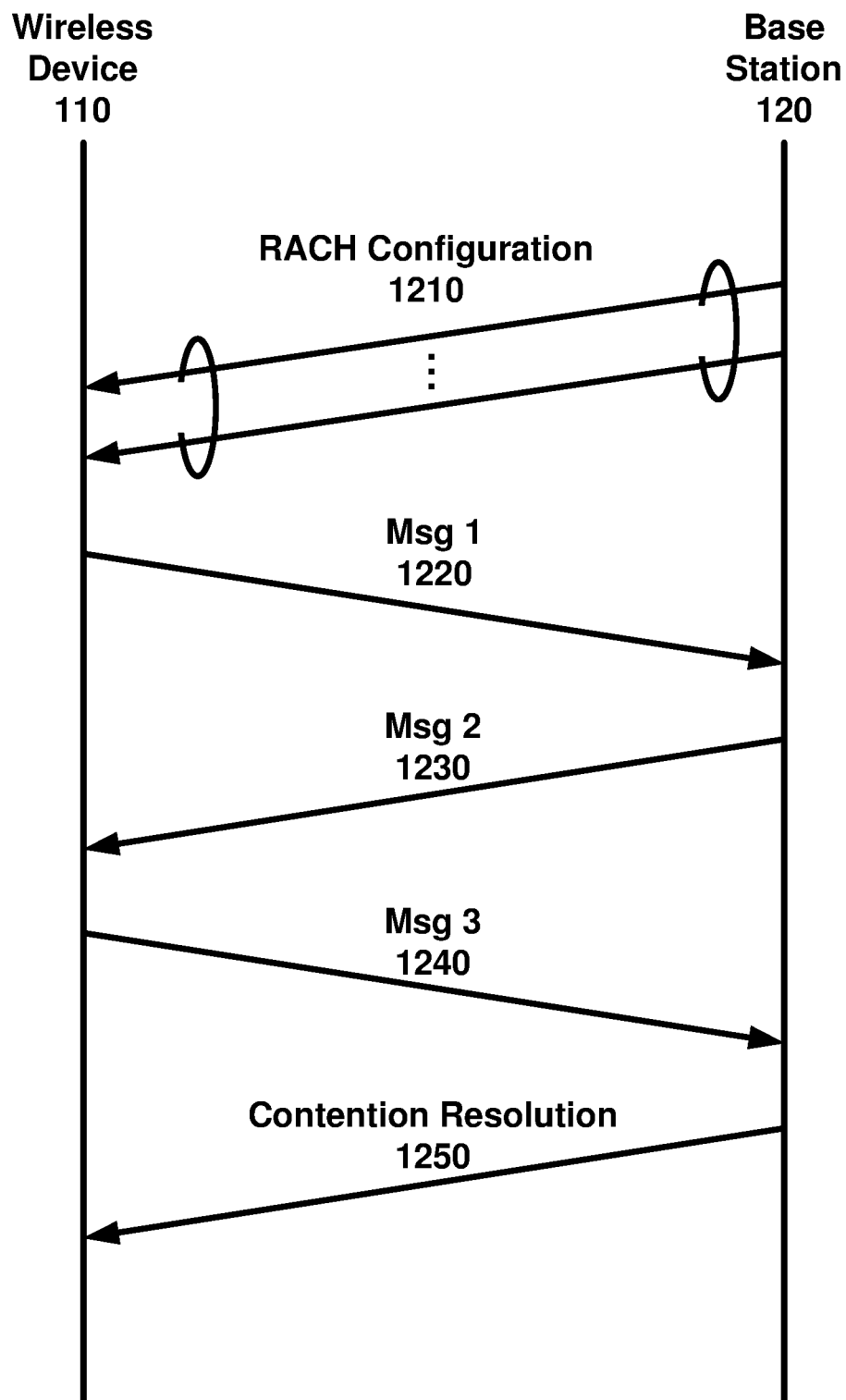
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises only a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
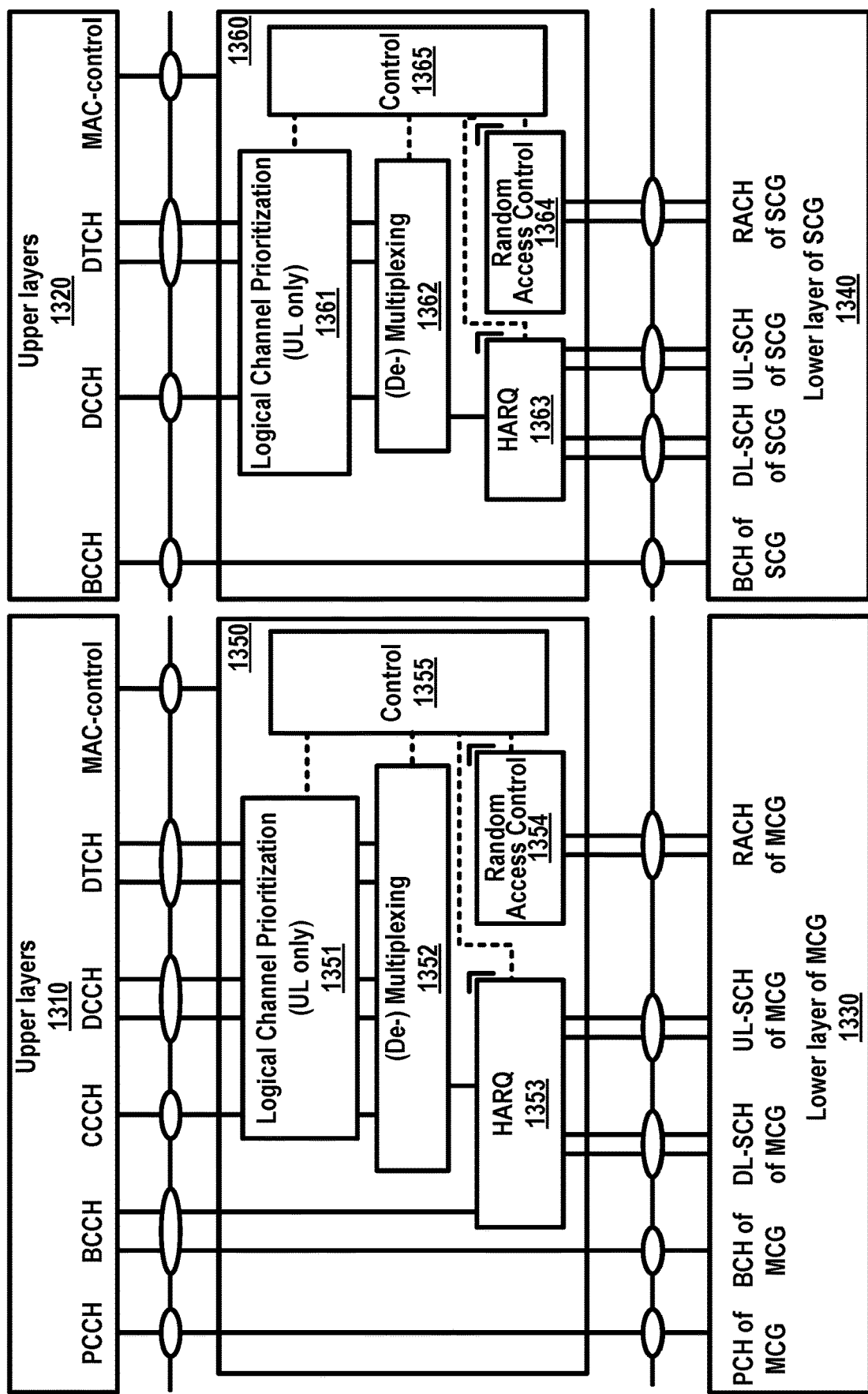
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
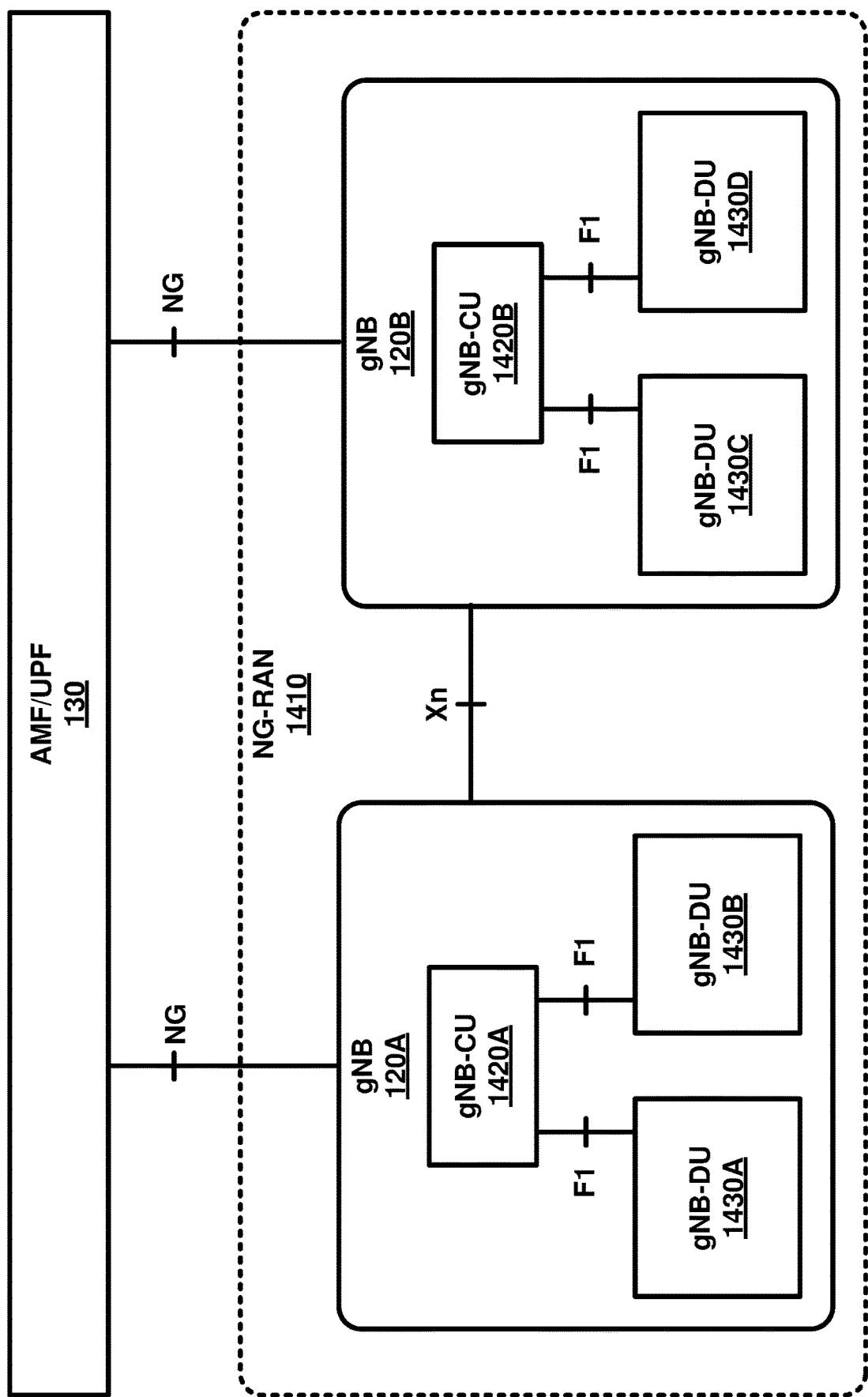
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
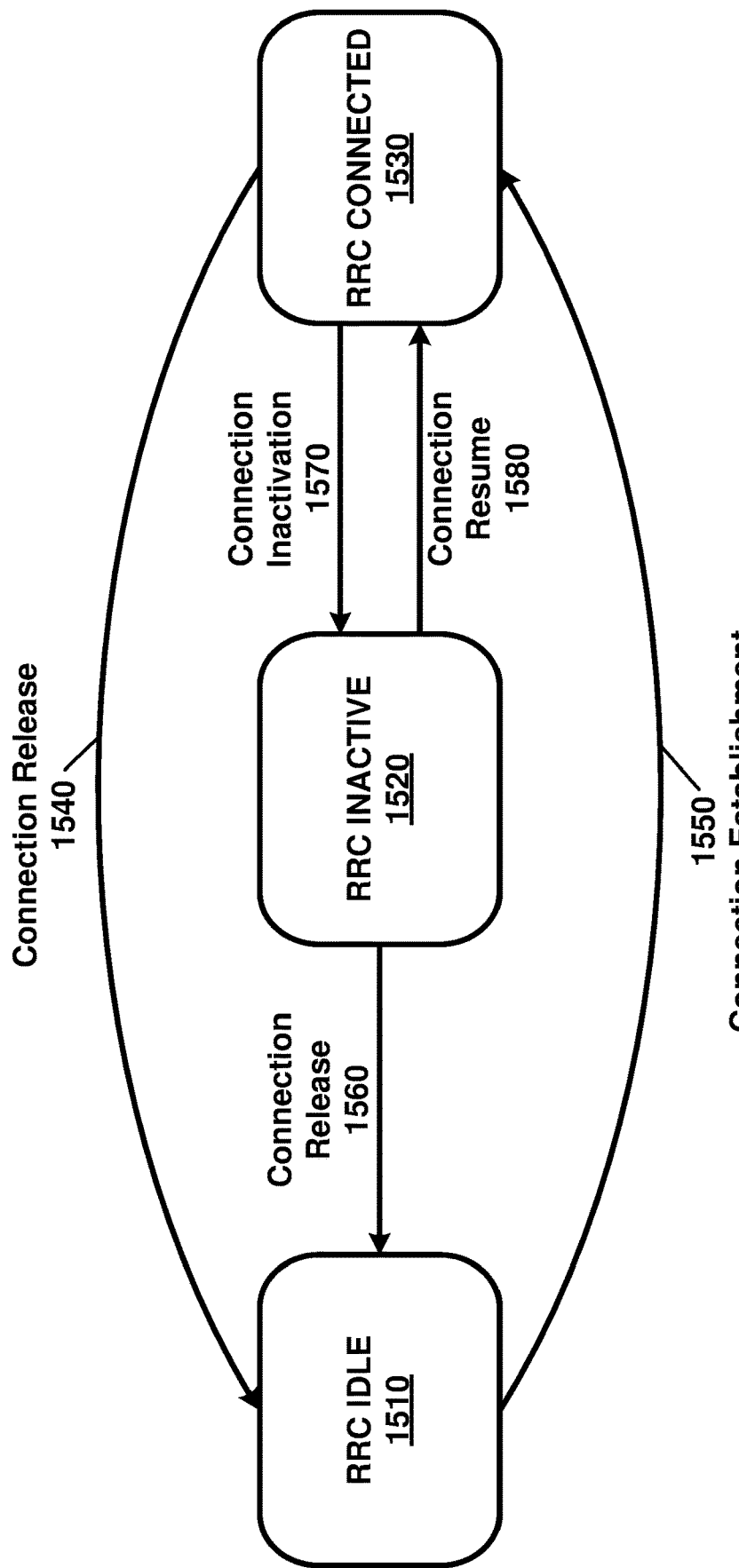
FIG. 15 is an example diagram of an aspect of an embodiment of the present disclosure.

FIG. 15 is an example diagram showing RRC state transitions of a wireless device. In an example, a wireless device may be in at least one RRC state among an RRC connected state (e.g. RRC_Connected 1530, RRC_Connected), an RRC idle state (e.g. RRC_Idle 1510, RRC_Idle), and/or an RRC inactive state (e.g. RRC_Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

In an implementation of existing technologies, a wireless device (e.g., configured with multiple subscriber identity modules (SIMs)) may be communicating with a first wireless system (e.g., first wireless network, first public land mobile network (PLMN), first access technology, etc.). If a second wireless system (e.g., second wireless network, second PLMN, second access technology, etc.) transmits a signal (e.g., paging indication), the wireless device may not receive the signal, and/or may receive but may not be able to respond to the signal (e.g., may not be able to initiate a connection establishment procedure with the second system). This may be due to the active communication with the first wireless system. For example, the wireless device capability may not allow the wireless device to communicate in parallel with both the first system and the second system. For example, some dual-SIM wireless devices may not be able to communicate in parallel with a first PLMN and a second PLMN. Transmitting a signal (e.g., a paging indication) to a wireless device when the wireless device may not receive the signal and/or may not be able to respond to the signal may decrease resource utilization efficiency and increase service latency.

Embodiments of the present disclosure may provide enhanced signaling mechanisms for wireless devices that support communications with multiple wireless systems. In an example embodiment, a wireless device may inform a second wireless system whether the wireless device is actively communicating with a first wireless system. The second wireless system takes into account the information when determining signal transmission to the wireless device. Example embodiments may increase resource utilization efficiency and decrease service latency.

In an example, some wireless devices may not be able to communicate with a first base station of a second wireless system, while the wireless device has an RRC connection or is registered with the first wireless system. For example, some dual-SIM wireless devices may not be able to communicate with a base station of a second PLMN when they are connected and/or registered with a first PLMN. For example, the coverage of the second PLMN may not be available. For example, communication with the second PLMN may require additional power consumption. Example embodiment implement a process to inform the second wireless system about the connection with the first wireless system via a wireless local area network (e.g. WLAN, non-3GPP access). The wireless device may inform, via an alternative access technology (e.g., non-3GPP network, WLAN, etc.), a wireless network (e.g., system, PLMN, access technology, etc.) that the wireless device is actively communicating with another wireless network, so that the wireless network transmits a signal (e.g., paging indication) to the wireless device based on the information. Example embodiments enable to inform the status of the connection of the wireless device with the first wireless system to the second wireless system via an alternative access technology (compared with the first/second wireless systems). Example embodiments may increase resource utilization efficiency and decrease service latency. Example embodiments enable to implement enhanced processes even if the second wireless system coverage is not available. Example embodiments may reduce battery power consumption in the wireless device, as transmission of a message via a wireless local area network requires less battery power consumption. Some wireless devices may not be able to communicate with the second wireless system, when the wireless device is in the RRC connected state. The wireless device in RRC connected state may be in active communication with a base station of the first wireless system. For example, the wireless device may not be able to communicate with the second wireless system while the wireless device is an RRC connection with the first wireless system, for example, due to hardware limitation, protocol layer limitation, etc. Example embodiments enable to use an alternative wireless access (such as WLAN, non-3GPP access) to inform the second wireless system about the RRC connection of the wireless device with the first wireless system. The second wireless system may be able to efficiently send a message based on the information of the RRC connection of the wireless device with the first wireless system (e.g., by sending a message when the wireless device is not in the RRC connected state at the first wireless system).

In an example wireless network, some wireless devices may not be able to communicate with the second wireless system, when the wireless device is in on-duration of a discontinuous reception (DRX) and/or a power saving mode, for example due to hardware limitation, protocol layer limitation, etc. Example embodiments enable to use an alternative wireless access (such as WLAN, non-3GPP access) to inform the second wireless system about the on-duration of the DRX and/or the power saving mode of the wireless device at the first wireless system. The second wireless system may be able to efficiently send a message at a timing that the wireless device is not in on-duration of the DRX and/or the power saving mode at the first wireless system.

In an example wireless network, some wireless devices may not be able to communicate with the second wireless system, when a serving cell and/or a bandwidth part of the first wireless system is activated, for example due to hardware limitation, protocol layer limitation, etc. Example embodiments enable to use an alternative wireless access (such as WLAN, non-3GPP access) to inform the second wireless system about the activated state of the serving cell and/or the bandwidth part of the serving cell at the first wireless system. The second wireless system may be able to efficiently send a message at a timing that the serving cell and/or the bandwidth part of the serving cell of the wireless device at the first wireless system is not in activated state.

In an example, wireless devices may support more than one SIM card (e.g., two). A dual SIM may be interpreted as a multi SIM, and vice versa. Multi SIM devices may address example use cases: the user has both a personal and a business subscription and wishes to use them both from the same device (e.g., this use case may become popular with bring-your-own-device (BYOD) initiatives); and/or a user has multiple personal subscriptions and chooses which one to use based on the selected service (e.g., use one individual subscription and one "family circle" plan). In at least one of the example use cases, SIMs may be from the same or from different mobile network operators (MNOs).

Multi SIM devices may support a variety of implementations and/or behaviors (e.g., Dual SIM Single Standby, Dual SIM Dual Standby, Dual SIM Dual Active, etc.). An implementation of a multi SIM device may use common radio and/or baseband components that may be shared among the multiple SIMs of the multi-SIM device. A multi-SIM device may need improvement of existing communication technologies. In an example, while actively communicating with a first system, a wireless device may need to occasionally check the other system (e.g., to read a paging channel, perform measurements, and/or read system information) and/or communicate with other system. This occasional activity on the second system may or may not have performance impact, depending on implementation of wireless device.

Paging Occasions (POs) may be calculated based on a UE identifier (IMSI and/or 5G-S-TMSI for EPS and/or 5GS, respectively). When a UE receives a page on a second system, a UE may need to decide whether it responds to the page (e.g. based on user-configured rules). In an absence of information indicating a service type that triggered the paging, the UE may blindly decide whether to ignore the page or respond to the page.

When a UE decides to respond to the page in a second system, or when a UE needs to perform signaling activity in a second system (e.g. Periodic Mobility Registration Update), the UE may need to stop a current activity in a first system. In an absence of procedure for suspension of an ongoing activity (e.g. the signaling activity and/or the current activity), the UE may autonomously release an RRC connection with the first system and abruptly leave. This is may be interpreted as an error case by the first system and/or may distort statistics in the first system, and/or may misguide algorithms that rely on the statistics. During UE's absence, the first system may keep paging the UE which may result in waste of paging resources.

In an example, Dual-SIM Dual-Standby (DSDS) terminals may be registered in two networks simultaneously, and/or may use just a single radio front-end and base band chain. A UE may be RRC connected to one network at a time. A UE may attempt to at least receive paging from the other network. For paging reception from the other network with a single RF, UEs may create gaps on an active connection to listen to paging of the other connection. When a UE receives a page on a second system, The UE may (depending on implementation and configuration) drop a (data) connection on a first system. A UE may not attempt to cleanly release a first connection to read a SIB on a second system. The UE behavior (e.g., not cleanly releasing the first connection) may cause decreased performance and/or reduced system capacity.

A wireless network may support a connectivity of a UE via non-3GPP access networks, e.g. WLAN access. The non-3GPP access networks may comprise trusted or untrusted non-3GPP accesses. Non-3GPP access networks may be connected to a core network (e.g., 5G core, LTE core, etc.) via a non-3GPP inter-working function (N3IWF). The N3IWF may interface a core network control plane and user plane functions via N2 and/or N3 interfaces, respectively. N2 and N3 reference points (e.g. S1-C and/or S1-U) may be used to connect standalone non-3GPP accesses to core network control-plane and user-plane functions respectively.

A UE that accesses the core network over a standalone non-3GPP access may, after UE attachment, support NAS signaling with core network control-plane functions using a N1 reference point (e.g., NAS reference point). When a UE is connected via a RAN (e.g. NG-RAN, E-UTRAN, UTRAN, etc.) and via a standalone non-3GPP access, multiple N1 (e.g. NAS) instances may exist for the UE (e.g., there may be one N1 instance over RAN and one N1 instance over non-3GPP access).

A UE simultaneously connected to the same core network of a PLMN over a 3GPP access and a non-3GPP access may be served by a single AMF if a selected N3IWF is located in the same PLMN as the 3GPP access. When a UE is connected to a 3GPP access of a PLMN, if the UE selects the N3IWF and the N3IWF is located in a PLMN different from the PLMN of the 3GPP access (e.g., in a different visiting PLMN (VPLMN) or in the home PLMN (HPLMN)), the UE may be served separately by the two PLMNs. The UE may be registered with two separate AMFs of the two PLMNs, respectively. PDU Sessions over the 3GPP access may be served by V-SMFs different from a V-SMF serving the PDU Sessions over the non-3GPP access.

PLMN selection for a 3GPP access may not depend on a N3IWF selection. If a UE is registered over a non-3GPP, the UE may perform PLMN selection for the 3GPP access independently of a PLMN to which the N3IWF belongs. A UE may establish an Internet protocol security (IPSec) tunnel with a N3IWF to attach to a core network over untrusted non-3GPP access. A UE may be authenticated by and/or attached to a core network during an IPSec tunnel establishment procedure.

A UE NAS signaling connection with an AMF over a non-3GPP access may be maintained after all PDU sessions for a UE over the non-3GPP access are released and/or handed over to a 3GPP access. N1 NAS signaling over standalone non-3GPP accesses may be protected with a same security mechanism applied for N1 over a 3GPP access.

Figure 19:
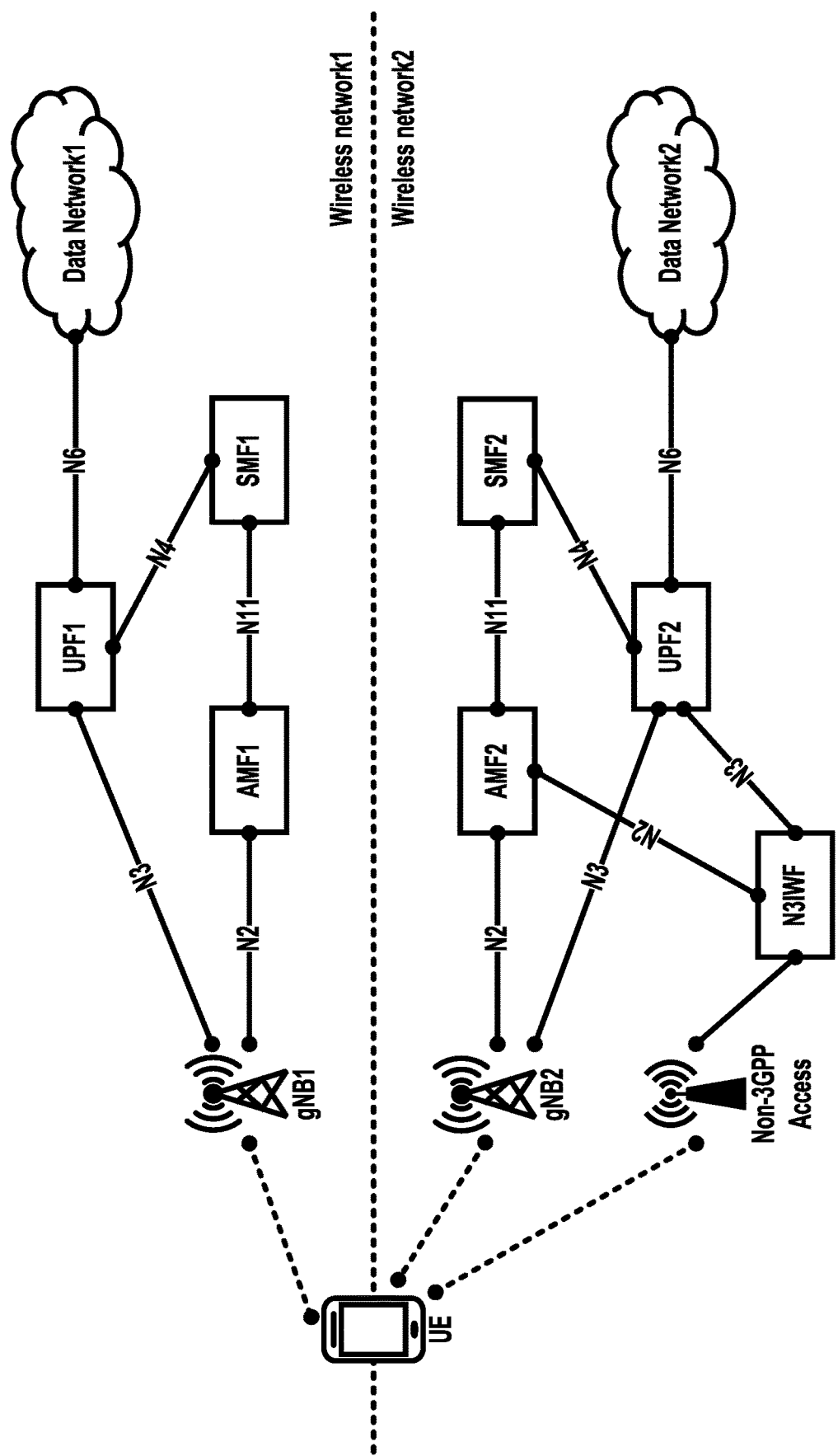
FIG. 19 is an example diagram of an aspect of an embodiment of the present disclosure.
Figure 20:
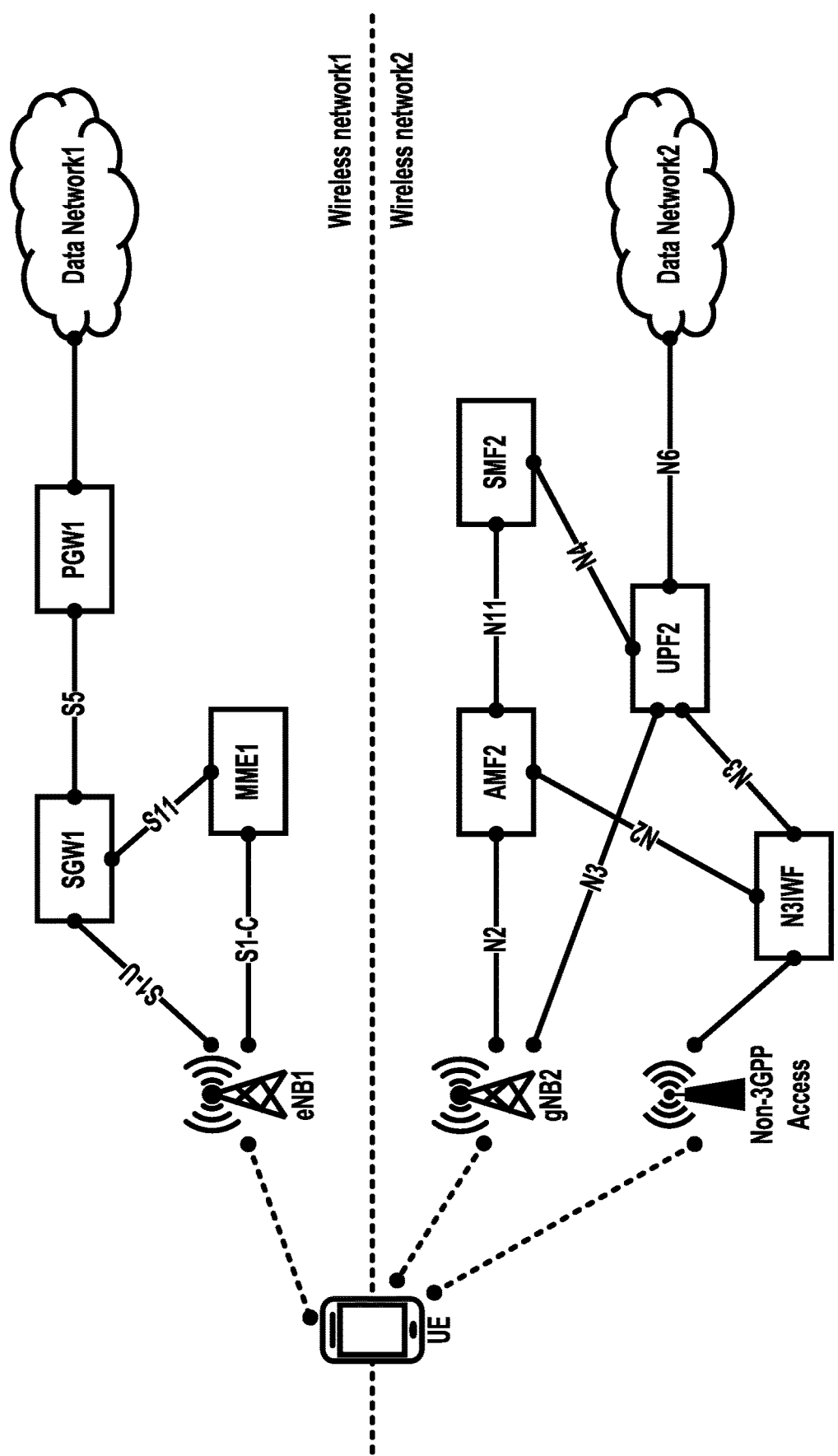
FIG. 20 is an example diagram of an aspect of an embodiment of the present disclosure.

In an example, as shown in FIG. 19 and/or FIG. 20, a wireless device (e.g., UE, vehicle, communication device, handset, etc.) may be registered to (e.g., or may communicate with) a first wireless network (e.g., wireless network1, first system, first network, first public land mobile network (PLMN), etc.) and/or a second wireless network (e.g., wireless network2, second system, second network, second PLMN, etc.). In an example, the first wireless network may comprise at least one of a first PLMN, a first radio access technology (e.g., system, network), a first 5th generation (5G) wireless network, a first long-term evolution (LTE) wireless network, a first universal mobile telecommunications service (UMTS) wireless network, and/or the like. In an example, the second wireless network may comprise at least one of: a second PLMN, a second radio access technology (e.g., system, network), a second 5G wireless network, a second LTE wireless network, and/or a second UMTS wireless network, and/or the like. In an example, a first access node (e.g., first access point) of a first wireless local area network (WLAN) may be connected to the second wireless network. In an example, a second access node (e.g., second access point) of a second WLAN may be connected to the second wireless network. In an example, the second access node may be the first access node. In an example, the second WLAN may be the first WLAN.

In an example, the first access node and/or the second access node may comprise at least one of a wireless access point (WAP), an access point (AP), and/or a Wi-Fi router. In an example, the first WLAN and/or the second WLAN may be connected to the second wireless network. In an example, the first WLAN and/or the second WLAN may be connected to the second wireless network via a non-3rd generation partnership project interworking function (N3IWF). In an example, the wireless device may communicate with the second wireless network via the first access node and/or the first WLAN. In an example, the wireless device may communicate with the second wireless network via the second access node and/or the second WLAN. The first access node and/or the second access node may be connected to the second wireless network (e.g., an access and mobility management function (AMF) and/or a user plane function (UPF) of the second wireless network) via a non-3rd generation partnership project interworking function (N3IWF). In an example, the second wireless network may comprise at least one of the first WLAN and/or the first access node. In an example, the second wireless network may comprise at least one of the second WLAN and/or the second access node. The second wireless network may comprise the N3IWF.

Figure 16:
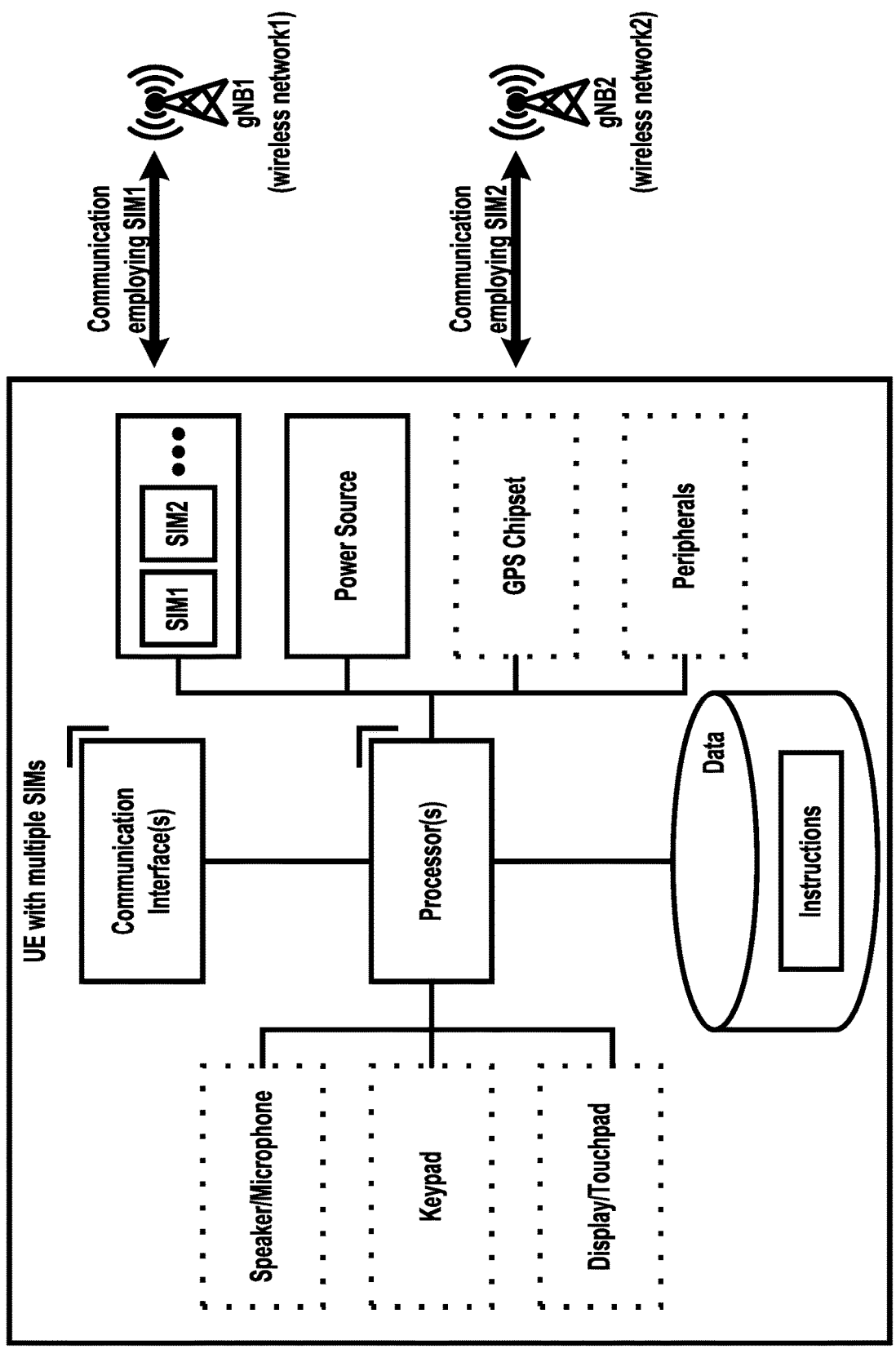
FIG. 16 is an example diagram of an aspect of an embodiment of the present disclosure.
Figure 17:
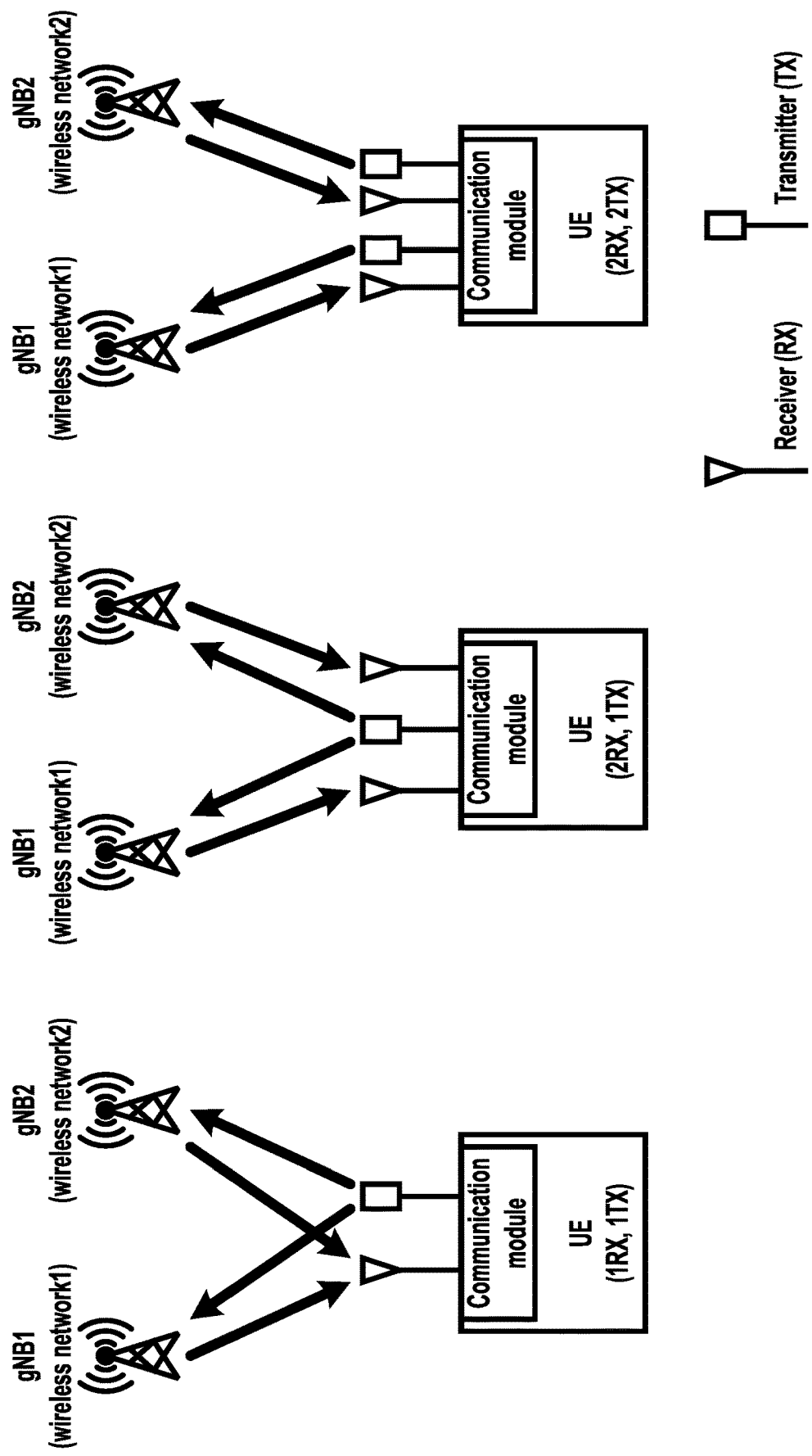
FIG. 17 is an example diagram of an aspect of an embodiment of the present disclosure.
Figure 18:
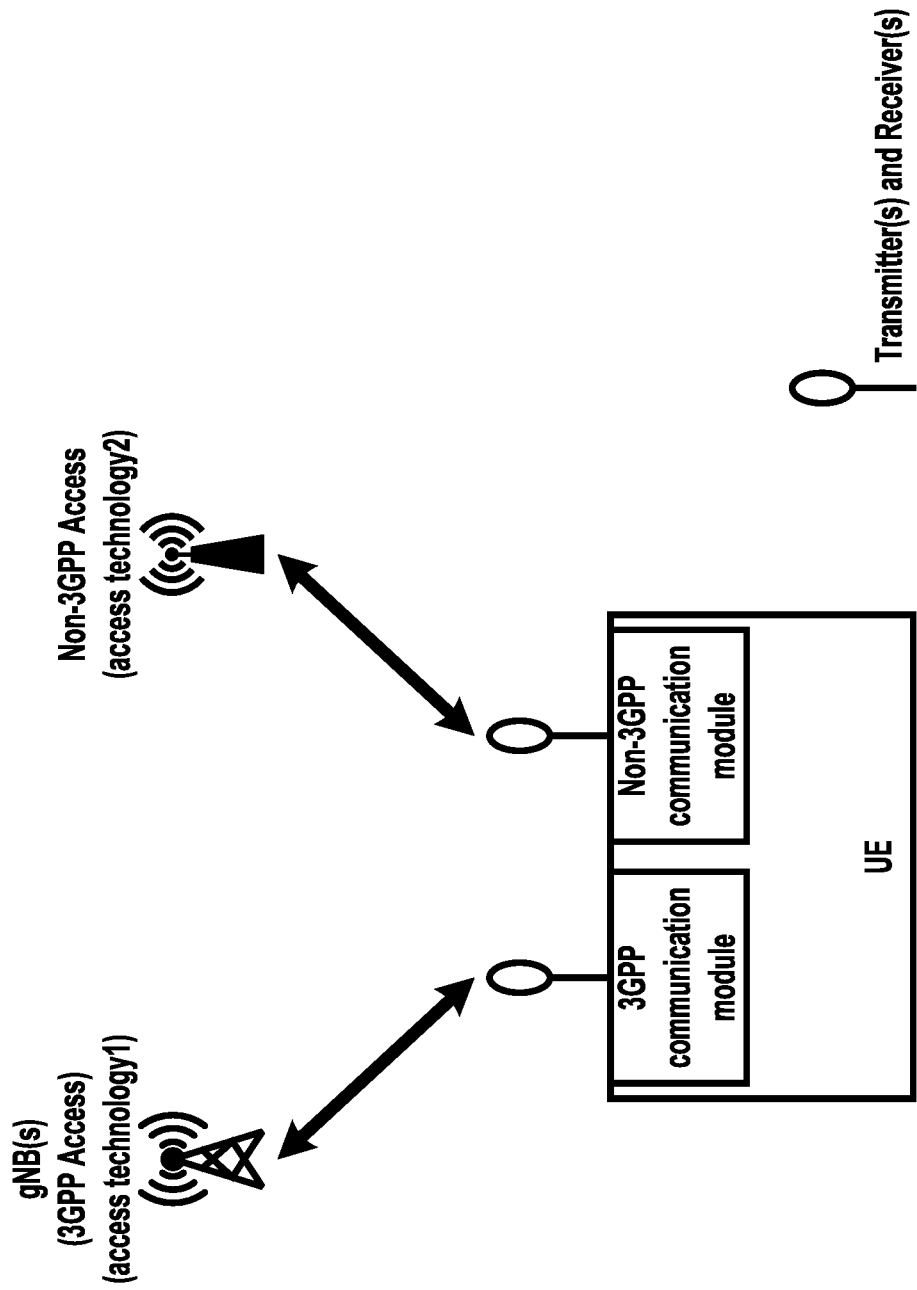
FIG. 18 is an example diagram of an aspect of an embodiment of the present disclosure.

In an example, as shown in FIG. 16, the wireless device may support at least one subscriber identity module (SIM) (e.g., dual SIM, multiple SIM). The at least one SIM may comprise at least one of a first SIM for communication with the first wireless network and/or a second SIM for communication with the second wireless network. One or more of the first SIM or the second SIM may be a physical SIM card (e.g., plastic SIM card) or an embedded SIM (eSIM) (e.g., electronic SIM card). In an example, as shown in FIG. 17, the wireless device may have at least one receiver and/or at least one transmitter for communication with the first wireless network and/or the second wireless network. In an example, as shown in FIG. 18, the wireless device may comprise a cellular communication module (e.g., 3GPP communication module) and/or a non-cellular communication module (e.g., non-3GPP communication module, WLAN/Wi-Fi communication module, Bluetooth communication module, etc.). The cellular communication module may comprise the at least one receiver and/or the at least one transmitter. In an example, the wireless device may employ the cellular communication module for communication with first wireless network and/or the second wireless network via one or more base stations (e.g., gNB, eNB, nodeB, etc.). In an example, the wireless device may employ the non-cellular communication module for communication with the second wireless network via one or more access node (e.g., wireless access point, access point, Wi-Fi router; the first access node and/or a second access node).

Figure 21:
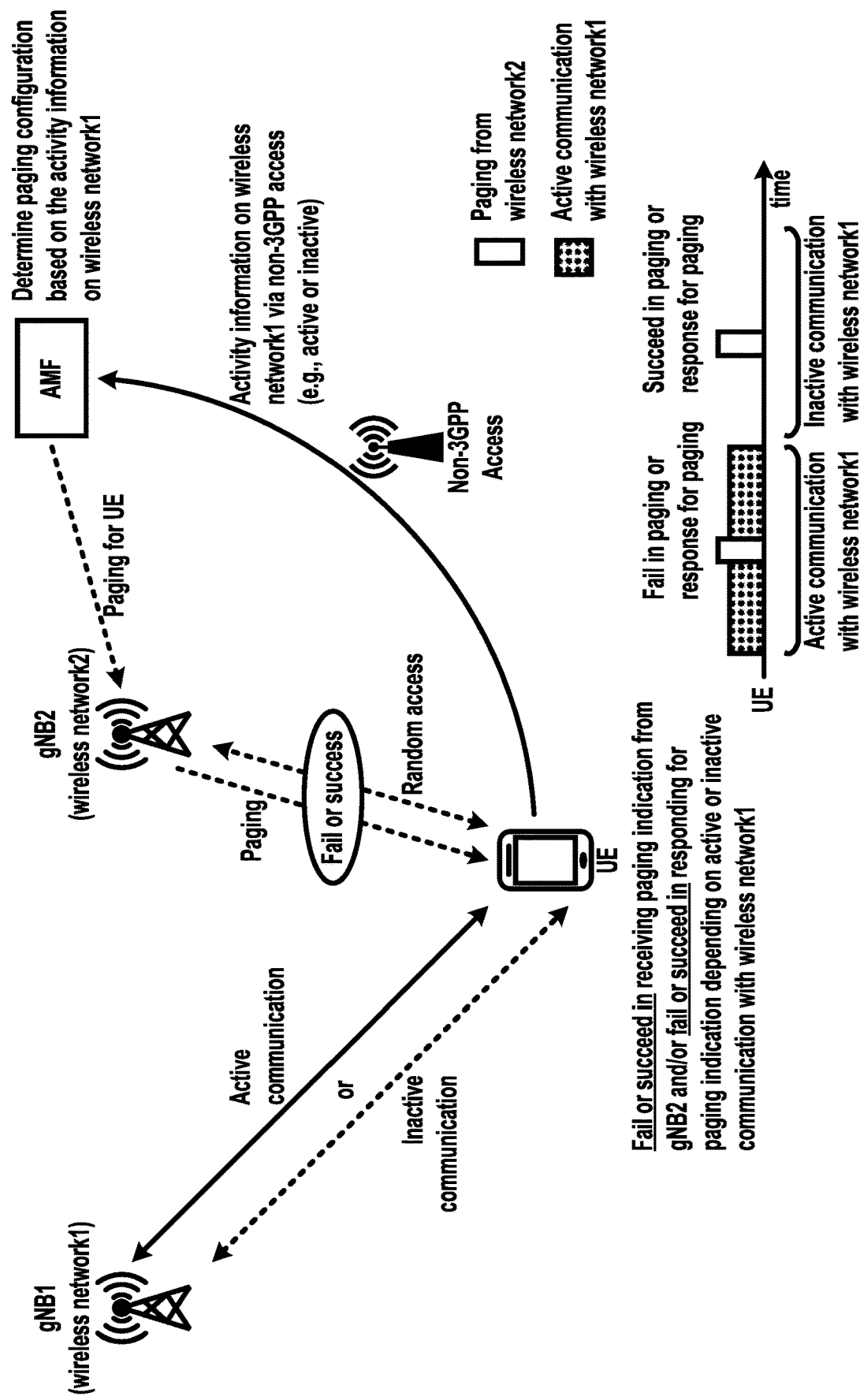
FIG. 21 is an example diagram of an aspect of an embodiment of the present disclosure.
Figure 22:
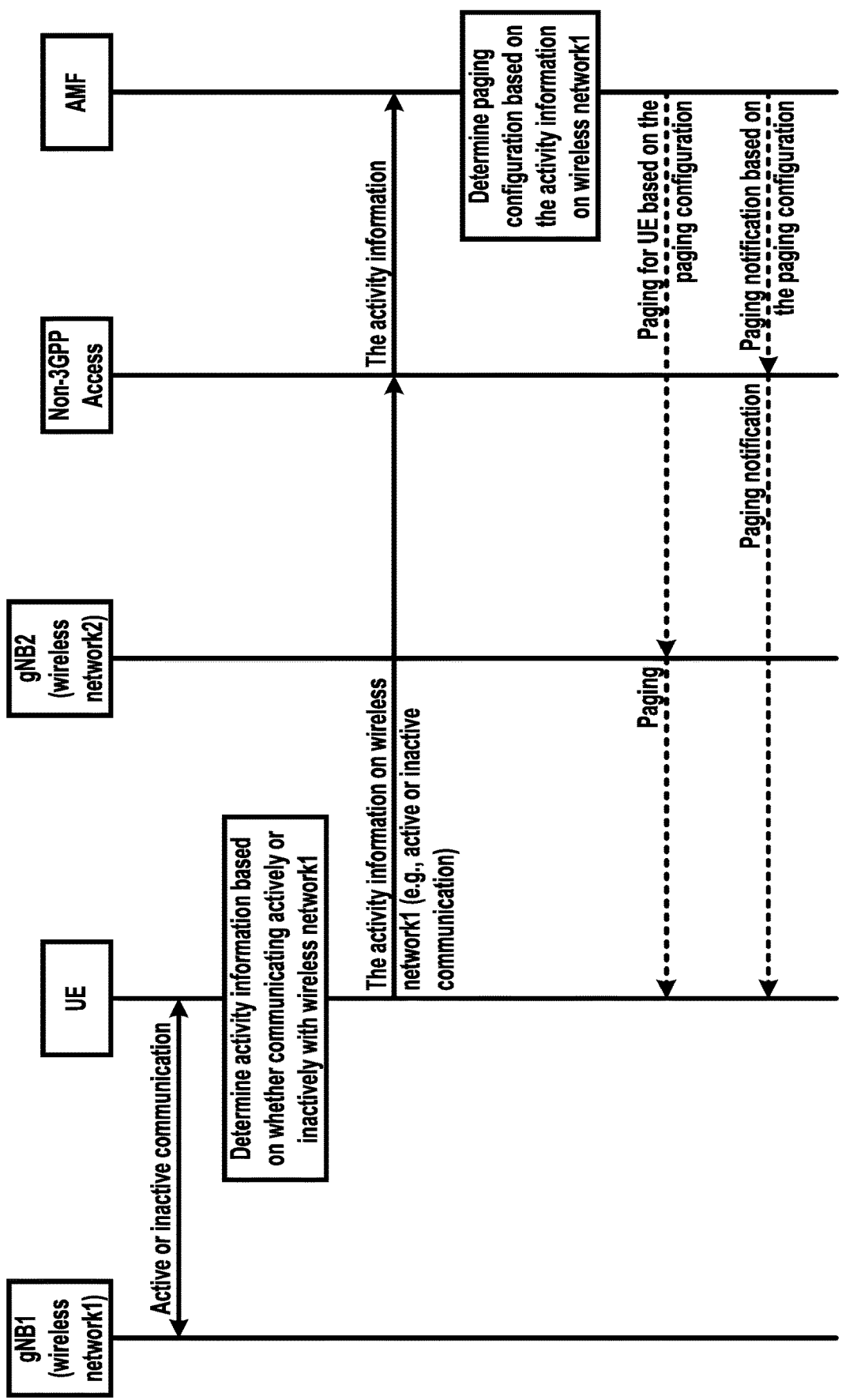
FIG. 22 is an example diagram of an aspect of an embodiment of the present disclosure.

In an example, as shown in FIG. 21 and/or FIG. 22, the wireless device may transmit a radio resource control (RRC) message for an RRC connection with the first wireless network (e.g., first PLMN, first system, etc.). In an example, the transmitting the RRC message may comprise transmitting the RRC message to a first base station (e.g., first gNB, gNB1, eNB, nodeB, etc.) of the first wireless network. In an example, the wireless device may transmit the RRC message to the first base station of the first wireless network. In an example, the RRC message may be to establish/reestablish/reconfigure the RRC connection with the first wireless network and/or the first base station. In an example, the RRC message may be an RRC request message to request setup/establishment/reestablishment/resume of the RRC connection with the first wireless network and/or the first base station. In an example, the RRC message may be an RRC complete message to complete and/or to confirm setup/establishment/reestablishment/resume of the RRC connection with the first wireless network and/or the first base station. In an example, the wireless device may have/maintain, based on the RRC message, the RRC connection with the first wireless network and/or the first base station of the first wireless network.

In an example, the RRC message may comprise at least one of an RRC setup request message; an RRC complete message, an RRC resume request message, an RRC resume complete message, an RRC reestablishment request message, an RRC reestablishment complete message, an RRC reconfiguration complete message, and/or the like. In an example, the RRC message may comprise at least one of an RRC connection setup request message, an RRC connection complete message, an RRC connection resume request message, an RRC connection resume complete message, an RRC connection reestablishment request message, an RRC connection reestablishment complete message, an RRC connection reconfiguration complete message, and/or the like.

In an example, the RRC message may further comprise at least one of a UE identifier (e.g., C-RNTI, IMSI, TMSI, S-TMSI, IMEI, etc.) of the wireless device, an establishment cause indicating a cause (e.g., emergency, highPriorityAccess, mt-Access, mo-Signalling, mo-Data, mo-VoiceCall, mo-VideoCall, mo-SMS, mps-PriorityAccess, mcs-PriorityAccess, handover failure, (re)establishment failure, reconfiguration failure, etc.) of establishment/reestablishment/resume of the wireless device, a cell identifier (e.g., physical cell identifier (PCI), global cell identifier (GCI, CGI), etc.) indicating a previous serving cell of the wireless device, a shortMAC-I, a selected PLMN identifier, a registered AMF information comprising a PLMN identifier and/or an AMF identifier, a network slice information (e.g., S-NSSAI, NSSAI) for a network slice associated with a service for the wireless device, a NAS message (e.g., NAS PDU), a guami type, and/or the like.

In an example, the wireless device may receive a second RRC message for the RRC connection with the first wireless network and/or the first base station. In an example, the wireless device may receive the second RRC message from the first base station of the first wireless network. In an example, the wireless device may receive the second RRC message in response to transmitting the RRC message (e.g., the RRC request message). In an example, the wireless device may transmit the RRC message (e.g., the RRC complete message) in response to receiving the second RRC message. In an example, the second RRC message may comprise at least one of an RRC setup message, an RRC resume message, an RRC reestablishment message, an RRC reconfiguration message, an RRC connection setup message, an RRC connection resume message, an RRC connection reestablishment message, an RRC connection reconfiguration message, and/or the like. In an example, the wireless device may have/maintain, based on the second RRC message, the RRC connection with the first wireless network and/or the first base station of the first wireless network.

In an example, the second RRC message may comprise at least one of: a UE identifier (e.g., TMSI, C-RNTI, IMSI, S-TMSI, IMEI, etc.) of the wireless device, a cell identifier (e.g., physical cell identifier, PCI, global cell identifier, GCI, CGI, cell index, etc.) of the wireless device, cell information (e.g., cell index, cell group configuration, radio link failure timers and constants, RLM in-sync/out-of-sync threshold, reconfiguration with sync comprising t304 value, RACH configuration parameters comprising a preamble index and/or RACH resources, carrier frequency information, bandwidth part configuration parameters, beam configuration parameters of SS beam and/or CSI-RS beam, transmission power configuration parameter comprising p-MAX/p-MgNB/p-SgNB, and/or the like) of one or more serving cells for the wireless device, a bearer identifier of a bearer associated with a service for the wireless device, a logical channel identifier (index) of the bearer, a PDU session identifier of (e.g., associated with) the bearer, a QoS flow identifier of the bearer, a network slice information (e.g., S-NSSAI, NSSAI) for a network slice associated with the bearer and/or the service, and/or the like. In an example, the service associated with the bearer may comprise at least one of a voice, an ultra-reliable and low-latency communication (URLLC), a vehicle-to-everything (V2X) (e.g., V2I, V2V, V2P, etc.), an emergency service, and/or the like. In an example, the service associated with the bearer may comprise at least one of a delay tolerant service, an Internet-of-things (IoT) service, In an example, the second RRC message may comprise RRC configuration parameters for the wireless device and/or the RRC connection of the wireless device. The RRC configuration parameters of the second RRC message may indicate that the bearer (e.g. the logical channel) is for a URLLC service (e.g., voice, V2X, emergency service, etc.). In an example, the RRC configuration parameters may comprise QoS information of the bearer (e.g. the logical channel). The QoS information of the bearer may indicate that the bearer requires low latency and/or high reliability. The QoS information of the bearer may comprise a required latency (e.g. 1 ms), a required packet loss rate (e.g. 0.0001%), a required data throughput (e.g. 100 Mbps), a priority value (e.g. highest priority, priority 0), a required jitter level, and/or the like.

In an example, the second RRC message may further comprise at least one of an rrc-transactionidentifier information element (IE), a radio resource configuration dedicated IE comprising one or more radio resource configuration parameters, measurement configuration parameters, mobility control information parameters, one or more NAS layer parameters, security parameters, antenna information parameters, secondary cell addition/modification parameters, secondary cell release parameters, WLAN configuration parameters, WLAN offloading configuration parameters, LWA configuration parameters, LWIP configuration parameters, RCLWI configuration parameters, sidelink configuration parameters, V2X configuration parameters, uplink transmission power configuration parameters (e.g. p-MAX, p-MeNB, p-SeNB), a power control mode information element, secondary cell group configuration parameters, and/or the like.

In an example, the second RRC message may comprise discontinuous reception (DRX) configuration parameters (e.g., DRX-config) for DRX operation of the wireless device. The DRX configuration parameters may comprise a DRX on-duration timer, a DRX inactivity timer, a DRX HARQ RTT timer for downlink/uplink, a DRX retransmission timer for downlink/uplink, a DRX long cycle start offset, a DRX short cycle, a DRX short cycle timer, a DRX slot offset, and/or the like. The wireless device may determine, based on the DRX configuration parameters, whether a DRX is operating or not. The wireless device may determine, based on the DRX configuration parameters and/or a MAC CE received from the first base station and/or the first wireless network, whether the DRX is in on-duration or in off-duration. The second RRC message may comprise cell configuration parameters (e.g., MAC-CellGroupConfig) comprising the DRX configuration parameters and/or a field (e.g., SetupRelease {DRX-Config}) indicating whether the DRX (e.g., DRX-config) is setup or released.

In an example, the second RRC message may comprise at least one of configuration parameters for power saving mode. The configuration parameters for power saving mode may comprise at least one of: resource configuration parameters for PDCCH monitoring for activation or deactivation of the power saving mode; power saving mode timer for deactivate or activate the power saving mode, configuration parameters for SRS/CSI-report transmission during the power saving mode, configuration parameters for CSI-RS/SS monitoring during the power saving mode, and/or the like. The wireless device may determine, based on the configuration parameters for power saving mode, whether the power saving mode is in on-duration or in off-duration (e.g., whether the power saving mode is operating or not).

In an example, the second RRC message may comprise cell configuration parameters (e.g., the cell information) for one or more cells to serve the wireless device. The cell configuration parameters may comprise bandwidth information, frequency information, frequency offset information, carrier information, band information, beam configuration parameters, and/or bandwidth part configuration parameters (e.g., bandwidth/frequency/frequency-offset of a bandwidth part) of the one or more cells. In an example, the wireless device may receive, from the first base station and/or the first wireless network, a cell indication (e.g., MAC CE) indicating activation/deactivation/transitioning-to-dormant-state of at least one of the one or more cells. The wireless device may activate/deactivate the at least one cell based on the cell indication (e.g. the MAC CE). The wireless device may transition the at least one cell to a dormant state based on the cell indication (e.g. the MAC CE). The wireless device may activate/deactivate a cell of the one or more cells based on expiration of a timer. The wireless device may transition a cell of the one or more cells to a dormant state based on expiration of a timer.

In an example, the wireless device may determine, based on the RRC message, that the wireless device is in an active state at the first wireless network (e.g., and/or at the first base station). In an example, the wireless device may determine, based on the RRC connection, that the wireless device is in the active state at the first wireless network. In an example, the wireless device may determine the active state based on an active communication with the first wireless network and/or the first base station. The wireless device may determine the active state in response to actively communicating with the first wireless network and/or the first base station. In an example, the active state may comprise at least one of: an RRC connected state during which the wireless device has/maintains/keeps the RRC connection with the first base station and/or the first wireless network; a time duration that a discontinuous reception (DRX) is not operating (e.g., the DRX is not configured and/or released); an on-duration (e.g., DRX on-time) of a DRX when the wireless device employs the DRX; an on-duration of a power saving mode; a time duration that a measurement gap is not configured and/or is released; a time duration during which the wireless device employs a service (e.g., voice, URLLC, V2X, emergency service, etc.); an activation state of a first cell (e.g., first carrier, first frequency, first band, first bandwidth part, first beam); a time duration during which the wireless device employs a first cell (e.g., first carrier, first frequency, first band, first bandwidth part, first beam) (e.g., the first cell is a serving cell of the wireless device); and/or the like.

In an example, the wireless device may determine the active state in response to transitioning to the RRC connected state. The wireless device may determine the RRC connected state based on receiving the second RRC message and/or transmitting the RRC message (e.g., the RRC request message and/or the RRC complete message). During the RRC connected state, the wireless device and/or the first base station (e.g., the first wireless network) may maintain/keep the RRC connection and/or UE contexts of the wireless device for the RRC connection.

In an example, the wireless device may determine the active state in response to a DRX (e.g., DRX configurations) being not configured, not operating, not setup, not employed, and/or released for the wireless device. The wireless device may determine the active state in response to the DRX (e.g., DRX configurations for communication with the second wireless network) being not configured during the RRC connected state at the first wireless network. The wireless device may determine the active state in response to receiving an DRX release indication from a base station (e.g., the first base station, the first wireless network). In an example, a field (e.g., SetupRelease {DRX-Config}) of an RRC message (e.g., downlink RRC message, the second RRC message) may indicate that the DRX (e.g., DRX-config) is released.

In an example, the wireless device may determine the active state in response to a DRX being on-duration (e.g., DRX on-time duration, non-sleep mode). The wireless device may determine the active state in response to the DRX being in the on-duration (e.g., being not in off-duration and/or being not in sleep mode; the off-duration and/or the sleep mode is for communication with the second wireless network) during the RRC connected state at the first wireless network. The wireless device may determine the on-duration of the DRX based on DRX configuration parameters. The wireless device may receive an RRC message (e.g., a downlink RRC message, the second RRC message) comprising the DRX configuration parameters (e.g., DRX-Config). The wireless device may determine the on-duration of the DRX based on the DRX configuration parameters (e.g., DRX on duration timer, DRX inactivity timer, DRX long-cycle start offset, DRX short-cycle, DRX short-cycle timer, DRX slot offset, and/or system frame number (SFN) 0). The wireless device may determine the on-duration of the DRX in response to receiving an indication (e.g., PDCCH, PDCCH order, DCI, MAC CE, etc.) indicating/commanding starting the on-duration of the DRX (e.g., indication to go to the non-sleep mode, indication to wake up). The wireless device may receive the indication from a base station (e.g., the first base station and/or the first wireless network). The wireless device may determine the on-duration of the DRX in response to expiration of a timer and/or a cycle for the DRX.

In an example, the wireless device may determine the active state in response to a power saving mode (PSM) being on-duration (e.g., PSM on-time duration, non-sleep mode). The wireless device may determine the active state in response to a power saving mode (PSM) being in the on-duration (e.g., being not in off-duration and/or being not in sleep mode; the off-duration and/or the sleep mode is for communication with the second wireless network) during the RRC connected state at the first wireless network. The wireless device may determine the on-duration of the power saving mode based on PSM configuration parameters. The wireless device may receive an RRC message (e.g., a downlink RRC message, the second RRC message) comprising the PSM configuration parameters (e.g., PSM-Config). The wireless device may determine the on-duration of the power saving mode in response to receiving an indication (e.g., wake-up signal (WUS), PDCCH, PDCCH order, DCI, MAC CE, etc.) indicating/commanding deactivation/disabling of the power saving mode (e.g., indication to go to the non-sleep mode, indication to wake up). The wireless device may receive the indication from a base station (e.g., the first base station and/or the first wireless network). The wireless device may determine the on-duration of the power saving mode in response to expiration of a timer for the power saving mode.

In an example, the wireless device may determine the active state in response to a measurement gap (e.g., gap, paging gap, monitoring gap, communication gap, etc.) being not configured, not employed, and/or released for the wireless device. The wireless device may determine the active state in response to the measurement gap being not configured/assigned/activated (e.g., not setup and/or released) during the RRC connected state at the first wireless network. The measurement gap may be for communication with the second wireless network. During the measurement gap, the wireless device may not communicate with and/or may limit communication with the first wireless network (e.g., the first base station). The wireless device may receive an RRC message (e.g., a downlink RRC message, the second RRC message) comprising configuration parameters for the measurement gap. The wireless device may determine that the measurement gap is not configured/assigned/activated/setup and/or is released in response to receiving the RRC message comprising configuration parameters (e.g., release indication) for the measurement gap. The wireless device may determine that the measurement gap is deactivated and/or released in response to receiving a deactivation indication (e.g., PDCCH, PDCCH order, DCI, MAC CE, etc.) indicating/commanding deactivation/disabling of the measurement gap. The wireless device may receive the deactivation indication from a base station (e.g., the first base station and/or the first wireless network).

In an example, the wireless device may determine the active state in response to a service (e.g., voice, URLLC, V2X, emergency service, etc.) being employed/used by the wireless device. The wireless device may receive configuration parameters for a bearer (e.g., data radio bearer, signaling radio bearer, logical channel, etc.) associated with the service. The bearer may be configured for a PDU session, a QoS flow, a network slice, and/or a logical channel to provide the service. The wireless device may determine the active state in response to the bearer associated with the service being configured/activated at the first wireless network and/or the first base station. The wireless device may receive an RRC message (e.g., a downlink RRC message, the second RRC message) comprising the configuration parameters for the bearer (e.g., to configure the bearer). The wireless device may determine the active state based on transmitting/receiving transport blocks of the bearer associated with the service. In an example, if the wireless device employs the service (e.g., voice, URLLC, V2X, emergency service, etc.) at the first wireless network, the wireless device may avoid to and/or may not be able to communicate with the second wireless network (e.g., via a 3GPP access and/or a base station of the second wireless network) to reliably support the service at the first wireless network. For reliable support of the service at the first wireless network, the wireless device may determine the active state in a time duration during which the wireless device employs the service.

In an example, the wireless device may determine the active state in response to a first cell (e.g., first carrier, first frequency, first band, first bandwidth part, first beam) being activated (e.g., being in an active state) for the wireless device at the first wireless network. The wireless device may determine the active state in response to receiving an activation indication (e.g., MAC CE, RRC message) indicating activation of the first cell (e.g., the first carrier) associated with the first frequency and/or the first band. The wireless device may determine the active state in response to expiration of a timer for activation of the first cell. The wireless device may determine the active state in response to receiving an activation indication (e.g., MAC CE, PDCCH, DCI, RRC message, etc.) indicating switching to (e.g., or activating, changing to, and/or transitioning to) the first bandwidth part of the first cell (e.g., the first carrier) associated with the first frequency and/or the first band. In an example, the first bandwidth part may be associated with the first frequency and/or the first band. The wireless device may determine the active state in response to expiration of a timer (e.g., inactivity timer, activity timer) for switching to the first bandwidth part of the first cell. The wireless device may determine the active state in response to receiving an indication (e.g., MAC CE, PDCCH, DCI, RRC message, etc.) indicating switching to (e.g., or changing to, activating, and/or transitioning to) the first beam of the first cell (e.g., the first carrier) associated with the first frequency and/or the first band. The wireless device may determine the active state in response to expiration of a timer (e.g., beam failure timer, inactivity timer, activity timer) for switching to the first beam of the first cell.

In an example, the wireless device may determine the active state in response to a first cell (e.g., first carrier, first frequency, first band, first bandwidth part, first beam) being used/employed by the wireless device at the first wireless network (e.g., the first cell/beam being configured as a serving cell/beam of the wireless device) (e.g., the first bandwidth part being configured as an active bandwidth part of the wireless device). The wireless device may determine the active state in response to receiving configuration parameters (e.g., via an RRC message, a downlink RRC message, and/or the second RRC message) indicating configuring the first cell (e.g., the first carrier) associated with the first frequency and/or the first band. The wireless device may determine the active state in response to receiving configuration parameters (e.g., via an RRC message, a downlink RRC message, and/or the second RRC message) indicating configuring the first bandwidth part and/or the first beam of the first cell (e.g., the first carrier) associated with the first frequency and/or the first band. In an example, the first bandwidth part may be associated with the first frequency and/or the first band.

In an example, if the wireless device employs a first band/frequency/carrier/bandwidth of a first cell at the first wireless network, the wireless device may not be able to and/or may be hard/difficult to use a second band/frequency/carrier of a second cell (e.g., camping-on cell, serving cell, etc.) of the second wireless network. If the wireless device employs the same band/frequency/carrier and/or employs bands/frequencies/carriers belonging to the same band combination (e.g., corresponding to the same RF chain) for the first wireless network and the second wireless network, the wireless device may need a long transition time to transition between the first wireless network and the second wireless network for transmission or reception of transport blocks.

The wireless device may transmit/receive, to/from the first wireless network and/or the first base station, transport blocks based on the RRC connection during the active state. The wireless device may transmit/receive transport blocks based on configurations associated with the active state (e.g., based on at least one of the RRC connected state, the DRX configuration being released, the DRX on-duration time, the PSM on-duration time, the measurement gap being released, the employment of the service (e.g., voice, URLLC, V2X, emergency service, etc.), the activation of the first cell/first bandwidth part/first beam, the employment/configuration of the cell/first bandwidth part/first beam, etc.).

In an example, the wireless device may transmit/send a first information message to the second wireless network (e.g., an access and mobility management function (AMF) of the second wireless network) and based on the RRC connection with the first wireless network. In an example, the wireless device may transmit/send the first information message to the second wireless network in response to determining the active state and/or determining the transitioning to the active state. The first information message may indicate that the wireless device is in the active state at the first wireless network (e.g., and/or at the first base station). The wireless device may transmit, to the second wireless network (e.g., the AMF of the second wireless network), the first information message based on the determining that the wireless device is in the active state at the first wireless network (e.g., and/or at the first base station). The wireless device may transmit the first information message to the AMF and/or the second wireless network via the first access node (e.g., the first access point). The wireless device may transmit the first information message to the first access node, and/or the first access node may transmit/forward/send the first information message to the AMF and/or the second wireless network (e.g., via the N3IWF). The first access node may be/comprise the first access point (AP). The first access node may be/comprise the first access point (AP) of the first WLAN. The first WLAN may comprise the first access node (e.g., the first access point). The first access node may transmit the first information message to the N3IWF, and/or the N3IWF may transmit/forward/send the first information message to the AMF and/or the second wireless network. In an example, the wireless device may transmit, to the first access node (e.g., the first access point) of the first WLAN and based on the RRC connection, the first information message.

In an example, the wireless device may transmit/send, to a second base station (e.g., second gNB) of the second wireless network and based on the RRC connection and/or based on the determining the active state at the first wireless network, the first information message indicating that the wireless device is in the active state at the first wireless network. The second base station may transmit/forward/send the first information message to the AMF and/or the second wireless network.

In an example, the first information message may be for the second wireless network. In an example, the first information message may comprise a non-access stratum (NAS) message (e.g., AM-NAS, MM-NAS, SM-NAS, etc.) for the second wireless network. The first information message may be for the second wireless network to configure parameters for the wireless device.

The first information message may indicate that the wireless device is (e.g., at the first wireless network and/or the first base station) in at least one of: the RRC connected state during which the wireless device has/maintains/keeps the RRC connection with the first base station and/or the first wireless network; the time duration that the DRX is not operating (e.g., the DRX is not configured and/or released); the on-duration (e.g., DRX on-time) of the DRX when the wireless device employs the DRX; the on-duration of the power saving mode; the time duration that the measurement gap is not configured and/or is released; the time duration during which the wireless device employs the service (e.g., voice, URLLC, V2X, emergency service, etc.); the activation state of the first cell (e.g., first carrier, first frequency, first band, first bandwidth part, first beam); the time duration during which the wireless device employs the first cell (e.g., first carrier, first frequency, first band, first bandwidth part, first beam) (e.g., the first cell is a serving cell of the wireless device); and/or the like.

The first information message may comprise a time value indicating a duration and/or a termination/end/starting timing of at least one of: the RRC connected state during which the wireless device has/maintains/keeps the RRC connection with the first base station and/or the first wireless network; the time duration that the DRX is not operating (e.g., the DRX is not configured and/or released); the on-duration (e.g., DRX on-time) of the DRX when the wireless device employs the DRX; the on-duration of the power saving mode; the time duration that the measurement gap is not configured and/or is released; the time duration during which the wireless device employs the service (e.g., voice, URLLC, V2X, emergency service, etc.); the activation state of the first cell (e.g., first carrier, first frequency, first band, first bandwidth part, first beam); the time duration during which the wireless device employs the first cell (e.g., first carrier, first frequency, first band, first bandwidth part, first beam) (e.g., the first cell is a serving cell of the wireless device); and/or the like.

The first information message may comprise at least one of: at least one element of the RRC configuration parameters of the second RRC message, at least one element of the DRX configuration parameters for the DRX (e.g., DRX cycle, DRX offset, DRX on-duration period, DRX off-duration period, etc.), at least one element of the configuration parameters for the power saving mode, the configuration parameters for the measurement gap, at least one element of the cell configuration parameters for the one or more cells and/or the first cell (e.g., bandwidth information, frequency information, frequency offset information, carrier information, band information, beam configuration parameters, and/or bandwidth part configuration parameters (e.g., bandwidth/frequency/frequency-offset of a bandwidth part) of the one or more cells), service type information (e.g., network slice identifier (e.g., NSSAI, S-NSSAI), service identifier, service type identifier, etc.) of the service (e.g., voice, URLLC, V2X, emergency service, etc.), and/or the like.

In an example, the first information message may further comprise at least one of: service type information (e.g., service identifier, network slice identifier, S-NSSAI, NSSAI, etc.) of a service (e.g., voice call, emergency service, delay tolerant service, etc.) that is allowable/configurable with the second wireless network during the active state at the first wireless network and/or the first base station; service type information (e.g., service identifier, network slice identifier, S-NSSAI, NSSAI, etc.) of the service that the wireless device employs/uses at the first wireless network; a public land mobile network (PLMN) identifier indicating a first PLMN of the first wireless network; a field indicating that the wireless device employs multiple SIMs and/or dual SIM; information of a band (e.g., carrier, frequency, bandwidth, etc.) that the wireless device employs for communication with the first wireless network and/or the first base station; information of a band (e.g., carrier, frequency, bandwidth, etc.) that the wireless device is available for communication with the second wireless network during the active state at the first wireless network and/or the first base station; and/or the like.

In an example, the AMF may determine, based on the first information message, first paging configurations of a paging procedure for the wireless device. The paging procedure may be to request/command/indicate the wireless device to access to the second wireless network (e.g., via a 3GPP access network). The first paging configurations may comprise at least one of: configuring to transmit a paging indication for the wireless device via at least one of a WLAN, a non-3rd generation partnership project interworking function (N3IWF), a non-3rd generation partnership project (non-3GPP) access network, and/or a wireless access node (e.g., wireless access point, access point); configuring to suspend a paging indication for a service (e.g., delay tolerant service, low priority service) of the wireless device; configuring to suspend a paging indication for the wireless device; configuring to transmit a paging indication for a service (e.g., voice, high priority service, URLLC, V2X, emergency service, etc.); configuring to transmit a paging indication with increased repetitions; configuring to transmit a paging indication with a shifted paging cycle; and/or the like.

In an example, the AMF may determine, based on the first information message, that the wireless device may not receive (e.g., receive and ignore, or cannot receive due to active communication with the first wireless network, etc.) a paging via a base station (e.g., 3rd generation partnership project (3GPP) access network, gNB, eNB, etc.) due to the active state at the first wireless network and/or the first base station. In an example, the AMF may determine that the wireless device may not be able to communicate with the second wireless network via the 3GPP access network during the active state at the first wireless network (e.g., active communication with the first wireless network) due to a limited number of transmitter and receiver, as shown in FIG. 17. With one receiver, the wireless device may not be able to receive, via the 3GPP access network, signal from both the first wireless network and the second wireless network simultaneously. With one transmitter, the wireless device may not be able to transmit, via the 3GPP access network, signal to both the first wireless network and the second wireless network simultaneously. With multiple receivers or transmitters, the wireless device may not be able to communicate, via the 3GPP access network, with both the first wireless network and the second wireless network simultaneously if the wireless device employs multiple base stations (e.g., dual connectivity, multi connectivity, MCG/SCG) at the first wireless network.

In an example, the AMF may configure, based on the first information message, to transmit a paging indication (e.g., paging, paging message, notification) for the wireless device via a non-3GPP access network (e.g., WLAN). The AMF may configure to transmit a paging indication (e.g. notification to request/command/indicate the wireless device to access to the second wireless network) at least one of a WLAN, a N3IWF, and/or a wireless access node (e.g., wireless access point, access point). In an example, as shown in FIG. 18, the wireless device may employ an independent transmitter/receiver for the non-3GPP access network (e.g., WLAN). The independent transmitter/receiver for the non- 3GPP access network may be separate from a transmitter/receiver of a 3GPP access network (e.g., the first wireless network, the second wireless network). The non-3GPP access network may employ different frequencies/bands than the 3GPP access network. During the active state at the first wireless network (e.g., active communication with the first wireless network), the wireless device may be able to communicate (e.g., transmit/receive packets) with the second wireless network via the non-3GPP access network (e.g., by employing the independent transmitter/receiver and/or the different frequencies/bands).

In an example, the AMF may configure, based on the first information message, to suspend a paging indication for a service (e.g., delay tolerant service, low priority service, media streaming service) of the wireless device. During the active state of the wireless device at the first wireless network, the AMF may configure to suspend/delay a paging for low priority services (e.g., delay tolerant service, high latency allowable service, high packet loss rate allowable service, etc.; e.g., weather information, entertainment information, advertisement, etc.). The AMF may request/command/indicate a session management function (SMF) to buffer and/or discard data (e.g., packets) associated with the service for which a paging is suspended. The AMF may initiate/transmit a paging for the service of the wireless device after receiving an indication indicating that the wireless device is in an inactive state at the first wireless network.

In an example, the AMF may configure, based on the first information message, to suspend a paging indication for the wireless device. During the active state of the wireless device at the first wireless network, the AMF may configure to suspend/delay a paging for services of the wireless device (e.g., for all data notifications or for all service types; and/or for services except for emergency services). The AMF may request/command/indicate a session management function (SMF) to buffer and/or discard data (e.g., packets) associated with the services. The AMF may initiate/transmit a paging for the services of the wireless device after receiving an indication indicating that the wireless device is in an inactive state at the first wireless network.

In an example, the AMF may configure, based on the first information message, to transmit a paging indication for a service (e.g., voice, high priority service, URLLC, V2X, emergency service, etc.) of the wireless device. During the active state of the wireless device at the first wireless network, the AMF may configure to transmit/initiate (e.g., immediately via the 3GPP access network and/or the non-3GPP access network of the second wireless network) a paging for high priority services (e.g., SMS, voice, URLLC, V2X, emergency service, NAS control signal, etc.; e.g., emergency alert, vehicle control data, vehicle braking assistance signal, remote surgery control data, drone control signal, etc.) of the wireless device. The AMF and/or a base station of the second access network may transmit a paging indication based on the first information message. The AMF and/or the base station of the second access network may transmit the paging indication during the off-duration of the DRX and/or the power saving mode, and/or during the measurement gap of the wireless device at the first wireless network.

In an example, the AMF may configure, based on the first information message, to transmit a paging indication with increased repetitions. During the active state of the wireless device at the first wireless network, the AMF may configure to transmit/initiate (e.g., via the 3GPP access network of the second wireless network) increased repetitions of a paging indication for the wireless device, so that the wireless device has more chances to receive the paging indication while communicating with the first wireless network. The more repeated paging transmissions may increase a probability that a paging occasion for a paging indication happens/occurs at a time resource that is not employed for communication with the first wireless network (e.g., when the wireless device is in the active state at the first wireless network). The increased repetitions of paging indication transmissions may increase a probability that the wireless device successfully receives the paging indication from the second wireless network and/or a base station of the second wireless network during the active state at the first wireless network.

In an example, the AMF may configure, based on the first information message, to transmit a paging indication with a shifted paging cycle (e.g., shifted paging occasion). During the active state of the wireless device at the first wireless network, the AMF may configure to transmit/initiate (e.g., via the 3GPP access network of the second wireless network) a paging indication via a shifted paging occasion (e.g., with a shifted paging cycle) for the wireless device, so that the wireless device has more chances to receive the paging indication while communicating with the first wireless network. The shifted paging transmissions may make a paging occasion for a paging indication to happen/occur at a time resource that is not employed for communication with the first wireless network (e.g., when the wireless device is in the active state at the first wireless network). The AMF and/or a base station of the second wireless network may shift a paging occasion for transmission of a paging indication for the wireless device based on one or more elements of the first information message. In an example, the AMF and/or the base station of the second wireless network may shift a paging occasion to make the paging occasion happen/occur during the off-duration of the DRX and/or the power saving mode, and/or during the measurement gap of the wireless device at the first wireless network.

In an example, the AMF may transmit a first paging indication based on (e.g., in response to) at least one of: determining to transmit signal for the wireless device comprising at least one of a control plane signal and/or a user plane signal; updating the configuration parameters for the second wireless network for the wireless device; receiving, from a session management function, a data notification for the wireless device; and/or the like. The AMF may transmit the first paging indication based on the first paging configurations for the wireless device. During the active state of the wireless device at the first wireless network, the AMF and/or a base station of the second wireless network may transmit the first paging indication based on the first paging configurations: for example, transmit the first paging indication via the non-3GPP access network; suspend/delay transmission of the first paging indication depending on a service associated with the first paging indication; suspend/delay transmission of the first paging indication during the active state; transmit the first paging indication if a service associated with the first paging indication is a high priority service and/or emergency service; transmit the first paging indication with the increased repetitions and/or the shifted paging cycle (e.g., shifted paging occasion); and/or the like.

In an example, the wireless device may receive, from the second wireless network (e.g., the AMF and/or a base station of the second wireless network), the first paging indication. During the active state at the first wireless network, the wireless device may receive, from the second wireless network (e.g., the AMF and/or a base station of the second wireless network), the first paging indication based on the first information message. The wireless device may receive the first paging indication (e.g., notification of a paging; notification of the first paging indication) via at least one of: an access node (e.g., the first access node, a second access node, wireless access node) of a WLAN (e.g., the first WLAN, a second WLAN); and/or a base station (e.g., gNB, eNB, the second base station, a third base station) of the second wireless network.

In an example, in response to receiving the first paging indication, the wireless device may initiate a random access procedure with the second wireless network by sending a random access preamble to a base station of the second wireless network. After completing the random access procedure, the wireless device may receive signal (e.g. downlink data, NAS message, control signal, etc.) from the second wireless network. The wireless device may transmit/receive, to/from the second wireless network, transport blocks based on the first paging indication and/or based on the random access procedure. In an example, the transport blocks (e.g., to/from the second wireless network) may be associated with at least one of: a signaling radio bearer (SRB) (e.g., SRB1, SRB2, SRB3, etc.); and/or a data radio bearer (DRB). The wireless device may transmit/receive, to/from the first wireless network, transport blocks while the wireless device is communicating with the second wireless network.

The wireless device may determine to transition to an inactive state at the first wireless network and/or the first base station. In an example, the wireless device may determine, based on the RRC message and/or configuration updates, that the wireless device is in the inactive state at the first wireless network (e.g., and/or at the first base station). The wireless device may receive a third RRC message comprising the configuration updates. The wireless device may determine the inactive state based on the configuration updates, further indication (e.g., MAC CE, DCI) from the first wireless network and/or the first base station, and/or one or more conditions (e.g., timer expiration). In an example, the wireless device may determine, based on the RRC connection and/or based on release/suspension of the RRC connection, that the wireless device is in the inactive state at the first wireless network. In an example, the wireless device may determine the inactive state based on an inactive communication with the first wireless network and/or the first base station. The wireless device may determine the inactive state in response to inactively communicating with the first wireless network and/or the first base station.

In an example, the wireless device may determine, the transitioning to the inactive state based on at least one of: receiving an RRC release message (e.g. the third RRC message) indicating release or suspension of the RRC connection with the first wireless network. The wireless device may transition, based on the receiving the RRC release message, to at least one of an RRC idle state at the first wireless network and/or an RRC inactive state at the first wireless network.

In an example, the inactive state may comprise at least one of: an RRC idle state during which the wireless device releases the RRC connection with the first base station and/or the first wireless network; an RRC inactive state during which the wireless device suspends the RRC connection with the first base station and/or the first wireless network; a time duration that a DRX is operating (e.g., the DRX is configured and/or setup); an off-duration (e.g., DRX off-time; time duration that is not a DRX on-duration in a DRX cycle) of a DRX when the wireless device employs the DRX; an off-duration of a power saving mode; a time duration that a measurement gap is configured; a time duration during which the wireless device does not employ a service (e.g., voice, URLLC, V2X, emergency service, etc.) (e.g., stop employing the service); an deactivation/dormant state of a first cell (e.g., first carrier, first frequency, first band, first bandwidth part, first beam); a time duration during which the wireless device does not employ a first cell (e.g., first carrier, first frequency, first band, first bandwidth part, first beam) (e.g., the first cell is not configured as a serving cell for the wireless device); and/or the like.

In an example, the wireless device may determine the inactive state in response to transitioning to the RRC idle state. The wireless device may determine the RRC idle state based on receiving the third RRC message (e.g., the RRC release message, an RRC connection release message). The wireless device may determine the RRC idle state based on determining a connection failure (e.g. radio link failure, handover failure) from the first wireless network and/or the first base station. The wireless device may determine the RRC idle state based on expiration of a timer (e.g., T310, RLF timer). During the RRC idle state, the wireless device and/or the first base station (e.g., the first wireless network) may not keep the RRC connection and/or UE contexts of the wireless device for the RRC connection.

In an example, the wireless device may determine the inactive state in response to transitioning to the RRC inactive state. The wireless device may determine the RRC inactive state based on receiving the third RRC message (e.g., the RRC release message, an RRC connection release message). The third RRC message may indicate that the RRC connection is suspended. During the RRC inactive state, the wireless device and/or the first base station (e.g., the first wireless network) may not keep the RRC connection and/or may keep/maintain/store UE contexts of the wireless device for the RRC connection. During the RRC inactive state, the stored UE contexts may not be activated.

In an example, the wireless device may determine the inactive state in response to a DRX (e.g., DRX configurations) being configured, operating, setup, employed, and/or not released for the wireless device. The wireless device may determine the inactive state in response to the DRX (e.g., DRX configurations for communication with the second wireless network) being configured during the RRC connected state at the first wireless network. The wireless device may determine the inactive state in response to receiving an DRX setup/configuration indication from a base station (e.g., the first base station, the first wireless network). In an example, a field (e.g., SetupRelease {DRX-Config}) of an RRC message (e.g., downlink RRC message, the third RRC message) may indicate that the DRX (e.g., DRX-config) is setup/configured.

In an example, the wireless device may determine the inactive state in response to a DRX being off-duration (e.g., DRX off-time duration, sleep mode). The wireless device may determine the inactive state in response to the DRX being in the off-duration (e.g., being not in on-duration and/or being in sleep mode; the off-duration and/or the sleep mode may be for communication with the second wireless network) during the RRC connected state at the first wireless network. The wireless device may determine the off-duration of the DRX based on DRX configuration parameters. The wireless device may receive an RRC message (e.g., a downlink RRC message, the third RRC message) comprising the DRX configuration parameters (e.g., DRX-Config). The wireless device may determine the off-duration of the DRX based on the DRX configuration parameters (e.g., DRX on duration timer, DRX inactivity timer, DRX long-cycle start offset, DRX short-cycle, DRX short-cycle timer, DRX slot offset, and/or system frame number (SFN) 0). The wireless device may determine the off-duration of the DRX in response to receiving an indication (e.g., PDCCH, PDCCH order, DCI, MAC CE, etc.) indicating/commanding starting the off-duration of the DRX (e.g., indication to go to the sleep mode, indication to sleep). The wireless device may receive the indication from a base station (e.g., the first base station and/or the first wireless network). The wireless device may determine the off-duration of the DRX in response to expiration of a timer and/or a cycle for the DRX.

In an example, the wireless device may determine the inactive state in response to a power saving mode (PSM) being off-duration (e.g., PSM off-time duration, sleep mode). The wireless device may determine the inactive state in response to a power saving mode (PSM) being in the off-duration (e.g., being not in on-duration and/or being in sleep mode; the off-duration and/or the sleep mode may be for communication with the second wireless network) during the RRC connected state at the first wireless network. The wireless device may determine the off-duration of the power saving mode based on PSM configuration parameters. The wireless device may receive an RRC message (e.g., a downlink RRC message, the third RRC message) comprising the PSM configuration parameters (e.g., PSM-Config). The wireless device may determine the off-duration of the power saving mode in response to receiving an indication (e.g., go-to-sleep signal (GTSS), PDCCH, PDCCH order, DCI, MAC CE, etc.) indicating/commanding activation/enabling of the power saving mode (e.g., indication to go to the sleep mode, indication to sleep). The wireless device may receive the indication from a base station (e.g., the first base station and/or the first wireless network). The wireless device may determine the off-duration of the power saving mode in response to expiration of a timer for the power saving mode.

In an example, the wireless device may determine the inactive state in response to a measurement gap (e.g., gap, paging gap, monitoring gap, communication gap, etc.) being configured, employed, and/or setup for the wireless device. The wireless device may determine the inactive state in response to the measurement gap being configured/assigned/activated (e.g., setup and/or not released) during the RRC connected state at the first wireless network. The measurement gap may be for communication with the second wireless network. During the measurement gap, the wireless device may not communicate with and/or may limit communication with the first wireless network (e.g., the first base station). The wireless device may receive an RRC message (e.g., a downlink RRC message, the third RRC message) comprising configuration parameters for the measurement gap. The wireless device may determine that the measurement gap is configured/assigned/activated/setup and/or is not released in response to receiving the RRC message comprising configuration parameters (e.g., setup/configuration indication) for the measurement gap. The wireless device may determine that the measurement gap is activated and/or not released in response to receiving an activation indication (e.g., PDCCH, PDCCH order, DCI, MAC CE, etc.) indicating/commanding activation/enabling of the measurement gap. The wireless device may receive the activation indication from a base station (e.g., the first base station and/or the first wireless network).

In an example, the wireless device may determine the inactive state in response to a service (e.g., voice, URLLC, V2X, emergency service, etc.) being not employed/used by the wireless device. The wireless device may receive configuration parameters indicating release/deactivation/suspension of a bearer (e.g., data radio bearer, signaling radio bearer, logical channel, PDU session etc.) associated with the service. The bearer may be configured for a PDU session, a QoS flow, a network slice, and/or a logical channel to provide the service. The wireless device may determine the inactive state in response to the bearer (e.g., PDU session) associated with the service being released/deactivated at the first wireless network and/or the first base station. The wireless device may receive an RRC message (e.g., a downlink RRC message, the third RRC message, a downlink NAS message) comprising the configuration parameters indicating the release of the bearer (e.g., to release the bearer and/or the PDU session). The wireless device may determine the inactive state based on stop transmitting/receiving transport blocks of the bearer (e.g., the PDU session) associated with the service.

In an example, the wireless device may determine the inactive state in response to a first cell (e.g., first carrier, first frequency, first band, first bandwidth part, first beam) being deactivated (e.g., being in a deactivated/inactive state) for the wireless device. The wireless device may determine the inactive state in response to receiving a deactivation indication (e.g., MAC CE, RRC message) indicating deactivation of the first cell (e.g., the first carrier) associated with the first frequency and/or the first band. The wireless device may determine the inactive state in response to expiration of a timer for deactivation of the first cell. The wireless device may determine the inactive state in response to receiving an indication (e.g., MAC CE, PDCCH, DCI, RRC message, etc.) indicating switching from (e.g., or deactivating, changing from, and/or transitioning from; switching to another bandwidth part from) the first bandwidth part of the first cell (e.g., the first carrier) associated with the first frequency and/or the first band. In an example, the first bandwidth part may be associated with the first frequency and/or the first band. The wireless device may determine the inactive state in response to expiration of a timer (e.g., inactivity timer, activity timer) for switching from (e.g., switching to another bandwidth part from) the first bandwidth part of the first cell. The wireless device may determine the inactive state in response to receiving an indication (e.g., MAC CE, PDCCH, DCI, RRC message, etc.) indicating switching from (e.g., or changing from, activating, and/or transitioning from; switching to another beam from) the first beam of the first cell (e.g., the first carrier) associated with the first frequency and/or the first band. The wireless device may determine the inactive state in response to expiration of a timer (e.g., beam failure timer, inactivity timer, activity timer) for switching from (e.g., switching to another beam from) the first beam of the first cell. The wireless device may determine the inactive state based on (e.g., in response to) a beam failure of the first beam of the first cell.

In an example, the wireless device may determine the inactive state in response to a first cell (e.g., first carrier, first frequency, first band, first bandwidth part, first beam) being in a dormant state for the wireless device. The wireless device may determine the inactive state in response to receiving an indication (e.g., MAC CE, RRC message, DCI, PDCCH) indicating transitioning, to the dormant state, the first cell (e.g., the first carrier) associated with the first frequency and/or the first band. The wireless device may determine the inactive state in response to expiration of a timer for transition to the dormant state for the first cell.

In an example, the wireless device may determine the inactive state in response to a first cell (e.g., first carrier, first frequency, first band, first bandwidth part, first beam) being not used and/or not employed by the wireless device (e.g., the first cell/beam being configured as a non-serving cell/beam of the wireless device) (e.g., the first bandwidth part being configured as an inactive/non-serving bandwidth part of the wireless device). The wireless device may determine the inactive state in response to receiving configuration parameters (e.g., via an RRC message, a downlink RRC message, and/or the third RRC message) indicating releasing/removing the first cell (e.g., the first carrier) associated with the first frequency and/or the first band. The wireless device may determine the inactive state in response to receiving configuration parameters (e.g., via an RRC message, a downlink RRC message, and/or the third RRC message) indicating releasing/removing the first bandwidth part and/or the first beam of the first cell (e.g., the first carrier) associated with the first frequency and/or the first band. In an example, the first bandwidth part may be associated with the first frequency and/or the first band.

The wireless device may or may not transmit/receive, to/from the first wireless network and/or the first base station, transport blocks during the inactive state. The wireless device may transmit/receive transport blocks based on configurations associated with the inactive state (e.g., based on at least one of the RRC connection, the DRX configuration being configured/setup, the DRX off-duration time, the PSM off-duration time, the measurement gap being configured/setup, the unemployment of the service (e.g., voice, URLLC, V2X, emergency service, etc.), the deactivation/dormant-state of the first cell/first bandwidth part/first beam, the unemployment/release of the cell/first bandwidth part/first beam, etc.).

In an example, the wireless device may transmit/send a second information message to the second wireless network (e.g., the AMF of the second wireless network) and based on the RRC connection and/or based on the determining the inactive state. In an example, the wireless device may transmit/send the second information message to the second wireless network in response to determining the inactive state and/or determining the transitioning to the inactive state. The second information message may indicate that the wireless device is in the inactive state at the first wireless network (e.g., and/or at the first base station). The wireless device may transmit, to the second wireless network (e.g., the AMF of the second wireless network), the second information message based on the determining that the wireless device is in the inactive state at the first wireless network (e.g., and/or at the first base station). The wireless device may transmit the second information message to the AMF and/or the second wireless network via the second access node (e.g., the second access point). The wireless device may transmit the second information message to the second access node, and/or the second access node may transmit/forward/send the second information message to the AMF and/or the second wireless network (e.g., via an N3IWF). The second access node may be/comprise the second access point (AP). The second access node may be/comprise the second access point (AP) of the second WLAN. The second WLAN may comprise the second access node (e.g., the second access point). The second access node may transmit the second information message to the N3IWF, and/or the N3IWF may transmit/forward/send the second information message to the AMF and/or the second wireless network. In an example, the wireless device may transmit, to the second access node (e.g., the second access point) of the second WLAN and based on the RRC connection and/or based on determining the inactive state, the second information message. In an example, the second access node may be the first access node. In an example, the second access point may be the first access point. In an example, the second WLAN may be the first WLAN.

In an example, the wireless device may transmit/send, to a third base station (e.g., third gNB) of the second wireless network and based on the RRC connection and/or based on the determining the inactive state at the first wireless network, the second information message indicating that the wireless device is in the inactive state at the first wireless network. The third base station may transmit/forward/send the second information message to the AMF and/or the second wireless network. In an example, the third base station may be the second base station.

In an example, the second information message may be for the second wireless network. In an example, the second information message may comprise a non-access stratum (NAS) message (e.g., AM-NAS, MM-NAS, SM-NAS, etc.) for the second wireless network. The second information message may be for the second wireless network to configure parameters for the wireless device.

The second information message may indicate that the wireless device is (e.g., at the first wireless network and/or the first base station) in at least one of: the RRC idle state; the RRC inactive state during which the wireless device and/or the first base station may not have/maintain/keep the RRC connection with each other and/or may keep context for the RRC connection; the time duration that the DRX is operating (e.g., the DRX is configured and/or setup); the off-duration (e.g., DRX off-time) of the DRX when the wireless device employs the DRX; the off-duration of the power saving mode; the time duration that the measurement gap is configured and/or is setup; the time duration during which the wireless device does not employ the service (e.g., voice, URLLC, V2X, emergency service, etc.); the deactivation/inactivation/dormant state of the first cell (e.g., first carrier, first frequency, first band, first bandwidth part, first beam); the time duration during which the wireless device does not employ the first cell (e.g., first carrier, first frequency, first band, first bandwidth part, first beam) (e.g., the first cell is not a serving cell of the wireless device); and/or the like.

The second information message may comprise a time value indicating a duration and/or a termination/end/starting timing of at least one of: the RRC idle state; the RRC inactive state during which the wireless device and/or the first base station may not have/maintain/keep the RRC connection with each other and/or may keep context for the RRC connection; the time duration that the DRX is operating (e.g., the DRX is configured and/or setup); the off-duration (e.g., DRX off-time) of the DRX when the wireless device employs the DRX; the off-duration of the power saving mode; the time duration that the measurement gap is configured and/or is setup; the time duration during which the wireless device does not employ the service (e.g., voice, URLLC, V2X, emergency service, etc.); the deactivation/inactivation/dormant state of the first cell (e.g., first carrier, first frequency, first band, first bandwidth part, first beam); the time duration during which the wireless device does not employ the first cell (e.g., first carrier, first frequency, first band, first bandwidth part, first beam) (e.g., the first cell is not a serving cell of the wireless device); and/or the like.

The second information message may comprise at least one of: at least one element of the RRC configuration parameters of the second RRC message and/or the third RRC message, at least one element of the DRX configuration parameters for the DRX (e.g., DRX cycle, DRX offset, DRX on-duration period, DRX off-duration period, etc.), at least one element of the configuration parameters for the power saving mode, the configuration parameters for the measurement gap, at least one element of the cell configuration parameters for the one or more cells and/or the first cell (e.g., bandwidth information, frequency information, frequency offset information, carrier information, band information, beam configuration parameters, and/or bandwidth part configuration parameters (e.g., bandwidth/frequency/frequency-offset of a bandwidth part) of the one or more cells), service type information (e.g., network slice identifier (e.g., NSSAI, S-NSSAI), service identifier, service type identifier, etc.) of the service (e.g., voice, URLLC, V2X, emergency service, etc.), second service type information (e.g., network slice identifier (e.g., NSSAI, S-NSSAI), service identifier, service type identifier, etc.) of a second service (e.g., delay tolerant service, high latency allowable service, high packet loss rate allowable service, etc.; e.g., weather information, entertainment information, advertisement, etc.), and/or the like. The second service may be a service that the wireless device employs at the first wireless network during the inactive state at the first wireless network.

In an example, the second information message may further comprise at least one of: service type information (e.g., service identifier, network slice identifier, S-NSSAI, NSSAI, etc.) of a service (e.g., voice call, emergency service, media streaming service, delay tolerant service, web browsing service, URLLC service, V2X service, etc.) that is allowable/configurable with the second wireless network during the inactive state at the first wireless network and/or the first base station; service type information (e.g., service identifier, network slice identifier, S-NSSAI, NSSAI, etc.) of the service that the wireless device employs/uses at the first wireless network; a public land mobile network (PLMN) identifier indicating the first PLMN of the first wireless network; a field indicating that the wireless device employs multiple SIMs and/or dual SIM; information of a band (e.g., carrier, frequency, bandwidth, etc.) that the wireless device employs for communication with the first wireless network and/or the first base station; information of a band (e.g., carrier, frequency, bandwidth, etc.) that the wireless device is available for communication with the second wireless network during the inactive state at the first wireless network and/or the first base station; and/or the like.

In an example, the AMF may determine, based on the second information message, second paging configurations of a paging procedure for the wireless device. The paging procedure may be to request/command/indicate the wireless device to access to the second wireless network (e.g., via a 3GPP access network). The second paging configurations may comprise at least one of: configuring to transmit a paging indication for the wireless device via at least one of a 3GPP access network (e.g., base station, gNB, eNB, etc.) and/or a wireless access node (e.g., wireless access point, access point, WLAN); configuring to transmit a paging indication (e.g., paging) for a service (e.g., low priority service, media streaming service, voice service, high priority service, URLLC service, V2X service, web browsing service, delay tolerant service, emergency service, etc.) of the wireless device; configuring to transmit a paging indication for the wireless device; configuring to transmit a paging indication with unincreased repetitions (e.g., not increased repetitions, normal repetitions, repetitions before configuring based on the first paging in information message, repetitions before the first paging configuration); configuring to transmit a paging indication with an unshifted paging cycle (e.g., not shifted paging cycle, normal paging cycle, paging cycle before configuring based on the first paging in information message, paging cycle before the first paging configuration) or with a shifted paging cycle for the off-duration of the DRX and/or the power saving mode or for the measurement gap; and/or the like.

In an example, the AMF may determine, based on the second information message, that the wireless device may receive (e.g., receive and response (e.g., perform random access procedure), or can receive due to inactive communication with the first wireless network, etc.) a paging via a base station (e.g., 3rd generation partnership project (3GPP) access network, gNB, eNB, etc.) due to the inactive state at the first wireless network and/or the first base station. In an example, the AMF may determine that the wireless device may be able to communicate with the second wireless network via the 3GPP access network during the inactive state at the first wireless network (e.g., inactive communication with the first wireless network) when the wireless device has/comprise a limited number of transmitter and receiver, as shown in FIG. 17.

In an example, the AMF may configure, based on the second information message, to transmit a paging indication (e.g., paging, paging message, notification) for the wireless device via a 3GPP access network (e.g., base station, gNB, eNB, etc.) and/or a non-3GPP access network (e.g., WLAN). The AMF may configure to transmit a paging indication (e.g. paging message, paging, notification to request/command/ indicate the wireless device to access to the second wireless network) at least one of a 3GPP access network, a base station (e.g., gNB, eNB), a WLAN, a N3IWF, and/or a wireless access node (e.g., wireless access point, access point). During the inactive state at the first wireless network (e.g., inactive communication with the first wireless network), the wireless device may be able to communicate (e.g., transmit/receive packets) with the second wireless network via the 3GPP access network and/or the non-3GPP access network.

In an example, the AMF may configure, based on the second information message, to transmit a paging indication for a service (e.g., delay tolerant service, low priority service, media streaming service, URLLC service, voice service, low priority service, high priority service, V2X service, SMS, emergency service, NAS control signal, etc.; e.g., weather information, emergency alert, vehicle control data, vehicle braking assistance signal, remote surgery control data, drone control signal, etc.) of the wireless device. During the inactive state of the wireless device at the first wireless network, the AMF may configure to transmit (e.g., immediately, without delaying/suspending) a paging for low priority services (e.g., delay tolerant service, high latency allowable service, high packet loss rate allowable service, etc.; e.g., weather information, entertainment information, advertisement, etc.). In an example, the AMF may configure, based on the second information message, to transmit a paging indication for the wireless device. During the inactive state of the wireless device at the first wireless network, the AMF may configure to transmit a paging for services of the wireless device (e.g., for all data notifications or for all service types; and/or for services including emergency services). The AMF and/or a base station of the second access network may transmit a paging indication based on the second information message. The AMF and/or the base station of the second access network may transmit the paging indication during the RRC idle state, the RRC inactive state, the off-duration of the DRX and/or the power saving mode, and/or during the measurement gap of the wireless device at the first wireless network.

In an example, the AMF may configure, based on the second information message, to transmit a paging indication with unincreased repetitions. During the inactive state of the wireless device at the first wireless network, the AMF may configure to transmit/initiate (e.g., via the 3GPP access network of the second wireless network) unincreased repetitions of a paging indication for the wireless device. The wireless device in the inactive state at the first wireless network may be able to reliably receive the paging indication from the second wireless network without increased repetition of paging transmissions. With the unincreased paging transmissions, the wireless device may have high probability that a paging occasion for a paging indication from the second wireless network happens/occurs at a time resource that is not employed for communication with the first wireless network (e.g., due to the inactive state at the first wireless network).

In an example, the AMF may configure, based on the second information message, to transmit a paging indication with an unshifted paging cycle (e.g., unshifted paging occasion). During the inactive state of the wireless device at the first wireless network, the AMF may configure to transmit/initiate (e.g., via the 3GPP access network of the second wireless network) a paging indication via an unshifted paging occasion (e.g., with an unshifted paging cycle) for the wireless device. The wireless device in the inactive state at the first wireless network may be able to reliably receive the paging indication from the second wireless network without a shifted paging occasion for paging transmissions (e.g., due to the inactive state at the first wireless network). In an example, if the inactive state is associated with the off-duration of the DRX and/or the power saving mode or the measurement gap configured, the AMF and/or a base station of the second wireless network may shift, based on the second information message, paging occasions for paging transmissions to make the shifted paging occasions happen/occur at a time resource (e.g., during the off-duration of the DRX and/or the power saving mode or during the measurement gap configured at the first wireless network) that is not employed by the wireless device for communication with the first wireless network.

In an example, the AMF may transmit a second paging indication based on (e.g., in response to) at least one of: determining to transmit signal for the wireless device comprising at least one of a control plane signal and/or a user plane signal; updating the configuration parameters for the second wireless network for the wireless device; receiving (e.g., from an SMF) a data notification for the wireless device; and/or the like. The AMF may transmit the second paging indication based on the second paging configurations for the wireless device. During the inactive state of the wireless device at the first wireless network, the AMF and/or a base station of the second wireless network may transmit the second paging indication based on the second paging configurations: for example, transmit the second paging indication via the 3GPP access network and/or the non-3GPP access network; immediately (e.g., without suspending/delaying) transmit the second paging indication; transmit the second paging indication when a service associated with the second paging indication is a low/medium and/or high priority service, an emergency service, and/or a delay tolerant service; transmit the second paging indication with the unincreased repetitions and/or the unshifted paging cycle (e.g., unshifted paging occasion; and/or shifted paging occasion corresponding to the off-duration of the DRX and/or the power saving mode or corresponding to the measurement gap); and/or the like.

In an example, the wireless device may receive, from the second wireless network (e.g., the AMF and/or a base station of the second wireless network), the second paging indication. During the inactive state at the first wireless network, the wireless device may receive, from the second wireless network (e.g., the AMF and/or a base station of the second wireless network), the second paging indication based on the second information message. The wireless device may receive the second paging indication (e.g., notification of a paging; notification of the first paging indication) via at least one of: an access node (e.g., the first access node, a second access node, wireless access node) of a WLAN (e.g., the first WLAN, a second WLAN); and/or a base station (e.g., gNB, eNB, the second base station, the third base station) of the second wireless network.

In an example, in response to receiving the second paging indication, the wireless device may initiate a random access procedure with the second wireless network by sending a random access preamble to a base station of the second wireless network. After completing the random access procedure, the wireless device may receive signal (e.g. downlink data, NAS message, control signal, etc.) from the second wireless network. The wireless device may transmit/receive, to/from the second wireless network, transport blocks based on the second paging indication and/or based on the random access procedure. In an example, the transport blocks (e.g., to/from the second wireless network) may be associated with at least one of: a signaling radio bearer (SRB) (e.g., SRB1, SRB2, SRB3, etc.); and/or a data radio bearer (DRB). The wireless device may transmit/receive, to/from the first wireless network, transport blocks while the wireless device is (e.g., inactively) communicating with the second wireless network.

In an example, the AMF of the second wireless network may transmit/send, to the wireless device, configuration parameters for the second wireless network. The configuration parameters may be NAS layer configuration parameters for connection and/or registration of the wireless device. The AMF may transmit, to the wireless device, a NAS message (e.g., registration accept message, PDU session update SM context response message, etc.) comprising the NAS layer configuration parameters. The wireless device may send, to the AMF, an uplink NAS message (e.g., registration request/complete message, PDU session update SM context request/complete message, etc.) for the connection and/or the registration. In an example, the NAS message and/or the uplink NAS message may be transmitted via a base station. The AMF may receive, from the wireless device, the first information message indicating that the wireless device is in the active state at the first wireless network. The AMF may determine, based on the first information message, the first paging configurations for the wireless device. The AMF may transmit the first paging indication for the wireless device based on the first paging configurations. The AMF may receive, from the wireless device, the second information message indicating that the wireless device is in the inactive state at the first wireless network. The AMF may determine, based on the second information message, the second paging configurations for the wireless device. The AMF may transmit the second paging indication for the wireless device based on the second paging configurations. In an example, the AMF may receive the first information message via the first access node of the first WLAN of the second wireless network. In an example, the AMF may receive the second information message via the second access node (e.g., the second access node may be the first access node) of the second WLAN of the second wireless network (e.g., the second WLAN may be the first WLAN).

Figure 23:
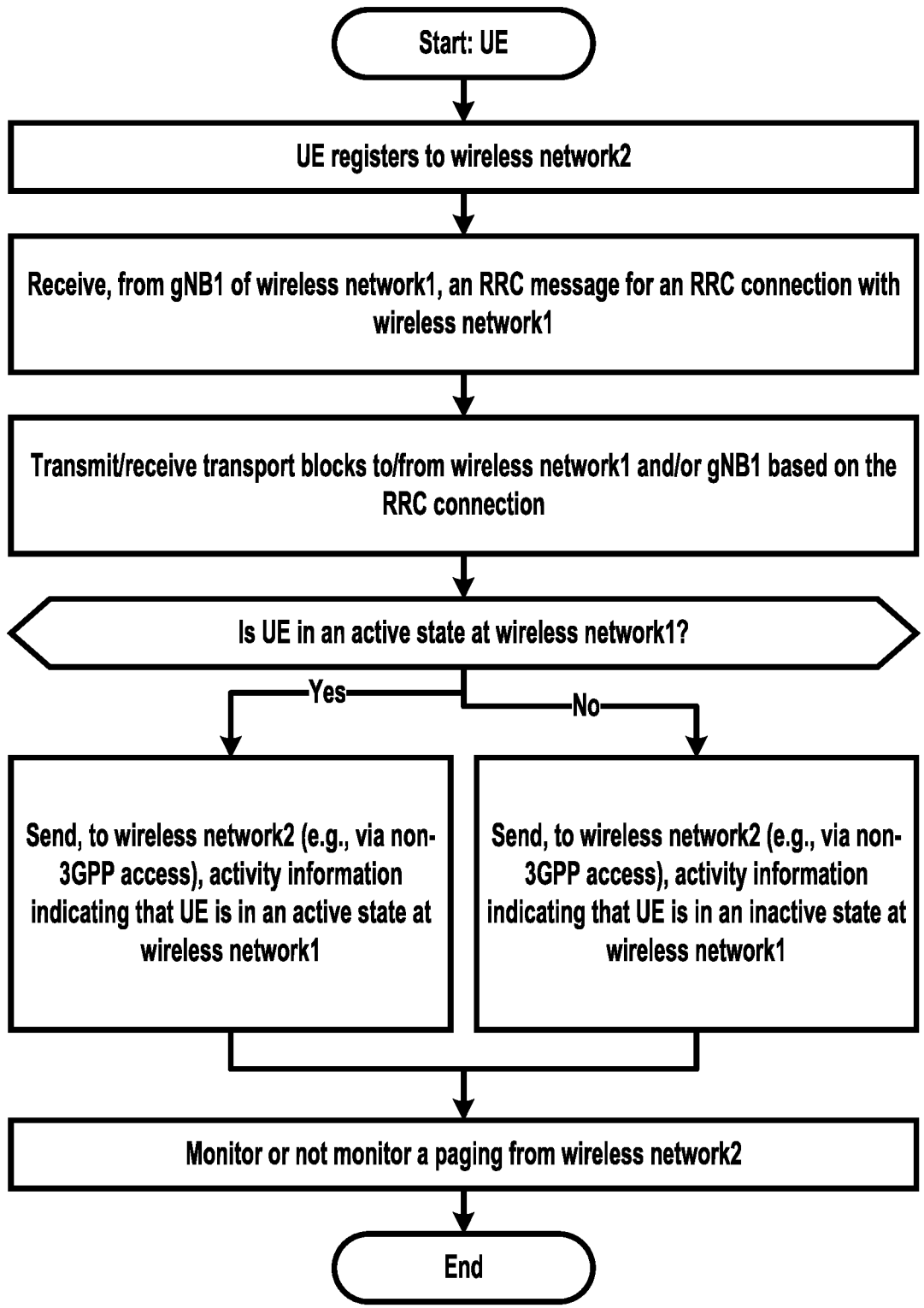
FIG. 23 is an example diagram of an aspect of an embodiment of the present disclosure.
Figure 24:
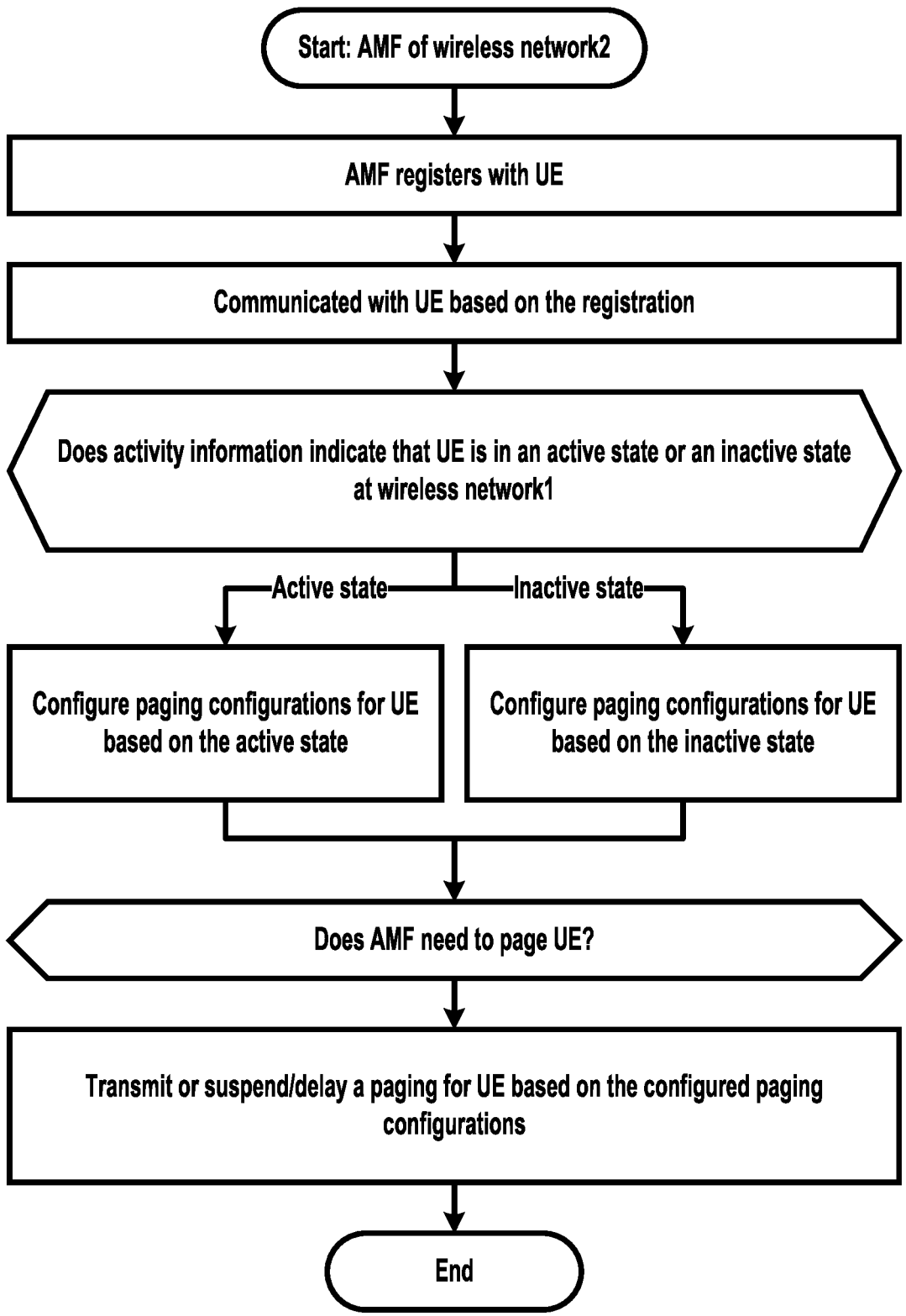
FIG. 24 is an example diagram of an aspect of an embodiment of the present disclosure.
Figure 25:
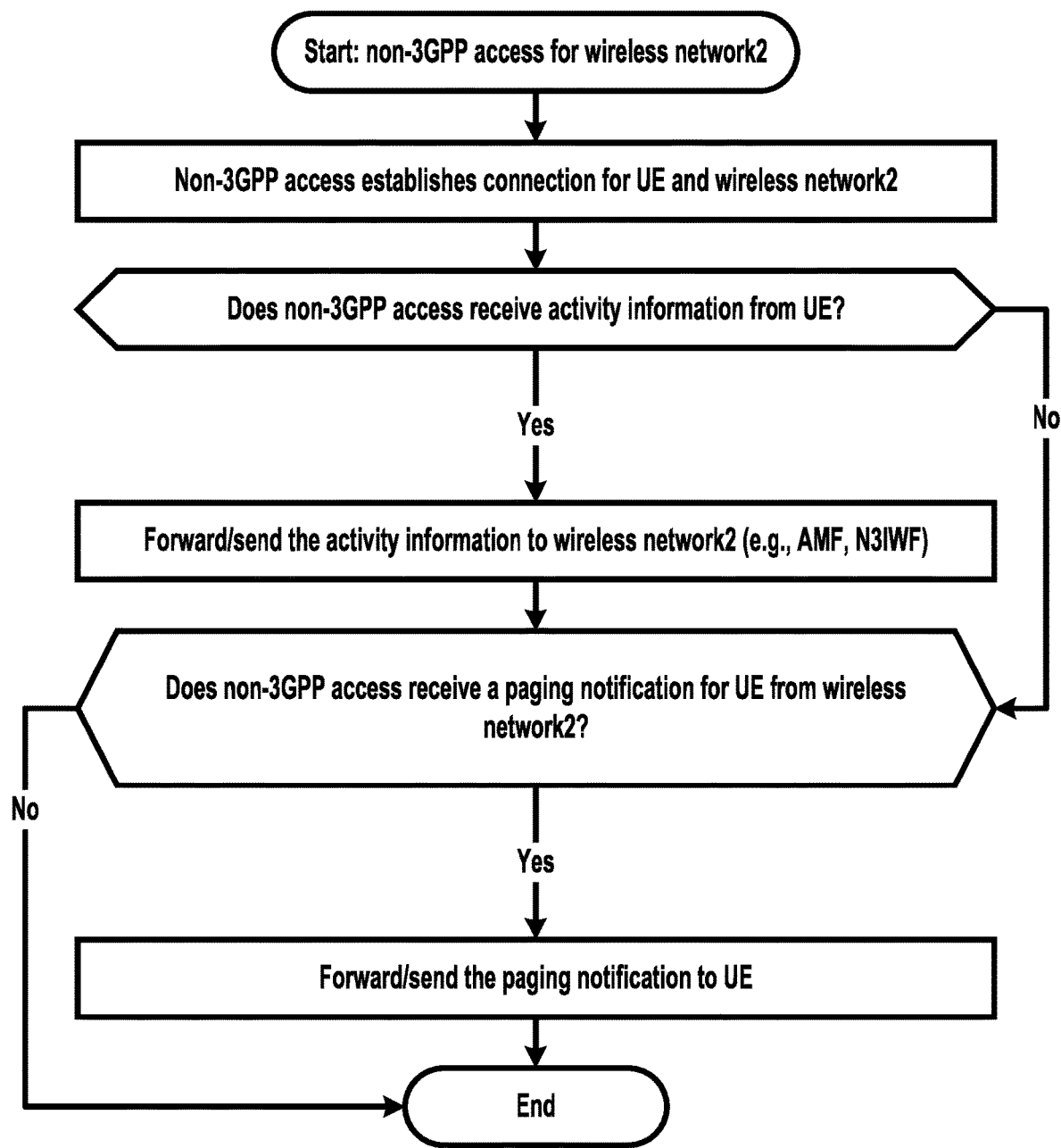
FIG. 25 is an example diagram of an aspect of an embodiment of the present disclosure.

In an example, as shown in FIG. 23, FIG. 24, and/or FIG. 25, a wireless device may transmit a radio resource control (RRC) message for a radio resource control connection with a first wireless network (e.g., first PLMN, first system, etc.). The wireless device may transmit, to a first access node (e.g., first access point) of a first wireless local area network (WLAN) and based on the radio resource control connection, a first information message indicating that the wireless device is in an active state at the first wireless network. The wireless device may transmit, to the first wireless network, transport blocks based on the radio resource control connection. The wireless device may determine to transition to an inactive state at the first wireless network. The wireless device may transmit, to a second access node (e.g. the second access node may be the first access node) of a second wireless local area network (WLAN) (e.g., the second WLAN may be the first WLAN) and based on the determining, a second information message indicating that the wireless device is in the inactive state at the first wireless network.

In an example, the wireless device may support at least one subscriber identity module (SIM). The at least one SIM may comprise at least one of: a first SIM for communication with the first wireless network; or a second SIM for communication with a second wireless network. The first wireless network may comprise at least one of: a first public land mobile network (PLMN); a first radio access technology (e.g., system, network); a first 5th generation wireless network; a first long-term evolution wireless network; and/or a first universal mobile telecommunications service wireless network. In an example, the transmitting the radio resource control message may comprise transmitting the radio resource control message to a first base station of the first wireless network. In an example, the first access node may comprise at least one of: a wireless access point; and/or a Wi-Fi router. In an example, the first information message may be for a second wireless network. In an example, the first wireless local area network (WLAN) may be connected to the second wireless network. The second wireless network may comprise at least one of: the first wireless local area network (WLAN) and/or the first access node. In an example, the second wireless network may comprise at least one of: a second public land mobile network (PLMN); a second radio access technology (e.g., system, network); a second 5th generation wireless network; a second long-term evolution wireless network; and/or a second universal mobile telecommunications service wireless network.

In an example, the first access node may forward/send the first information message to an access and mobility management function (AMF) of the second wireless network. In an example, the AMF may determine, based on the first information message, first paging configurations for the wireless device. The first paging configurations may comprise at least one of: configuring to transmit a paging indication for the wireless device via at least one of a wireless local area network, a non-3rd generation partnership project interworking function (N3IWF), and/or a wireless access node (e.g., access point); configuring to suspend a paging for a service (e.g., delay tolerant service, low priority service) of the wireless device; configuring to transmit a paging indication for a service (e.g., voice, URLLC, V2X, emergency service, etc.); configuring to transmit a paging indication with increased repetitions; configuring to transmit a paging indication with shifted a paging cycle; and/or the like. In an example, the first information message may comprise a non-access stratum (NAS) message for the second wireless network.

In an example, the wireless device may receive, from the second wireless network, a paging indication based on the first information message and/or the second information message. The wireless device may receive the paging indication via at least one of: an access node (e.g., the first access node, the second access node) of a wireless local area network (e.g., the first WLAN, the second WLAN); and/or a base station (e.g., gNB, eNB) of the second wireless network.

In an example, the first information message may further comprise at least one of: service type information of a service (e.g., voice call, emergency service) that is allowable with the second wireless network during the active state at the first wireless network; service type information of a service that the wireless device employs at the first wireless network; a public land mobile network (PLMN) identifier indicating a first PLMN of the first wireless network; a field indicating that the wireless device employs multiple subscriber identity modules; information of a band (e.g., carrier, frequency) that the wireless device employs for communication with the first wireless network; information of a band (e.g., carrier, frequency) that the wireless device is available for communication with a second wireless network during the active state at the first wireless network; and/or the like.

In an example, the active state may comprise at least one of: a radio resource control connected state; a time duration that a discontinuous reception (DRX) is not operating; an on-duration of a DRX when the wireless device employs the DRX; an on-duration of a power saving mode; a time duration that a measurement gap is not configured and/or is released; a time duration that the wireless device employs a service (e.g., voice, URLLC, V2X, emergency service, etc.); an activation state of a first cell (e.g., first carrier, first bandwidth part, first beam); a time duration of that the wireless device employs a first cell (e.g., first carrier, first bandwidth part, first beam); and/or the like. In an example, the transport blocks may be associated with at least one of: a signaling radio bearer (SRB); and/or a data radio bearer (DRB).

In an example, the wireless device may determine, the transitioning to the inactive state based on at least one of: receiving a radio resource control (RRC) release message indicating release or suspension of the radio resource control connection with the first wireless network; transitioning to a time duration that a discontinuous reception (DRX) is operating; transitioning to an off-duration of a DRX when the wireless device employs the DRX; transitioning to an off-duration of a power saving mode; transitioning to a time duration that a measurement gap is configured; stopping employing a service (e.g., voice, URLLC, V2X, emergency service, etc.); transitioning a first cell (e.g., first carrier, first bandwidth part, first beam) to a deactivation state; transitioning a first cell (e.g., first carrier, first bandwidth part, first beam) to a dormant state; stopping employing a first cell (e.g., first carrier, first bandwidth part, first beam); and/or the like. In an example, the wireless device may transition, based on the receiving the radio resource control release message, to at least one of: a radio resource control idle state at the first wireless network; and/or a radio resource control inactive state at the first wireless network.

In an example, the second access node may be the first access node. In an example, the second wireless local area network may be the first wireless local area network. In an example, the second information message may be for the second wireless network. In an example, the second wireless local area network may be connected to the second wireless network. In an example, the second wireless network may comprise at least one of: the second wireless local area network and/or the second access node. In an example, the second access node may forward/send the second information message to an access and mobility management function (AMF) of the second wireless network. In an example, the AMF may determine, based on the second information message, second paging configurations for the wireless device. The second paging configurations may comprise at least one of: configuring to transmit a paging indication for the wireless device via at least one of a 3rd generation partnership project (3GPP) access node, a base station, and/or a next generation node-b (gNB); configuring to transmit a paging for a service (e.g., delay tolerant service, low priority service) of the wireless device; configuring to transmit a paging indication for a service (e.g., voice, URLLC, V2X, emergency service, etc.); configuring to transmit a paging indication with unincreased repetitions; configuring to transmit a paging indication with unshifted paging cycle; and/or the like.

In an example, the second information message may comprise a non-access stratum (NAS) message for the second wireless network. In an example, the second information message may further comprise at least one of: service type information of a service (e.g., delay tolerant service, IoT service, voice call, emergency service, media streaming, etc.) that is allowable with the second wireless network during the inactive state at the first wireless network; service type information of a service that the wireless device employs at the first wireless network; a public land mobile network (PLMN) identifier indicating a first PLMN of the first wireless network; a field indicating that the wireless device employs multiple subscriber identity modules; information of a band (e.g., carrier, frequency) that the wireless device employs for communication with the first wireless network; information of a band (e.g., carrier, frequency) that the wireless device is available for communication with a second wireless network during the inactive state at the first wireless network; and/or the like.

In an example, the wireless device may receive a second radio resource control (RRC) message for the radio resource control connection. The second radio resource control message may comprise at least one of: a radio resource control setup message; a radio resource control resume message; a radio resource control reestablishment message; a radio resource control reconfiguration message; a radio resource control connection setup message; a radio resource control connection resume message; a radio resource control connection reestablishment message; and/or a radio resource control connection reconfiguration message. In an example, the radio resource control message may comprise at least one of: a radio resource control setup request message; a radio resource control complete message; a radio resource control resume request message; a radio resource control resume complete message; a radio resource control reestablishment request message; a radio resource control reestablishment complete message; and/or a radio resource control reconfiguration complete message. In an example, the radio resource control message may comprise at least one of: a radio resource control connection setup request message; a radio resource control connection complete message; a radio resource control connection resume request message; a radio resource control connection resume complete message; a radio resource control connection reestablishment request message; a radio resource control connection reestablishment complete message; and/or a radio resource control connection reconfiguration complete message.

In an example, an access and mobility management function (AMF) of a second wireless network may transmit, to a wireless device, configuration parameters for the second wireless network. The AMF may receive, from the wireless device, a first information message indicating that the wireless device is in an active state at a first wireless network. The AMF may determine, based on the first information message, first paging configurations for the wireless device. The AMF may transmit a first paging indication for the wireless device based on the first paging configurations. The AMF may receive, from the wireless device, a second information message indicating that the wireless device is in an inactive state at the first wireless network. The AMF may determine, based on the second information message, second paging configurations for the wireless device. The AMF may transmit a second paging indication for the wireless device based on the second paging configurations. In an example, the AMF may receive the first information message via a first access node of a first wireless local area network (WLAN). In an example, the AMF may receive the second information message via a second access node (e.g., the second access node may be the first access node) of a second wireless local area network (WLAN) (e.g., the second WLAN may be the first WLAN).

In an example, the first paging configurations may comprise at least one of: configuring to transmit a paging indication for the wireless device via at least one of a wireless local area network, a non-3rd generation partnership project (3GPP) interworking function (N3IWF), and/or a wireless access node (e.g., access point); configuring to suspend a paging for a service (e.g., delay tolerant service, low priority service) of the wireless device; configuring to transmit a paging indication for a service (e.g., voice, URLLC, V2X, emergency service, etc.); configuring to transmit a paging indication with increased repetitions; configuring to transmit a paging indication with shifted a paging cycle; and/or the like. In an example, the second paging configurations may comprise at least one of: configuring to transmit a paging indication for the wireless device via at least one of a 3rd generation partnership project (3GPP) access node, a base station, and/or a next generation node-b (gNB); configuring to transmit a paging for a service (e.g., delay tolerant service, low priority service) of the wireless device; configuring to transmit a paging indication for a service (e.g., voice, URLLC, V2X, emergency service, etc.); configuring to transmit a paging indication with unincreased repetitions; configuring to transmit a paging indication with unshifted paging cycle; and/or the like.

In an example, the AMF may transmit the first paging indication or the second paging indication based on at least one of: determining to transmit signal for the wireless device comprising at least one of a control plane signal and/or a user plane signal; updating the configuration parameters for the second wireless network for the wireless device; receiving, from a session management function, a data notification for the wireless device; and/or the like.

In an example, a wireless device may send/transmit a radio resource control message for a radio resource control connection with a first wireless network. The wireless device may send/transmit, to a first access node of a first wireless local area network and based on the radio resource control connection, a first information message indicating that the wireless device is in an active state at the first wireless network. The wireless device may transmit, to the first wireless network, transport blocks based on the radio resource control connection.

In an example, a wireless device may send/transmit a radio resource control message for a radio resource control connection with a first wireless network. The wireless device may determine transitioning, based on the radio resource control connection, to an inactive state at the first wireless network. The wireless device may transmit, to a second access node of a second wireless local area network and based on the determining, a second information message indicating that the wireless device is in the inactive state at the first wireless network.

In existing technologies, a wireless device (e.g., configured with multiple subscriber identity modules (SIMs)) may not be able to perform an area update procedure with a first system (e.g., first wireless network, first PLMN, first access technology, etc.) while the wireless device is actively communicating with a second system (e.g., second wireless network, second public land mobile network (PLMN), second access technology, etc.). If the wireless device suspends or is not able to perform an area update procedure for the first system, the first system may fail to successfully page the wireless device because the first system may transmit paging indications over an improper area (e.g., an old area that the wireless device is no longer located in). Failure of paging procedures may decrease resource utilization and service reliability of the first system.

Embodiments of the present disclosure may provide enhanced signaling mechanisms for wireless devices that support simultaneous communications with multiple systems to increase resource utilization and service reliability. In an embodiment, a wireless device may inform a first system (e.g., first wireless network, first PLMN, first access technology, etc.) whether the wireless device suspends an area update procedure for the first system. In an example, the wireless device may inform the first system, via an alternative access technology (e.g., a non-3GPP network, WLAN, etc.), whether the wireless device suspends the area update procedure for the first system. The first system may use the suspension information from the wireless device to determine or adjust signal transmissions to the wireless device. These and other features of the present disclosure are described further below.

In an example, wireless devices may support more than one SIM card (e.g., two). A dual SIM may be interpreted as a multi SIM, and vice versa. Multi SIM devices may address example use cases: the user has both a personal and a business subscription and wishes to use them both from the same device (e.g., this use case may become popular with bring-your-own-device (BYOD) initiatives); and/or a user has multiple personal subscriptions and chooses which one to use based on the selected service (e.g., use one individual subscription and one "family circle" plan). In at least one of the example use cases, SIMs may be from the same or from different mobile network operators (MNOs).

Multi SIM devices may support a variety of implementations and/or behaviors (e.g., Dual SIM Single Standby, Dual SIM Dual Standby, Dual SIM Dual Active, etc.). An implementation of a multi SIM device may use common radio and/or baseband components that may be shared among the multiple SIMs of the multi-SIM device. In an example, while actively communicating with a first system, a wireless device (e.g., the multi-SIM device) may need to occasionally check for communications or signals from a second system (e.g., to read a paging channel, perform measurements, and/or read system information) and/or communicate with the second system. This occasional activity on the second system may or may not have a performance impact (e.g., due to interference issues and/or limited number of transceiver), depending on implementation of wireless device.

Paging Occasions (POs) may be calculated based on a UE identifier (IMSI and/or 5G-S-TMSI for EPS and/or 5GS, respectively). When a UE receives a page on a second system (the second wireless network), a UE may need to decide whether to respond to the page (e.g. based on user-configured rules). In an absence of information indicating a service type that triggered the page, the UE may blindly decide whether to ignore the page or respond to the page.

When a UE decides to respond to the page in a second system, or when a UE needs to perform signaling activity in a second system (e.g. Periodic Mobility Registration Update), the UE may need to stop a current activity in a first system. In an absence of a procedure for suspension of an ongoing activity (e.g. the signaling activity and/or the current activity), the UE may autonomously release an RRC connection with the first system and abruptly leave. This may be interpreted as an error case by the first system and/or may distort statistics in the first system, and/or may misguide algorithms that rely on the statistics. During UE's absence, the first system may keep paging the UE which may result in waste of paging resources.

In an example, Dual-SIM Dual-Standby (DSDS) terminals may be registered in two networks simultaneously, and/or may use a single radio front-end and/or a single baseband chain, as shown in FIG. 17. A UE may be in an RRC connected state with one network at a time. A UE may attempt to receive paging from the other network. For paging reception from the other network with a single RF chain (e.g., a single radio front-end and/or a single baseband chain), UEs may configure gaps on an active connection with the first network to listen to paging of the other connection. When a UE receives a page on a second system, the UE may (depending on implementation and configuration) drop a (data) connection on a first system. A UE may not attempt to cleanly release a first connection to read a SIB on a second system. The UE behavior (e.g., not cleanly releasing the first connection) may cause decreased performance and/or reduced system capacity.

A wireless network may support a connectivity of a UE via non-3GPP access networks, e.g. WLAN access. The non-3GPP access networks may comprise trusted or untrusted non-3GPP accesses. Non-3GPP access networks may be connected to a core network (e.g., 5G core, LTE core, etc.) via a non-3GPP inter-working function (N3IWF). The N3IWF may interface core network control plane and user plane functions via N2 and N3 interfaces, respectively. N2 and N3 reference points (e.g. S1-C and S1-U) may be used to connect standalone non-3GPP accesses to core network control-plane and user-plane functions, respectively.

A UE that accesses the core network over a standalone non-3GPP access may, after UE attachment, support NAS signaling with core network control-plane functions using a N1 reference point (e.g., NAS reference point). When a UE is connected via a RAN (e.g. NG-RAN, E-UTRAN, UTRAN, etc.) and via a standalone non-3GPP access, multiple N1 (e.g. NAS) instances may exist for the UE (e.g., there may be one N1 instance over RAN and one N1 instance over non-3GPP access).

A UE simultaneously connected to the same core network of a PLMN over a 3GPP access and a non-3GPP access may be served by a single AMF if a selected N3IWF is located in the same PLMN as the 3GPP access. When a UE is connected to a 3GPP access of a PLMN, if the UE selects the N3IWF and the N3IWF is located in a PLMN different from the PLMN of the 3GPP access (e.g., in a different visiting PLMN (VPLMN) or in the home PLMN (HPLMN)), the UE may be served separately by the two PLMNs. The UE may be registered with two separate AMFs of the two PLMNs, respectively. PDU Sessions over the 3GPP access may be served by V-SMFs different from a V-SMF serving the PDU Sessions over the non-3GPP access.

PLMN selection for a 3GPP access may not depend on a N3IWF selection. If a UE is registered over a non-3GPP, the UE may perform PLMN selection for the 3GPP access independently of a PLMN to which the N3IWF belongs. A UE may establish an Internet protocol security (IPSec) tunnel with a N3IWF to attach to a core network over untrusted non-3GPP access. A UE may be authenticated by and/or attached to a core network during an IPSec tunnel establishment procedure.

A UE NAS signaling connection with an AMF over a non-3GPP access may be maintained after all PDU sessions for a UE over the non-3GPP access are released and/or handed over to a 3GPP access. N1 NAS signaling over standalone non-3GPP accesses may be protected with a same security mechanism applied for N1 over a 3GPP access.

Figure 26:
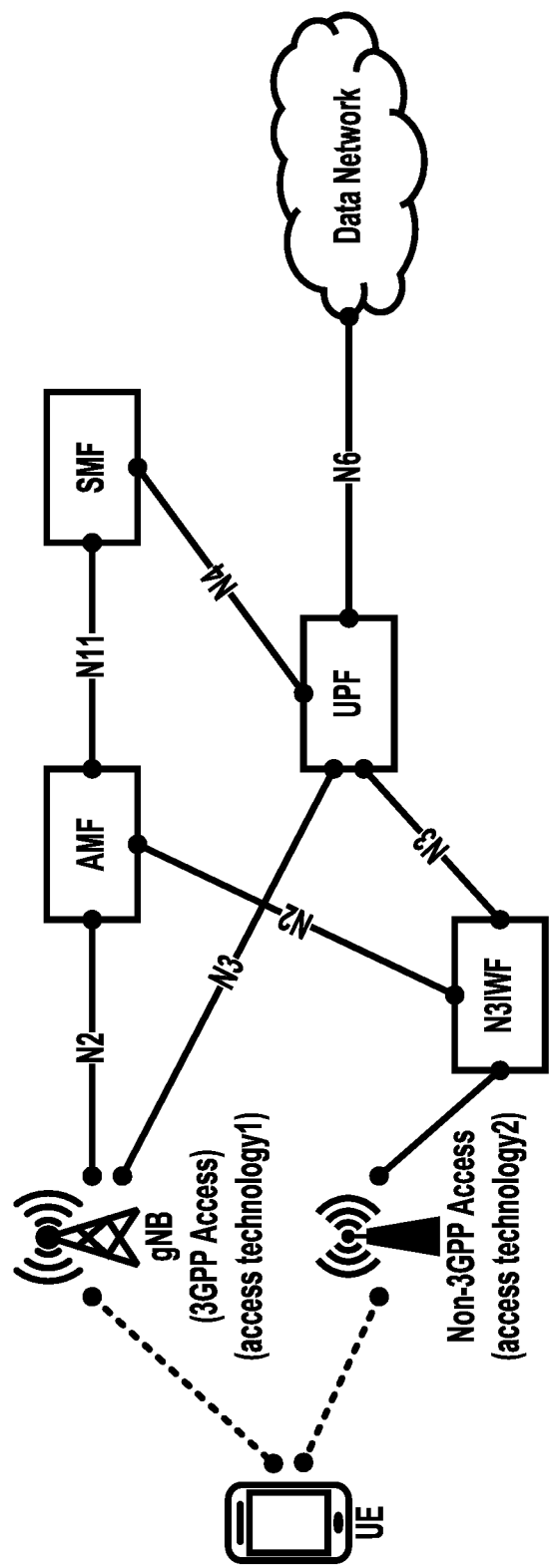
FIG. 26 is an example diagram of an aspect of an embodiment of the present disclosure.
Figure 27:
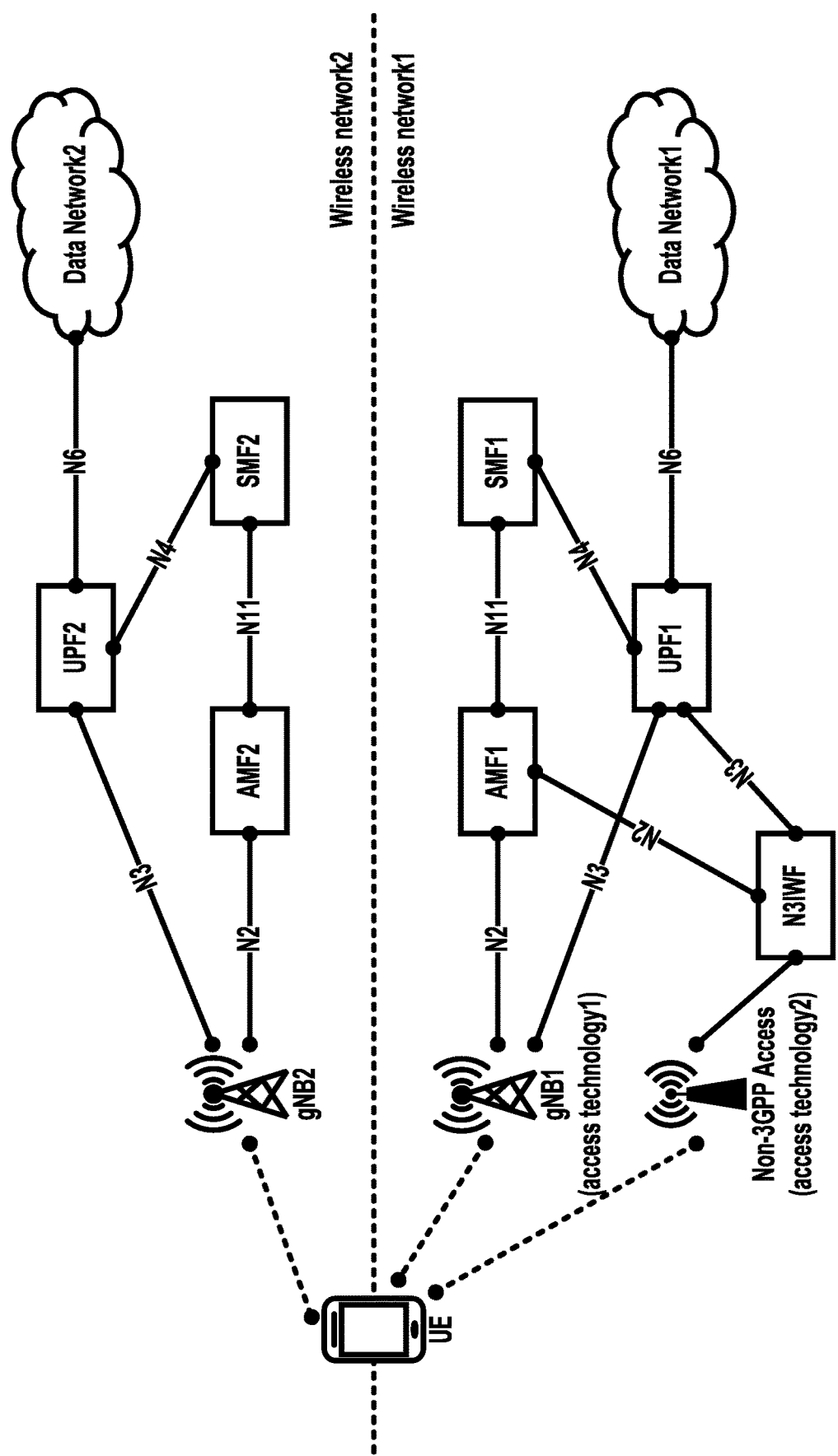
FIG. 27 is an example diagram of an aspect of an embodiment of the present disclosure.

In an example, as shown in FIG. 18 and/or FIG. 26, a UE (e.g., wireless device, vehicle, communication device, handset, etc.) may use/employ a first radio access technology (e.g., access technology1, 3GPP access network, eNB, gNB, base station, etc.) and/or a second radio access technology (e.g., access technology2, non-3GPP access network, WLAN, Wi-Fi, Bluetooth, CDMA network, etc.). In an example, as shown in FIG. 27 and/or FIG. 28, the wireless device may be connected/registered to a first wireless network (e.g., wireless network1, first system, first network, first public land mobile network (PLMN), etc.) via the first radio access technology and/or the second radio access technology. The wireless device may be connected to an access node (e.g., access point (AP), wireless access point (WAP), router, non-3GPP access, non-3GPP access node, etc.) of a wireless local area network (WLAN) (e.g., the second radio access technology). The wireless device may communicate with the first wireless network via the access node and/or the second radio access technology. In an example, the access node may comprise at least one of a wireless access point (WAP), an access point (AP), and/or a Wi-Fi router. In an example, the WLAN (e.g., the second radio access technology) may be connected to the first wireless network. In an example, the WLAN may be connected to the first wireless network via a non-3rd generation partnership project interworking function (N3IWF). The access node may be connected to the first wireless network (e.g., an access and mobility management function (AMF) and/or a user plane function (UPF) of the first wireless network) via the N3IWF. In an example, the first wireless network may comprise at least one of the WLAN and/or the access node. The first wireless network may comprise the N3IWF.

In an example, the first radio access technology may comprise at least one of: a 3GPP access network; a base station of the first wireless network; a next generation nodeB (gNB) of the first wireless network; an evolved nodeB (eNB) of the first wireless network; nodeB; and/or the like. In an example, the second radio access technology may comprise at least one of: a non-3GPP access network; a wireless local area network (WLAN); a Wi-Fi network; and/or the like. In an example, the access node may comprise at least one of: a wireless access point (WAP); an access point (AP); a Wi-Fi router; a non-3GPP access node; and/or the like. In an example, the second radio access technology may be connected to the first wireless network.

Figure 28:
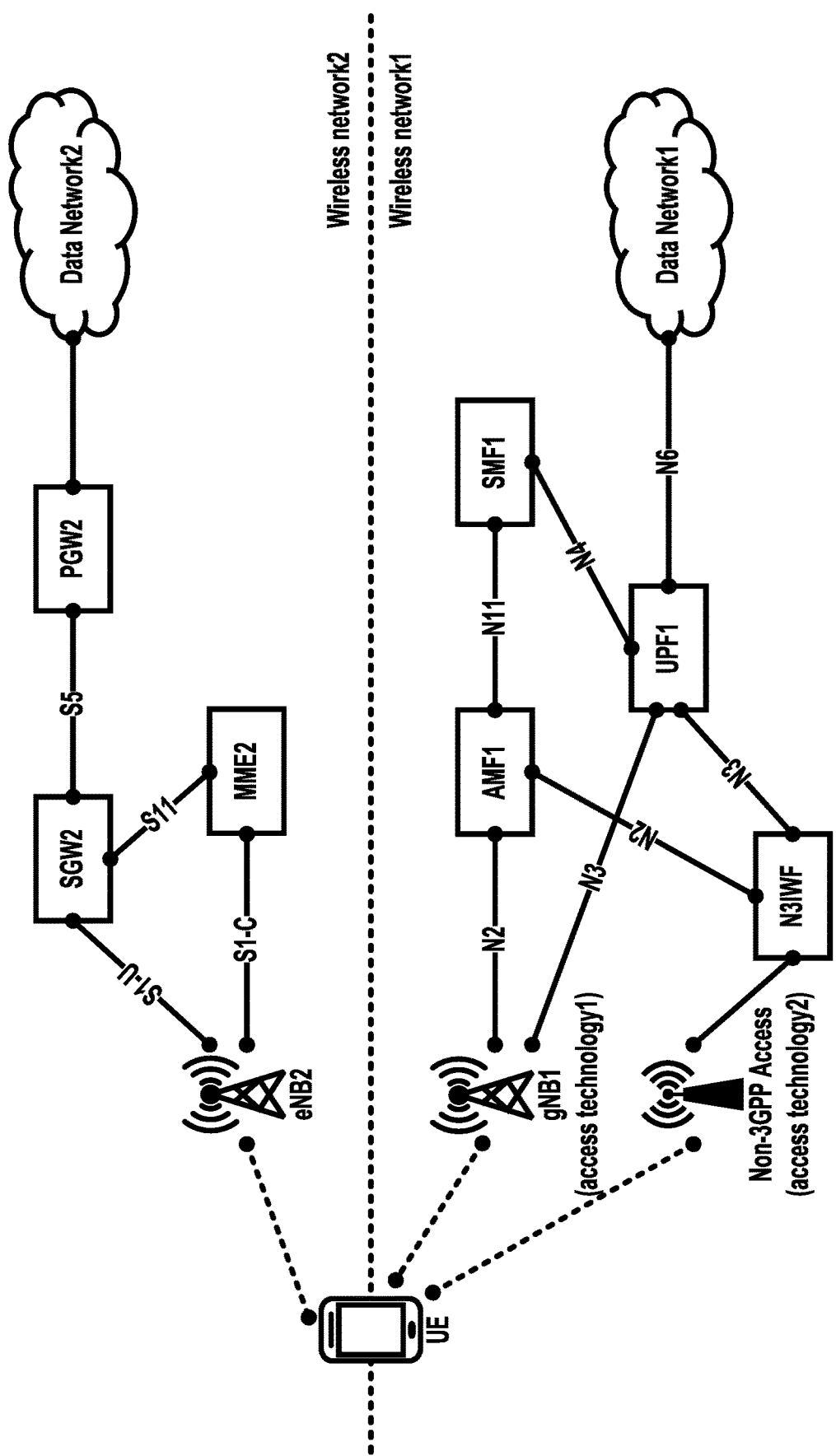
FIG. 28 is an example diagram of an aspect of an embodiment of the present disclosure.

In an example, as shown in FIG. 27 and/or FIG. 28, the wireless device may be registered to (e.g., and/or may communicate with) the first wireless network and/or a second wireless network (e.g., wireless network2, second system, second network, second PLMN, etc.). In an example, the first wireless network may comprise at least one of a first PLMN, a first access technology (e.g., system, network), a first communication system (e.g., V2X system, cellular-V2X system, intelligent transportation system (ITS), IoT system, cellular communication system, etc.), a first 5th generation (5G) wireless network, a first long-term evolution (LTE) wireless network, a first universal mobile telecommunications service (UMTS) wireless network, and/or the like. In an example, the second wireless network may comprise at least one of: a second PLMN, a second access technology (e.g., system, network), a second communication system (e.g., V2X system, cellular-V2X system, intelligent transportation system (ITS), IoT system, cellular communication system, etc.), a second 5G wireless network, a second LTE wireless network, a second UMTS wireless network, and/or the like. In an example, the first wireless network may comprise at least one of: the first radio access technology (e.g., 3GPP access network); and/or the second radio access technology (e.g., non-3GPP access network).

In an example, as shown in FIG. 16, the wireless device may support at least one subscriber identity module (SIM) (e.g., dual-SIM, multiple-SIM, multi-SIM). The at least one SIM may comprise at least one of a first SIM for communication with the first wireless network and/or a second SIM for communication with the second wireless network. One or more of the first SIM or the second SIM may be a physical SIM card (e.g., plastic SIM card) or an embedded SIM (eSIM) (e.g., electronic SIM card). In an example, as shown in FIG. 17, the wireless device may have at least one receiver and/or at least one transmitter for communication with the first wireless network and/or the second wireless network. In an example, as shown in FIG. 18, the wireless device may comprise a cellular communication module (e.g., 3GPP communication module) and/or a non-cellular communication module (e.g., non-3GPP communication module, WLAN/Wi-Fi communication module, Bluetooth communication module, etc.). The cellular communication module may comprise the at least one receiver and/or the at least one transmitter. In an example, the wireless device may employ the cellular communication module for communication with the first wireless network and/or the second wireless network via one or more base stations (e.g., gNB, eNB, nodeB, etc.) (e.g., via the first radio access technology). In an example, the wireless device may employ the non-cellular communication module for communication with the first wireless network via one or more access nodes (e.g., wireless access point, access point, Wi-Fi router; and/or the second radio access technology).

In an example embodiment, as shown in FIG. 23, the wireless device may determine unavailability of a registration procedure for the first wireless network. The wireless device may transmit/send, to the access node of the second radio access technology and/or based on the determining the unavailability, an information message comprising area information (e.g., reachability information) of the wireless device.

In an example embodiment, as shown in FIG. 23 and/or FIG. 24, the wireless device may release/suspend a radio resource control (RRC) connection with the first wireless network. The wireless device may receive an RRC message indicating release/suspension of the RRC connection with the first wireless network. The wireless device may determine that the wireless device meets at least one condition for initiation of a registration procedure for the first wireless network. The wireless device may determine unavailability of the registration procedure via the first radio access technology of the first wireless network. In an example, the unavailability may be based on channel state (e.g., received power of the wireless device from the first radio access technology) of the first radio access technology for the first wireless network. In an example, the unavailability may be based on communication (e.g., active communication) with the second wireless network. The wireless device may transmit/send, to the second radio access technology (e.g., the WLAN; e.g., for the first wireless network) and/or based on the determining the unavailability, an information message comprising area information of the wireless device. The information message may indicate that the wireless device is unreachable via the first radio access technology for the first wireless network. The first wireless network (e.g., AMF of the first wireless network) may page the wireless device based on the unreachability. For example, the first wireless network may update paging configurations to page the wireless device via the second radio access technology and/or to suspend a paging of the wireless device when the wireless device is unreachable via the first radio access technology. The first wireless network may increase paging success probability and/or reduce resource waste for unsuccessful paging based on the updated paging configurations.

In an example, the wireless device may receive an RRC message indicating release/suspension of an RRC connection with the first wireless network. The wireless device may determine that the wireless device meets at least one condition (e.g., expiration of a periodic registration update timer; a time duration passed since/from a previous (periodic) registration update) for initiation of a registration procedure for the first wireless network. The wireless device may determine unavailability of the initiation of the registration procedure via the first radio access technology. In an example, the unavailability may be based on channel state (e.g., received power of the wireless device from the first radio access technology) of the first radio access technology for the first wireless network. The unavailability may be based on (active) communication with the second wireless network. The wireless device may transmit, to the access node of the second radio access technology and based on the determining the unavailability, an information message indicating that the registration procedure is delayed/postponed/suspended. In an example, the information message may further indicate that the registration procedure is delayed/postponed/suspended based on (e.g., due to) communication with the second wireless network. In an example, the information message may further indicate that the wireless device stays in a tracking area where the wireless device performed a previous registration procedure (e.g., a latest registration procedure). The at least one condition may comprise expiration of a timer (e.g., T3512) for a periodic registration update. The at least one condition may comprise that a time duration (e.g., corresponding to the timer, T3512) passes since/from a previous (periodic) registration update (e.g., a latest registration update, a latest periodic registration update, etc.). The first wireless network may understand/determine precise/correct status (e.g., the wireless device stays in a tracking area of the first wireless network) of the wireless device based on the information message. Based on the information message, the first wireless network may not unnecessarily release/deregister the wireless device when the first wireless network does not receive a periodic registration update from the wireless device that stays at a service area of the first wireless network. Based on the information message, the first wireless network and/or the wireless device may maintain/keep a registered/connected state and/or may decrease resources for unnecessary connection/registration procedures when the wireless device stays a service area of the first wireless network and/or may not perform a registration update due to a communication with the second wireless network.

Figure 30:
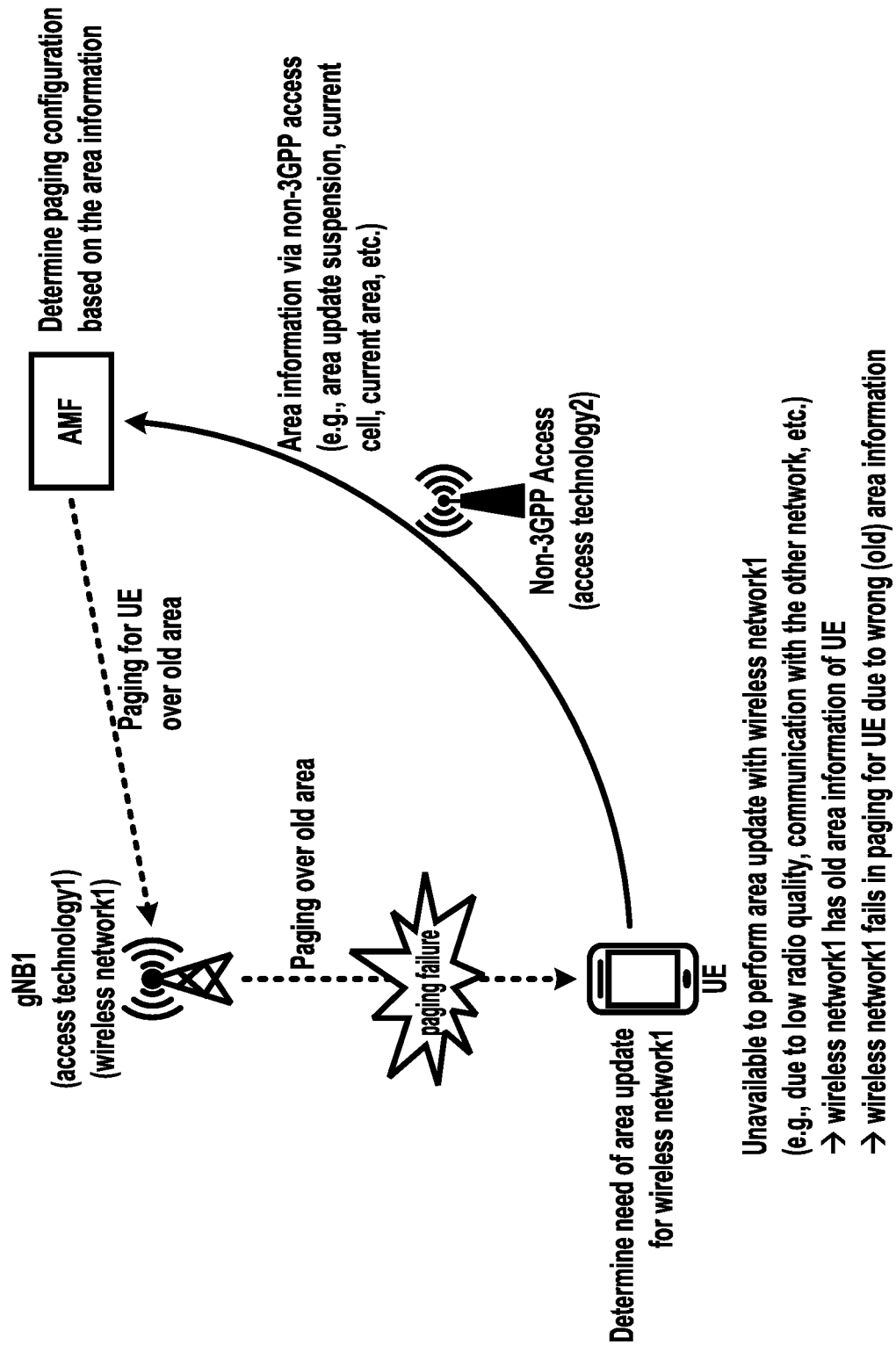
FIG. 30 is an example diagram of an aspect of an embodiment of the present disclosure.
Figure 31:
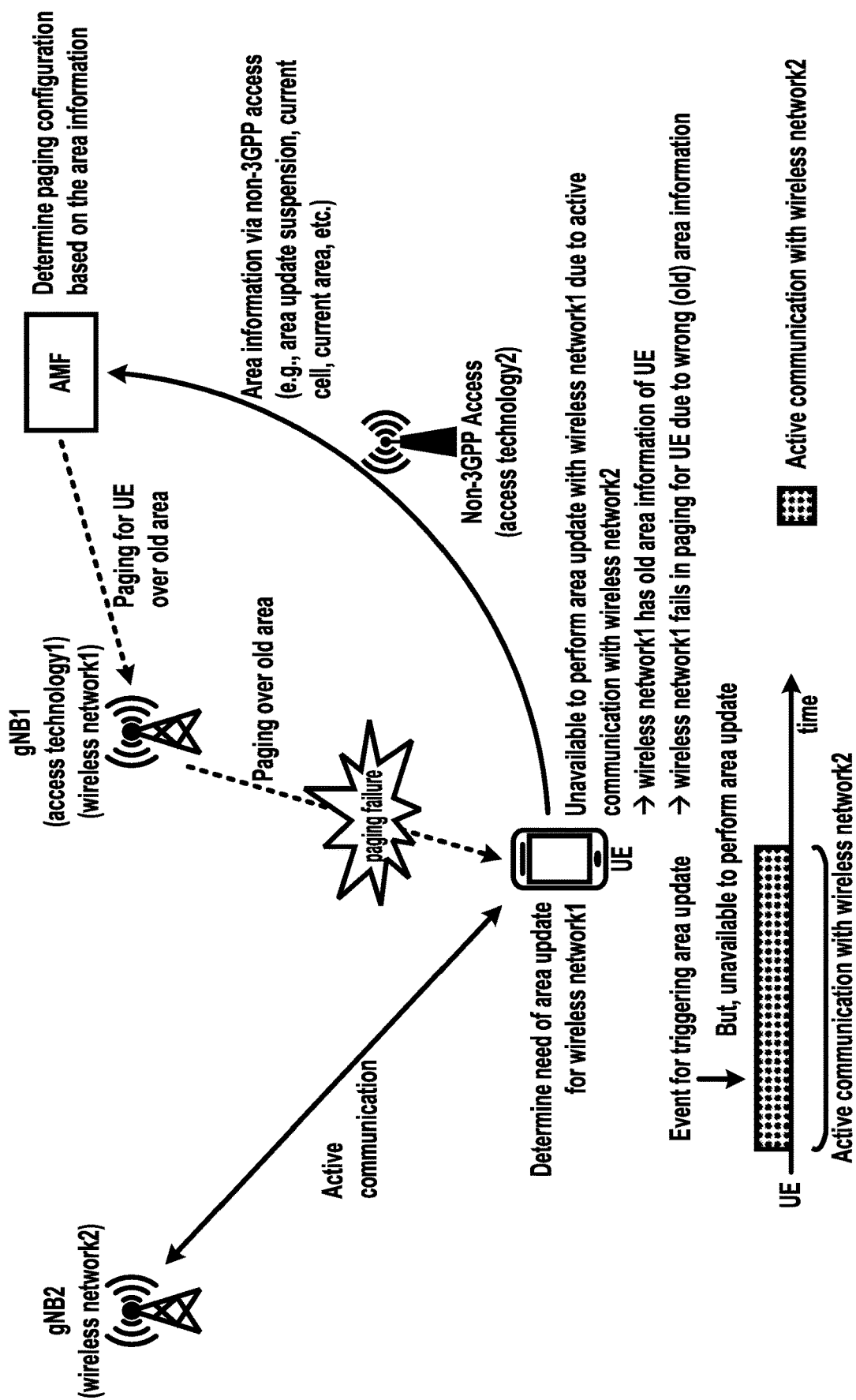
FIG. 31 is an example diagram of an aspect of an embodiment of the present disclosure.
Figure 32:
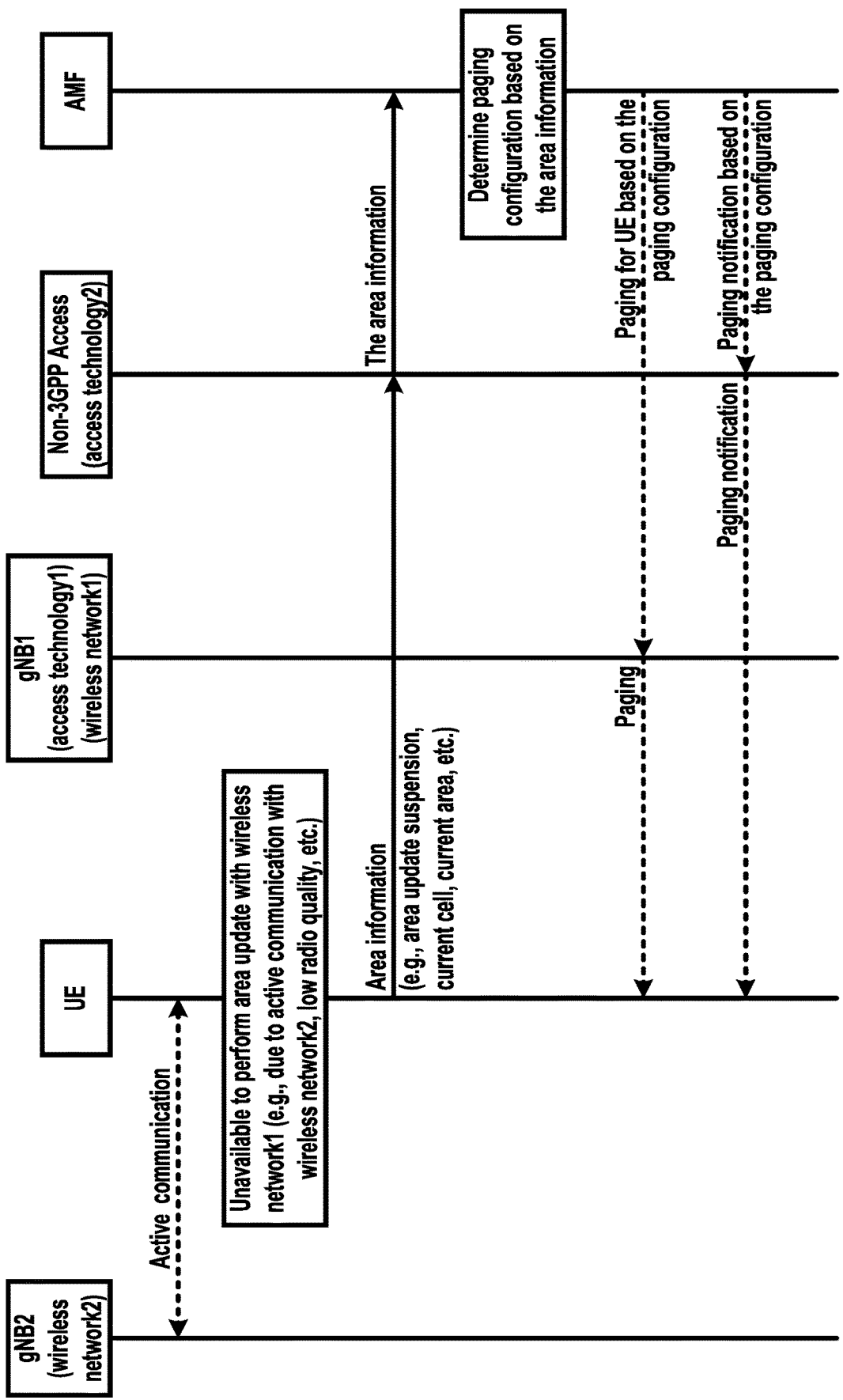
FIG. 32 is an example diagram of an aspect of an embodiment of the present disclosure.

In an example, as shown in FIG. 30, FIG. 31 and/or FIG. 32, the wireless device may receive a radio resource control (RRC) message. In an example, the wireless device may receive the RRC message from a first base station of the first wireless network. In an example, the RRC message may comprise one or more RRC messages.

In an example, the RRC message may comprise an RRC configuration message comprising configuration parameters for the wireless device. The configuration parameters may comprise RRC parameters (e.g., resource configuration parameters, bearer/logical-channel/PDU session/QoS-flow configuration parameters, power configuration parameters, etc.) for an RRC connection of the wireless device with the first wireless network. The RRC configuration message may comprise a non-access stratum (NAS) field (e.g., dedicated NAS message, dedicated info NAS, NAS-PDU, a NAS message, and/or NAS parameters) comprising NAS configuration parameters for the wireless device at the first wireless network. The NAS field may comprise an SM-NAS message (e.g., session management NAS) and/or an MM-NAS message (e.g., mobility management NAS). An access and mobility management function (AMF) may send the MM-NAS for the wireless device. A session management function (SMF) may send the SM-NAS for the wireless device. In an example, the RRC configuration message may comprise at least one of an RRC setup message, an RRC resume message, an RRC reestablishment message, an RRC reconfiguration message, a downlink (DL) information transfer message, an RRC connection setup message, an RRC connection resume message, an RRC connection reestablishment message, an RRC connection reconfiguration message, and/or the like.

In an example, the AMF of the first wireless network may send/transmit, to the wireless device, configuration parameters for the first wireless network. The configuration parameters may comprise the NAS field comprising the NAS configuration parameters.

In an example, the NAS field of the RRC configuration message (e.g., the RRC message) may comprise a NAS message for a registration of the wireless device at the first wireless network. The NAS message for the registration may comprise a registration accept message, a configuration update command message, a service accept message, an authentication response/result/reject message, and/or the like. In an example, the NAS field and/or the NAS message for the registration may comprise registration configuration parameters. The registration configuration parameters may comprise at least one information element of Extended protocol discriminator, Security header type, Spare half octet, Registration accept message identity (e.g., Message type), 5GS registration result, 5G-GUTI (e.g., mobile identity, 5GS mobile identity), Equivalent PLMNs (e.g., PLMN list), TAI list (e.g., tracking area identity list, 5GS tracking area identity list), Allowed NSSAI (e.g., information/identifier of allowed network slice(s)), Rejected NSSAI (e.g., information/identifier of rejected network slice(s)), Configured NSSAI (e.g., information/identifier of configured network slice(s)), 5GS network feature support, PDU session status, PDU session reactivation result, PDU session reactivation result error cause, LADN information, MICO indication, Network slicing indication (e.g., additional information associated with network slicing), Service area list, T3512 value (e.g., GPRS timer 3; on expiry the wireless device may initiate a periodic registration procedure), Non-3GPP de-registration timer value (e.g., GPRS timer 2), T3502 value (e.g., GPRS timer 2; on expiry the wireless device may initiate a registration procedure), Emergency number list, Extended emergency number list, SOR transparent container, EAP message, NSSAI inclusion mode, Operator-defined access category definitions, Negotiated DRX parameters (e.g., DRX parameters, 5GS/LTE DRX parameters), and/or the like. In an example, the wireless device may receive the NAS field in response to sending a registration request and/or a service request to the first wireless network (e.g., the AMF). In an example, the wireless device may send/transmit a registration complete and/or a configuration update complete in response to receiving the NAS field. Based on the RRC message (e.g., the RRC configuration message, the NAS field, the NAS message for a registration, the registration configuration parameters), the wireless device may determine at least one condition for initiation of registration update (e.g., tracking area update, registration area update, registration update procedure, mobility registration update, periodic registration update, etc.); and/or may monitor and/or receive a paging (e.g., core network paging).

In an example, the RRC message may indicate release/suspension of the RRC connection with the first wireless network. The RRC message may comprise an RRC release message (e.g., RRC connection release message) indicating the release and/or the suspension of the RRC connection of the wireless device with the first wireless network. In an example, the RRC release message may comprise suspension configuration parameters for the suspension of the RRC connection of the wireless device. The suspension configuration parameters may comprise at least one of: an identifier (e.g., radio network temporary identifier (RNTI), I-RNTI, fullI-RNTI, shortI-RNTI; identity for suspended UE context of the wireless device) of the wireless device; a paging cycle (e.g., RAN paging cycle; rf32, rf64, etc.); RAN notification area information (e.g., RAN area information, cell list, RAN area cell list, RAN area configuration list, tracking area code, RAN area code, etc.); a periodic RAN area update timer value (e.g., PeriodicRNAU-TimerValue, t380); a next hop chaining count (e.g., security parameter); and/or the like. Based on the RRC message (e.g., the RRC release message, the suspension configuration parameters), the wireless device may determine at least one condition for initiation of RAN area update (e.g., mobility based RAN area update, periodic RAN area update); and/or may monitor and/or receive a RAN paging.

Figure 29:
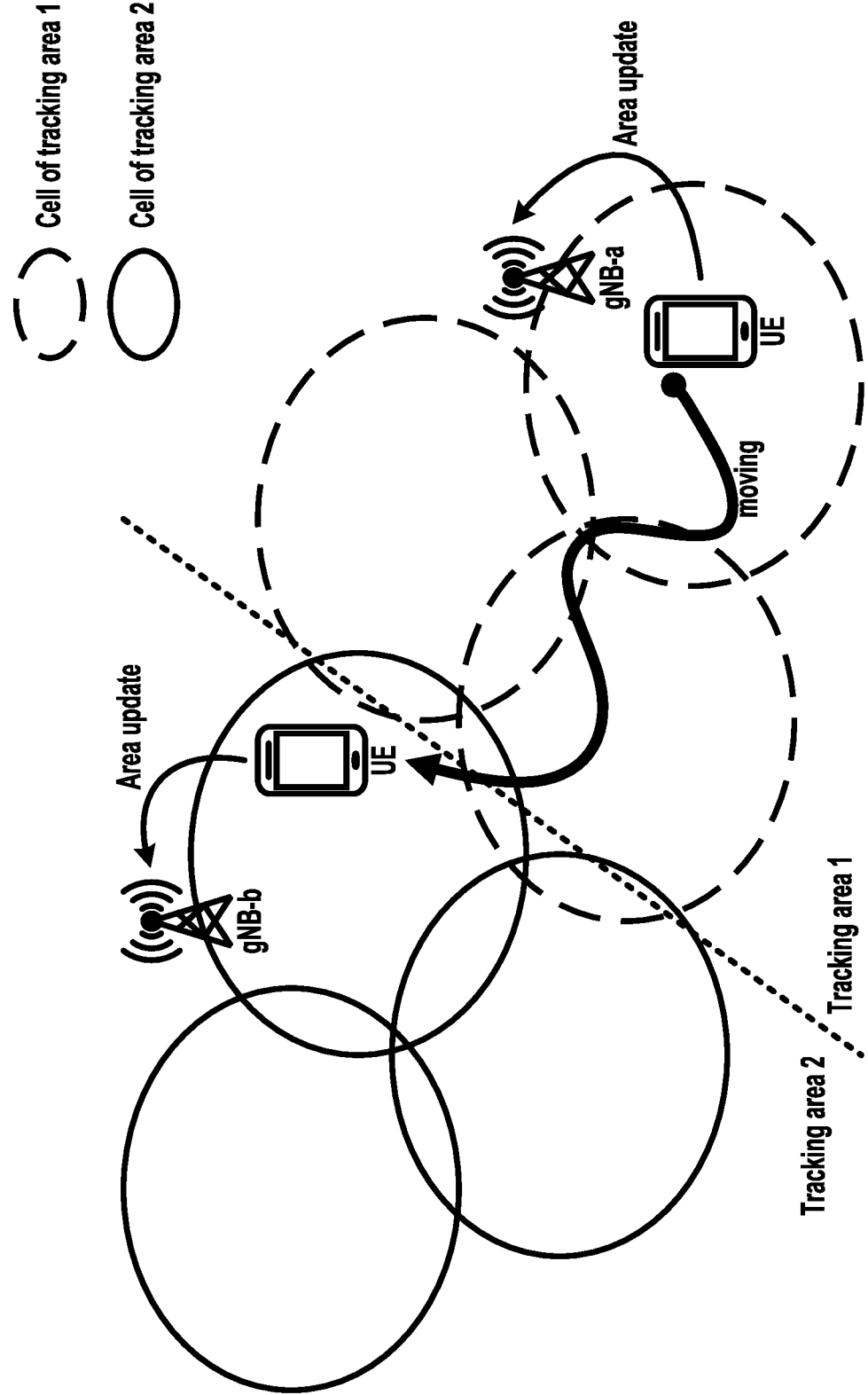
FIG. 29 is an example diagram of an aspect of an embodiment of the present disclosure.

In an example, the wireless device may determine that the wireless device meets at least one condition for initiation of a registration procedure (e.g., mobility registration update, periodic registration update, initial registration, emergency registration, mobility tracking area update, periodic tracking area update, mobility RAN area update, periodic RAN area update, etc.) for the first wireless network. In an example, the wireless device may be in an RRC idle state and/or an RRC inactive state when determining the initiation of the registration procedure. In an example, the registration procedure may be for at least one of: a registration update, an area update; a tracking area update (TAU) (e.g., location area update (LAU), routing area update (RAU), etc.); a radio access network (RAN) area update; a registration area update; and/or the like. In an example, as shown in FIG. 29, when the wireless device move to a new area (e.g., a new tracking area, a new registration area, a new RAN area, etc.), the wireless device may determine to initiate the registration procedure. The wireless device may receive a new area identifier of the new area via one or more system information blocks from a base station of the first wireless network. When the wireless device receives a new area identifier indicating a new area for a cell that the wireless device selects/reselects and/or camps on, the wireless device may determine to initiate the registration procedure. In an example, when a timer (e.g., T3512, t380, T3502, etc.) for a periodic area update (e.g., periodic registration update, periodic tracking area update, periodic RAN area update, etc.) expires and/or when a time duration (e.g. associated with a time value of T3512, t380, T3502, etc.) passes since/from a previous area update (e.g., the latest/last registration update, the latest/last periodic registration update, the latest/last RAN area update, the latest/last periodic RAN area update, the latest/last tracking area update, the latest/last periodic tracking area update, etc.), the wireless device may determine to initiate the registration procedure.

In an example, the initiation of the registration procedure may comprise at least one of: performing a random access process comprising transmitting a random access preamble to a base station of the first radio access technology; transmitting an uplink RRC message comprising at least one of an identifier of the wireless device, an RRC resume request message, an RRC request message, and/or a non-access stratum (NAS) message; and/or the like. For the registration procedure, the wireless device may transmit/send, to a base station of the first wireless network, the uplink RRC message comprising at least one of an RRC request message (e.g., RRC setup request message, RRC reestablishment request message, RRC resume request message, etc.), an RRC complete message (e.g., RRC setup complete message, RRC reestablishment complete message, RRC resume complete message, etc.), an uplink information transfer message, and/or the like. In an example, the uplink RRC message may comprise an uplink NAS field (e.g., DedicatedNAS-Message, dedicated info NAS, NAS-PDU, a NAS message, etc.) comprising a registration request message, a tracking area update request message, a registration update request message, etc. In an example, the uplink RRC message may comprise RRC resume parameters for an RRC resume procedure and/or a RAN area update procedure. The RRC resume parameters may comprise at least one of a resume identifier (e.g., resumeIdentity, ShortI-RNTI-Value), resumeMAC-I, resume cause, dedicated NAS message, selected PLMN identifiers (e.g. selectedPLMN-Identity), uplinkTxDirectCurrentList (e.g., Tx Direct Current locations for configured serving cells and/or BWPs if requested by the network via reportUplinkTxDirectCurrent), and/or the like.

In an example, the at least one condition for the initiation of the registration procedure may comprise at least one of: the wireless device detects entering a tracking area (e.g., the new area, new registration area, new tracking area, new RAN area, etc.) that is not in a list of tracking areas (e.g., area, registration area, RAN area, etc.) that the wireless device previously registered in an AMF and/or a base station (e.g., anchor base station) of the first wireless network, as shown in FIG. 29; a periodic registration updating timer (e.g., area update timer; T3512, t380, T3502, etc.) expires (e.g., a time duration associated with the area update timer since/from a previous area update passes); the wireless device receives a configuration update command message indicating registration requested (e.g., configuration update indication information element); the wireless device (e.g., in 5GMM-REGISTERED.ATTEMPTING-REGISTRATION-UPDATE state) receives a paging (e.g., core network paging, RAN paging, etc.); the wireless device receives a notification message with access type indicating 3GPP access (e.g., the first radio access technology) over a non-3GPP access (e.g., the second radio access technology) (e.g., for PDU sessions associated with 3GPP access); an inter-system change from S1 mode to N1 mode; the wireless device experiences an RRC connection failure and/or does not have signaling or user uplink data pending (e.g., the wireless device receives an indication of an RRC connection failure from lower layers and/or does not have signaling or user uplink data pending) (e.g., when NAS signaling connection recovery and/or RRC connection recovery is needed); the wireless device changes a 5GMM capability and/or S1 UE network capability; the wireless device changes an RRC capability; a usage setting of the wireless device changes; the wireless device needs to change at least one network slice that the wireless device is registered to; the wireless device changes a UE specific DRX parameters; the wireless device (e.g., in 5GMM-REGISTERED.ATTEMPTING-REGISTRATION-UPDATE state) needs to establish an emergency PDU session and/or perform emergency services fallback; the wireless device needs to register for SMS over NAS, indicate a change in requirements to use SMS over NAS, and/or de-register from SMS over NAS; the wireless device needs to indicate a PDU session status to the first wireless network after local release of at least one PDU session; the wireless device (e.g., in 5GMM-IDLE mode, RRC idle state, RRC inactive state, etc.) changes a radio capability for NG-RAN; the wireless device receives a fallback indication from a lower layer without resume request from NAS (i.e. when the lower layer requests NAS signaling connection recovery); the wireless device experiences an RRC connection failure and/or has user uplink data pending (the wireless device receives an indication of an RRC connection failure from a lower layer and/or has user uplink data pending) (e.g., when the lower layer requests NAS signaling connection recovery); the wireless device needs to request new LADN information; the wireless device needs to request a use of (e.g., transition to) MICO mode and/or needs to stop a use of (e.g., transition from) MICO mode; the wireless device (e.g., in 5GMM-CONNECTED mode with RRC inactive indication) enters a shared network cell in a current registration area belonging to an equivalent PLMN of a registered PLMN and/or not belonging to the registered PLMN; the wireless device receives a service reject message with a 5GMM cause value set to a restricted service area (e.g., #28); and/or the like. The at least one condition may comprise expiration of a timer (e.g., T3512) for a periodic registration update. The at least one condition may comprise that a time duration (e.g., corresponding to the timer, T3512) passes since/from a previous (periodic) registration update (e.g., a latest registration update, a latest periodic registration update, etc.).

In an example, the wireless device may determine unavailability of the initiation of the registration procedure for the first wireless network. The wireless device may determine unavailability of the initiation of the registration procedure via the first radio access technology. In an example, the wireless device may determine the unavailability of the initiation of the registration procedure based on at least one of: a reference signal received power (RSRP) of the first wireless network is smaller than a power value; the wireless device locates in a coverage hole (e.g., out of service area) of the first wireless network; and/or the like. In an example, the wireless device may determine the unavailability of the initiation of the registration procedure based on communication with a second wireless network.

In an example, the wireless device may determine the unavailability of the initiation of the registration procedure in response to a failure of a random access procedure and/or a failure of the registration procedure. The wireless device may transmit one or more random access preambles to a first base station via a first cell of the first wireless network to perform a random access procedure for initiation of the registration procedure (e.g., periodic area update and/or mobility area update). The wireless device may fail in the random access procedure (e.g., not receiving a random access response for the one or more random access preambles, not receiving an RRC complete message (message 5) for an RRC request message (message 4), etc.) due to a radio condition between the wireless device and the first base station (e.g., a radio condition of the wireless device for the first cell). The wireless device may fail in the registration procedure due to a high congestion of the first cell, the first base station, and/or the first wireless network. The wireless device determine the unavailability of the initiation of the registration procedure in response to (and/or based on) being (located) in a coverage hole (e.g., out of service area, RSRP lower than a power value/threshold) when the wireless device determines the initiation of the registration procedure (e.g., based on the at least one condition and/or in response to meeting the at least one condition).

In an example, the wireless device may determine the unavailability of the initiation of the registration procedure based on a band/frequency/carrier of a first cell of the first wireless network being unavailable during communicating with a second cell of the second wireless network. The second cell may employ a second band/frequency/carrier that may be: overlapping with the band/frequency/carrier of the first cell; and/or belonging to the same band combination associated with the band/frequency/carrier of the first cell. A band/frequency/carrier of the same band combination may employ/use the same RF chain of the wireless device with each other. In an example, if the first cell employs band 5 and the second cell employs band 7 and/or the band 5 and the band 4 belong to the same band combination using the same RF chain of the wireless device, the wireless device may determine the unavailability of the initiation of the registration procedure (e.g., due to a large time delay to transition between the first wireless network and the second wireless network).

In an example, the wireless device may determine the unavailability of the initiation of the registration procedure based on at least one of: the wireless device is in an RRC connected state at the second wireless network; the wireless device is in an active state at the second wireless network; the wireless device communicates (e.g., actively communicates) with the second wireless network; the wireless device transmits transport blocks to the second wireless network; the wireless device receives one or more signal from the second wireless network; and/or the like (e.g., when employing the overlapping band/frequency/carrier for the first cell and the second cell; and/or employing band/ frequency/carrier belonging the same band combination and/or employing/using the same RF chain for the first cell and the second cell).

In an example, during active communication with the second wireless network, the wireless device may not perform (e.g., may not be able to perform) the registration procedure for the first wireless network and/or may not receive (e.g., receive and ignore, or cannot receive, etc.) a paging via a base station (e.g., 3rd generation partnership project (3GPP) access network, gNB, eNB, etc.) of the first wireless network due to the active state at the second wireless network. In an example, the wireless device may not be able to communicate with the first wireless network via the 3GPP access network during the active state at the second wireless network (e.g., active communication with the second wireless network) due to a limited number of transmitter and receiver, as shown in FIG. 17. With one receiver, the wireless device may not be able to receive, via the 3GPP access network, signal from both the first wireless network and the second wireless network simultaneously. With one transmitter, the wireless device may not be able to transmit, via the 3GPP access network, signal to both the first wireless network and the second wireless network simultaneously. With multiple receivers or transmitters, the wireless device may not be able to communicate, via the 3GPP access network, with both the first wireless network and the second wireless network simultaneously if the wireless device employs multiple base stations (e.g., dual connectivity, multi connectivity, MCG/SCG) at the second wireless network.

In an example, the wireless device may determine the unavailability of the initiation of the registration procedure based on the active state of the wireless device at the second wireless network (e.g., when/while employing the overlapping band/frequency/carrier for the first cell and the second cell; and/or employing band/frequency/carrier belonging the same band combination and/or employing/using the same RF chain for the first cell and the second cell). The active state may comprise at least one of: an RRC connected state (e.g., associated with a second RRC connection); a time duration that a discontinuous reception (DRX) is not operating; an on-duration of a DRX when the wireless device employs the DRX; an on-duration of a power saving mode (PSM); a time duration that a measurement gap is not configured and/or is released; a time duration that the wireless device employs a service (e.g., voice, URLLC, V2X, emergency service, etc.); an activation state of a second cell (e.g., second carrier, second bandwidth part, second beam); a time duration of that the wireless device employs a second cell (e.g., second carrier, second bandwidth part, second beam); and/or the like.

In an example, the wireless device may determine that the wireless device is in the active state at the second wireless network (e.g., and/or at a second base station of the second wireless network). In an example, the wireless device may determine, based on an RRC connection with the second wireless network, that the wireless device is in the active state at the second wireless network. In an example, the wireless device may determine the active state based on an active communication with the second wireless network and/or the second base station of the second wireless network. The wireless device may determine the active state in response to actively communicating with the second wireless network and/or the second base station of the second wireless network. In an example, the active state may comprise at least one of: an RRC connected state during which the wireless device has/maintains/keeps an RRC connection with the second base station and/or the second wireless network; a time duration that a discontinuous reception (DRX) is not operating (e.g., the DRX is not configured and/or released); an on-duration (e.g., DRX on-time) of a DRX when the wireless device employs the DRX; an on-duration of a power saving mode; a time duration that a measurement gap is not configured and/or is released; a time duration during which the wireless device employs a service (e.g., voice, URLLC, V2X, emergency service, etc.); an activation state of a second cell (e.g., second carrier, second frequency, second band, second bandwidth part, second beam); a time duration during which the wireless device employs a second cell (e.g., second carrier, second frequency, second band, second bandwidth part, second beam) (e.g., the second cell is a serving cell of the wireless device); and/or the like.

In an example, the wireless device may determine the active state in response to transitioning to the RRC connected state. The wireless device may determine the RRC connected state based on receiving an RRC complete message from the second wireless network and/or transmitting an RRC request message (e.g., the RRC request message and/or the RRC complete message) to the second wireless network. During the RRC connected state, the wireless device and/or the second base station (e.g., the second wireless network) may maintain/keep the RRC connection and/or UE contexts of the wireless device for the RRC connection.

In an example, the wireless device may determine the active state in response to a DRX (e.g., DRX configurations) being not configured, not operating, not setup, not employed, and/or released for the wireless device. The wireless device may determine the active state in response to the DRX (e.g., DRX configurations for communication with the first wireless network) being not configured during the RRC connected state at the second wireless network. The wireless device may determine the active state in response to receiving an DRX release indication from a base station (e.g., the second base station, the second wireless network). In an example, a field (e.g., SetupRelease {DRX-Config}) of an RRC message (e.g., downlink RRC message) may indicate that the DRX (e.g., DRX-config) is released.

In an example, the wireless device may determine the active state in response to a DRX being on-duration (e.g., DRX on-time duration, non-sleep mode). The wireless device may determine the active state in response to the DRX being in the on-duration (e.g., being not in off-duration and/or being not in sleep mode; the off-duration and/or the sleep mode is for communication with the first wireless network) during the RRC connected state at the second wireless network. The wireless device may determine the on-duration of the DRX based on DRX configuration parameters. The wireless device may receive an RRC message (e.g., a downlink RRC message) comprising the DRX configuration parameters (e.g., DRX-Config). The wireless device may determine the on-duration of the DRX based on the DRX configuration parameters (e.g., DRX on duration timer, DRX inactivity timer, DRX long-cycle start offset, DRX short-cycle, DRX short-cycle timer, DRX slot offset, and/or system frame number (SFN) 0). The wireless device may determine the on-duration of the DRX in response to receiving an indication (e.g., PDCCH, PDCCH order, DCI, MAC CE, etc.) indicating/commanding starting the on-duration of the DRX (e.g., indication to go to the non-sleep mode, indication to wake up). The wireless device may receive the indication from a base station (e.g., the second base station and/or the second wireless network). The wireless device may determine the on-duration of the DRX in response to expiration of a timer and/or a cycle for the DRX.

In an example, the wireless device may determine the active state in response to a power saving mode (PSM) being on-duration (e.g., PSM on-time duration, non-sleep mode) at the second wireless network. The wireless device may determine the active state in response to a power saving mode (PSM) being in the on-duration (e.g., being not in off-duration and/or being not in sleep mode; the off-duration and/or the sleep mode is for communication with the first wireless network) during the RRC connected state at the second wireless network. The wireless device may determine the on-duration of the power saving mode based on PSM configuration parameters. The wireless device may receive an RRC message (e.g., a downlink RRC message) comprising the PSM configuration parameters (e.g., PSM-Config). The wireless device may determine the on-duration of the power saving mode in response to receiving an indication (e.g., wake-up signal (WUS), PDCCH, PDCCH order, DCI, MAC CE, etc.) indicating/commanding deactivation/disabling of the power saving mode (e.g., indication to go to the non-sleep mode, indication to wake up). The wireless device may receive the indication from a base station (e.g., the second base station and/or the second wireless network). The wireless device may determine the on-duration of the power saving mode in response to expiration of a timer for the power saving mode.

In an example, the wireless device may determine the active state in response to a measurement gap (e.g., gap, paging gap, monitoring gap, communication gap, etc.) being not configured, not employed, and/or released for the wireless device at the second wireless network. The wireless device may determine the active state in response to the measurement gap being not configured/assigned/activated (e.g., not setup and/or released) during the RRC connected state at the second wireless network. The measurement gap may be for communication with the first wireless network. During the measurement gap, the wireless device may not communicate with and/or may limit communication with the second wireless network (e.g., the second base station). The wireless device may receive an RRC message (e.g., a downlink RRC message, the second RRC message) comprising configuration parameters for the measurement gap. The wireless device may determine that the measurement gap is not configured/assigned/activated/setup and/or is released in response to receiving a downlink RRC message comprising configuration parameters (e.g., release indication) for the measurement gap. The wireless device may determine that the measurement gap is deactivated and/or released in response to receiving a deactivation indication (e.g., PDCCH, PDCCH order, DCI, MAC CE, etc.) indicating/commanding deactivation/disabling of the measurement gap. The wireless device may receive the deactivation indication from a base station (e.g., the second base station and/or the second wireless network).

In an example, the wireless device may determine the active state in response to a service (e.g., voice, URLLC, V2X, emergency service, etc.) being employed/used by the wireless device. The wireless device may receive configuration parameters for a bearer (e.g., data radio bearer, signaling radio bearer, logical channel, etc.) associated with the service. The bearer may be configured for a PDU session, a QoS flow, a network slice, and/or a logical channel to provide the service. The wireless device may determine the active state in response to the bearer associated with the service being configured/activated at the second wireless network and/or the second base station. The wireless device may receive an RRC message (e.g., a downlink RRC message) comprising the configuration parameters for the bearer (e.g., to configure the bearer) from the second wireless network. The wireless device may determine the active state based on transmitting/receiving transport blocks of the bearer associated with the service. In an example, if the wireless device employs the service (e.g., voice, URLLC, V2X, emergency service, etc.) at the second wireless network, the wireless device may avoid to and/or may not be able to communicate with the first wireless network (e.g., via a 3GPP access and/or a base station of the first wireless network) to reliably support the service at the second wireless network. For reliable support of the service at the second wireless network, the wireless device may determine the active state in a time duration during which the wireless device employs the service.

In an example, the wireless device may determine the active state in response to a second cell (e.g., second carrier, second frequency, second band, second bandwidth part, second beam) being activated (e.g., being in an active state) for the wireless device at the second wireless network. The wireless device may determine the active state in response to receiving an activation indication (e.g., MAC CE, RRC message) indicating activation of the second cell (e.g., the second carrier) associated with the second frequency and/or the second band. The wireless device may determine the active state in response to expiration of a timer for activation of the second cell. The wireless device may determine the active state in response to receiving an activation indication (e.g., MAC CE, PDCCH, DCI, RRC message, etc.) indicating switching to (e.g., or activating, changing to, and/or transitioning to) the second bandwidth part of the second cell (e.g., the second carrier) associated with the second frequency and/or the second band. In an example, the second bandwidth part may be associated with the second frequency and/or the second band. The wireless device may determine the active state in response to expiration of a timer (e.g., inactivity timer, activity timer) for switching to the second bandwidth part of the second cell. The wireless device may determine the active state in response to receiving an indication (e.g., MAC CE, PDCCH, DCI, RRC message, etc.) indicating switching to (e.g., or changing to, activating, and/or transitioning to) the second beam of the second cell (e.g., the second carrier) associated with the second frequency and/or the second band. The wireless device may determine the active state in response to expiration of a timer (e.g., beam failure timer, inactivity timer, activity timer) for switching to the second beam of the second cell.

In an example, the wireless device may determine the active state in response to a second cell (e.g., second carrier, second frequency, second band, second bandwidth part, second beam) being used/employed by the wireless device at the second wireless network (e.g., the second cell/beam being configured as a serving cell/beam of the wireless device) (e.g., the second bandwidth part being configured as an active bandwidth part of the wireless device). The wireless device may determine the active state in response to receiving configuration parameters (e.g., via an RRC message, a downlink RRC message) indicating configuring the second cell (e.g., the first carrier) associated with the second frequency and/or the second band. The wireless device may determine the active state in response to receiving configuration parameters (e.g., via an RRC message, a downlink RRC message) indicating configuring the second bandwidth part and/or the second beam of the second cell (e.g., the second carrier) associated with the second frequency and/or the second band. In an example, the second bandwidth part may be associated with the second frequency and/or the second band.

In an example, if the wireless device employs a second band/frequency/carrier/bandwidth of a second cell at the second wireless network, the wireless device may not be able to and/or may be hard/difficult to use a first band/frequency/carrier of a first cell (e.g., camping-on cell, serving cell, etc.) of the first wireless network. If the wireless device employs the same band/frequency/carrier and/or employs bands/frequencies/carriers belonging to the same band combination (e.g., corresponding to the same RF chain) for the first wireless network and the second wireless network, the wireless device may need a long transition time to transition between the first wireless network and the second wireless network for transmission or reception of transport blocks.

The wireless device may transmit/receive, to/from the second wireless network and/or the second base station, transport blocks during the active state. The wireless device may transmit/receive transport blocks based on configurations associated with the active state (e.g., based on at least one of the RRC connected state, the DRX configuration being released, the DRX on-duration time, the PSM on-duration time, the measurement gap being released, the employment of the service (e.g., voice, URLLC, V2X, emergency service, etc.), the activation of the second cell/second bandwidth part/second beam, the employment/configuration of the cell/second bandwidth part/second beam, etc.).

In an example, the wireless device may transmit a second RRC message for a second RRC connection (e.g., the RRC connection associated with the RRC connected state at the second wireless network) with the second wireless network and/or the second base station. The unavailability may be based on the second RRC connection with the second wireless network. In an example, the second RRC message may comprise at least one of: an RRC (connection) setup request message; an RRC (connection) complete message; an RRC (connection) resume request message; an RRC (connection) resume complete message; an RRC (connection) reestablishment request message; an RRC (connection) reestablishment complete message; an RRC (connection) reconfiguration complete message; and/or the like. In an example, the wireless device may receive a third RRC message (e.g., the RRC connection associated with the RRC connected state at the second wireless network) for the second RRC connection with the second wireless network and/or the second base station of the second wireless network. The third RRC message may comprise at least one of: an RRC setup message; an RRC resume message; an RRC reestablishment message; an RRC reconfiguration message; an RRC connection setup message; an RRC connection resume message; an RRC connection reestablishment message; an RRC connection reconfiguration message; and/or the like. The third RRC message may comprise configuration parameters (e.g., for the wireless device at the second wireless network) for at least one of: the RRC connected state; the DRX and/or the on-duration of the DRX; the power saving mode and/or the on-duration of the power saving mode; the measurement gap; the service (e.g., bearer configuration, PDU session configurations, logical channel configurations for the service); the configuration of the second cell; the activation state of the second cell; the second carrier/frequency/band/bandwidth part/beam; and/or the like. The wireless device may determine the unavailability of the initiation of the registration procedure based on at least one of the second RRC message and/or the third RRC message.

In an example, the wireless device may transmit/send, to the access node of the second radio access technology of the first wireless network and/or based on the determining the unavailability, an information message. The wireless device may transmit/send, to the access node of the second radio access technology and/or in response to the determining the unavailability, the information message. In an example, the access node may forward/send/transmit the information message to an AMF of the first wireless network. In an example, the access node may forward/send/transmit the information message to the N3IWF. The N3IWF may forward/send/transmit the information message to the AMF of the first wireless network.

The information message may comprise area information of the wireless device. The wireless device may transmit/send, to the access node of the second radio access technology and/or in response to the determining the unavailability, the information message. In an example, the information message may comprise at least one of: a NAS message; an identifier of the wireless device; and/or the like. In an example, the information message (e.g., the area information) indicate at least one of: the registration update is suspended; the registration update is delayed/postponed; the random access to the first wireless network was failed; the registration update for the first wireless network was failed; the area update (e.g., registration area update, tracking area update, RAN area update) is suspended; the area update is delayed/postponed; and/or the like. In an example, the information message (e.g., the area information) may comprise at least one of: information of a band (e.g., frequency, carrier, bandwidth, etc.) that the wireless device is able to monitor; information of a band (e.g., frequency, carrier, bandwidth, etc.) that the wireless device is not able to monitor; information of a band (e.g., frequency, carrier, bandwidth, etc.) (e.g., of a first cell) that the wireless device monitors; and/or the like.

In an example, the information message (e.g., the area information) may comprise at least one of: a public land mobile network (PLMN) identifier indicating a second PLMN of the second wireless network that the wireless device communicates with; a field indicating that the wireless device employs multiple SIMs (e.g., dual-SIM); information of a band (e.g., carrier, frequency) that the wireless device employs for communication with the second wireless network; information of a band (e.g., carrier, frequency) that the wireless device is available for communication with the first wireless network during communicating with the second wireless network; and/or the like.

In an example, the information message (e.g., the area information) may indicate that the registration update (e.g., the registration procedure; the mobility registration update, the periodic registration update) for the first wireless network is suspended/delayed/postponed due to a band/frequency/carrier of the first cell of the first wireless network is unavailable during communicating with the second wireless network (e.g., because of the same band/frequency or the same band combination) (e.g., the first cell that the wireless device camps on and/or monitors). The information message may comprise one or more reasons/causes of the unavailability of the initiation of the registration procedure.

In an example, the information message (e.g., the area information) may indicate at least one of: the wireless device is unreachable via the first radio access technology (e.g., a base station of the first wireless network, 3GPP access network) for the first wireless network; the wireless device is in a first tracking area (e.g., a first registration/routing area; associated with the first cell of the first wireless network); the wireless device is in a coverage of the first cell of the first wireless network; the wireless device camps on the first cell of the first wireless network; the wireless device monitors the first cell of the first wireless network; the wireless device is in a first RAN area of the first cell of the first wireless network; and/or the like. The information message may comprise at least one of: a cell identifier of the first cell; a tracking area identifier (TAI) of the first tracking area (e.g., registration area, routing area); a first RAN area identifier of the first RAN area; and/or the like. The information message may comprise a time value indicating a time duration that the wireless device delays/postpones the registration procedure for. The first wireless network (e.g., the AMF of the first wireless network) may expect that the wireless device will send a registration update (request) message within or after the time duration indicated by the time value.

In an example, the information message (e.g., the area information) may indicate at least one of: the wireless device is out of a second tracking/registration/routing area (e.g., last updated tracking/registration/routing area); the wireless device is out of a second RAN area (e.g., last updated RAN area); the wireless device is out of a service coverage of the first wireless network; a received power from the first wireless network is smaller than a power value; a received quality from the first wireless network is smaller than a quality value; the wireless device is at an unallowed area (e.g., restricted service area); the wireless device is out of a second radio access network area (e.g., last updated radio access network area); and/or the like. The information message may comprise an area identifier (e.g., TAI, registration area identifier, RAI) of the second tracking/registration/routing area and/or the second RAN area.

In an example, the information message (e.g., the area information) may indicate that the registration procedure is delayed/postponed/suspended. In an example, the information message may further indicate that the registration procedure is delayed/postponed/suspended based on (e.g., due to) communication with the second wireless network. In an example, the information message (e.g., the area information) may further indicate that the wireless device stays in a tracking area (e.g., a second tracking/registration/routing area) where the wireless device performed a previous registration procedure (e.g., a latest/last registration procedure, a latest/last/previous periodic registration procedure). The information message (e.g., the area information) may further indicate that the wireless device stays in a RAN area (e.g., a second RAN area) where the wireless device performed a previous RAN area update procedure (e.g., a latest/last RAN area update procedure, a latest/last/previous periodic RAN area update procedure). The information message may comprise an area identifier (e.g., TAI, registration area identifier, RAI) of the second tracking/registration/routing area and/or the second RAN area. The information message (e.g., the area information) may further indicate that the wireless device stays in a second cell where the wireless device performed a previous area update procedure (e.g., a latest/last area update procedure, a latest/last/previous periodic area update procedure). The information message may comprise an identifier (e.g., global cell identifier, physical cell identifier) of the second cell.

In an example, the wireless device may transmit/send, to a third base station (e.g., the first base station; gNB, eNB) of the first wireless network and/or based on the determining the unavailability of the initiation of the registration procedure, the information message. The wireless device may transmit/send, to the third base station and/or in response to the determining the unavailability of the initiation of the registration procedure, the information message. The third base station may transmit/forward/send the information message to the first wireless network and/or the AMF of the first wireless network.

In an example, the AMF may determine, based on the information message and/or the area information, paging configurations for the wireless device. The paging configurations may comprise at least one of: configuring to transmit a paging indication for the wireless device via the second radio access technology (e.g., a non-3GPP access node, a WLAN, a non-3rd generation partnership project interworking function (N3IWF), a wireless access node (e.g., WAP, AP), and/or the like); configuring to suspend a paging for the wireless device; configuring to delay/postpone a paging for the wireless device; and/or the like. The AMF may determine to delay/postpone/suspend a paging for the wireless device until receiving a registration update message (e.g. registration update request message) from the wireless device. The paging configurations may comprise configuring to page the wireless device via a band/frequency/carrier that the wireless device monitors and/or is able to monitor.

The paging configurations may comprise at least one of: configuring to transmit a paging indication for the wireless device via at least one of a WLAN, a non-3rd generation partnership project interworking function (N3IWF), a non-3rd generation partnership project (non-3GPP) access network, and/or a wireless access node (e.g., wireless access point, access point); configuring to suspend a paging indication for a service (e.g., delay tolerant service, low priority service) of the wireless device; configuring to suspend a paging indication for the wireless device; configuring to transmit a paging indication for a service (e.g., voice, high priority service, URLLC, V2X, emergency service, etc.); and/or the like.

In an example, as shown in FIG. 18, the wireless device may employ an independent transmitter/receiver for the second radio access technology (e.g., the non-3GPP access network, WLAN). The independent transmitter/receiver for the second radio access technology may be separate from a transmitter/receiver of the first radio access technology (e.g., for the first wireless network, the second wireless network). The second radio access technology may employ different frequencies/bands than the first radio access technology. During the active state at the second wireless network (e.g., active communication with the second wireless network), the wireless device may be able to communicate (e.g., transmit/receive packets) with the first wireless network via the second radio access technology (e.g., by employing the independent transmitter/receiver and/or the different frequencies/bands).

In an example, the AMF may configure, based on the information message (e.g., the area information), to suspend a paging indication for a service (e.g., delay tolerant service, low priority service, media streaming service) of the wireless device. During the unavailability of the registration procedure and/or the active state at the second wireless network of the wireless device, the AMF may configure to suspend/delay a paging for low priority services (e.g., delay tolerant service, high latency allowable service, high packet loss rate allowable service, etc.; e.g., weather information, entertainment information, advertisement, etc.). The AMF may request/command/indicate a session management function (SMF) to buffer and/or discard data (e.g., packets)

associated with the service for which a paging is suspended. The AMF may initiate/transmit a paging for the service of the wireless device after receiving an registration update (request) message from the wireless device and/or after receiving an indication indicating that the wireless device is in an inactive state at the second wireless network.

In an example, the AMF may configure, based on the information message (e.g., the area information), to suspend a paging indication for the wireless device. During the unavailability of the registration procedure and/or the active state at the second wireless network of the wireless device, the AMF may configure to suspend/delay a paging for services of the wireless device (e.g., for all data notifications or for all service types; and/or for services except for emergency services). The AMF may request/command/indicate a session management function (SMF) to buffer and/or discard data (e.g., packets) associated with the services. The AMF may initiate/transmit a paging for the services of the wireless device after receiving an registration update (request) message from the wireless device and/or after receiving an indication indicating that the wireless device is in an inactive state at the second wireless network.

In an example, the AMF may configure, based on the information message (e.g., the area information), to transmit a paging indication for a service (e.g., voice, high priority service, URLLC, V2X, emergency service, etc.) of the wireless device. During the unavailability of the registration procedure and/or the active state at the second wireless network of the wireless device, the AMF may configure to transmit/initiate (e.g., immediately via the 3GPP access network and/or the non-3GPP access network of the first wireless network) a paging for high priority services (e.g., SMS, voice, URLLC, V2X, emergency service, NAS control signal, etc.; e.g., emergency alert, vehicle control data, vehicle braking assistance signal, remote surgery control data, drone control signal, etc.) of the wireless device. The AMF and/or a base station of the first wireless network may transmit a paging indication based on the information message.

In an example, the AMF may determine, based on the information message and/or the area information, a paging area for the wireless device. The paging area may comprise at least one of the first cell, the first tracking area (e.g., the first registration/routing are), and/or the first RAN area that the wireless device monitors, is able to monitor, and/or camps on. The paging area may comprise at least one of the second cell, the second tracking area (e.g., the second registration/routing are), and/or the second RAN area that the wireless device performed the previous area update procedure (e.g., the latest/last area update procedure, the latest/last/previous periodic area update procedure), the previous registration procedure (e.g., the latest/last registration procedure, the latest/last/previous periodic registration procedure), and/or the previous RAN area update procedure (e.g., the latest/last RAN area update procedure, the latest/last/previous periodic RAN area update procedure) if the information message indicates that the wireless device stays at the second cell, the second tracking area, and/or the second RAN area. The paging configurations may comprise configuring to page the wireless device via a band/frequency/carrier that the wireless device monitors and/or is able to monitor based on the information message.

In an example embodiment, the AMF may send, to the wireless device, a paging indication based on the paging configurations and/or via the paging area configured based on the information message (e.g., the area information). In an example, the AMF may transmit the paging indication based on (e.g., in response to) at least one of: determining to transmit signal for the wireless device comprising at least one of a control plane signal and/or a user plane signal; updating configuration parameters for the first wireless network for the wireless device; receiving, from a session management function (SMF), a data notification for the wireless device; and/or the like. The AMF may transmit the paging indication based on the paging configurations for the wireless device. In an example, the AMF of the first wireless network and/or a base station of the first wireless network may transmit the paging indication via the paging area (e.g., configured based on the information message and/or the area information) for the wireless device.

In an example, the AMF may transmit the paging indication for the wireless device via the second radio access technology (e.g., a non-3GPP access node, a WLAN, a non-3rd generation partnership project interworking function (N3IWF), a wireless access node (e.g., WAP, AP), and/or the like); may suspend the paging indication for the wireless device; delay/postpone the paging indication for the wireless device; and/or the like. The AMF may delay/postpone/suspend the paging indication for the wireless device until receiving a registration update message (e.g. registration update request message) from the wireless device. The AMF may transmit the page indication to the wireless device via a band/frequency/carrier that the wireless device monitors and/or is able to monitor.

In an example, during the active state of the wireless device at the second wireless network, the AMF and/or a base station of the first wireless network may transmit the paging indication based on the paging configurations: for example, transmit the paging indication via the non-3GPP access network (e.g., the second radio access technology); suspend/delay transmission of the paging indication depending on a service associated with the paging indication; suspend/delay transmission of the paging indication during the active state; transmit the paging indication if a service associated with the paging indication is a high priority service and/or emergency service; transmit the first paging indication with the increased repetitions and/or the shifted paging cycle (e.g., shifted paging occasion); and/or the like.

In an example, the wireless device may receive, from the first wireless network, the paging indication based on the information message (and/or based on the area information) (e.g., via a non-3GPP access network, via the second radio access technology, and/or via the first radio access technology). In an example, the wireless device may receive the paging indication via an access node (e.g., WAP, AP, etc.) of a WLAN of the second radio access technology. In an example, the wireless device may receive the paging indication via a base station of the first radio access technology of the first wireless network (e.g., through the paging area configured based on the information message and/or the area information).

In an example, the wireless device may receive, from the first wireless network (e.g., the AMF and/or a base station of the first wireless network), the paging indication. During the active state at the second wireless network, the wireless device may receive, from the first wireless network (e.g., the AMF and/or a base station of the first wireless network), the paging indication based on the information message. The wireless device may receive the paging indication (e.g., notification of a paging; notification of the paging indication) via at least one of: an access node (e.g., wireless access node, AP, WAP) of a WLAN (e.g., the second radio access technology); and/or a base station (e.g., gNB, eNB, the second base station, a third base station) of the first wireless network.

In an example, in response to receiving the paging indication, the wireless device may initiate a random access procedure for the first wireless network by sending a random access preamble to a base station of the first wireless network. After completing the random access procedure, the wireless device may receive signal (e.g. downlink data, NAS message, control signal, etc.) from the first wireless network. The wireless device may transmit/receive, to/from the first wireless network, transport blocks based on the paging indication and/or based on the random access procedure. In an example, the transport blocks (e.g., to/from the first wireless network) may be associated with at least one of: a signaling radio bearer (SRB) (e.g., SRB1, SRB2, SRB3, etc.); and/or a data radio bearer (DRB). The wireless device may transmit/receive, to/from the second wireless network, transport blocks while the wireless device is communicating with the first wireless network.

In an example, the wireless device may perform the registration procedure for the first wireless network. The wireless device may perform the registration procedure for the first wireless network based on moving to a coverage (e.g., service area of a cell of the first wireless device) of the first wireless network. The wireless device may perform the registration procedure for the first wireless network based on transitioning to an inactive state at the second wireless network. The transitioning to the inactive state may be based on at least one of: receiving an RRC release message indicating release and/or suspension of the RRC connection with the second wireless network; transitioning to a time duration that a discontinuous reception (DRX) is operating; transitioning to an off-duration of a DRX when the wireless device employs the DRX; transitioning to an off-duration of a power saving mode; transitioning to a time duration that a measurement gap is configured; stopping employing a service (e.g., voice, URLLC, V2X, emergency service, etc.); transitioning a second cell (e.g., second carrier, second bandwidth part, second beam) to a deactivation state; transitioning a second cell (e.g., second carrier, second bandwidth part, second beam) to a dormant state; stopping employing a second cell (e.g., second carrier, second bandwidth part, second beam); and/or the like. In an example, the wireless device may transition, based on the receiving the RRC release message, to at least one of: an RRC idle state at the second wireless network and/or an RRC inactive state at the second wireless network.

In an example, if the wireless device is in an RRC inactive state, the AMF may send the information message to a base station (e.g., anchor base station, gNB, eNB) that maintains UE contexts of the wireless device. The base station (e.g., the anchor base station) may determine, based on the information message, RAN paging configurations and/or a RAN paging area for the wireless device. If the base station receives downlink packets (e.g., from a UPF) and/or control signal (e.g., from an AMF) from one or more core network nodes, the base station may send a RAN paging message based on the RAN paging configurations and/or via the RAN paging area determined based on the information message.

Figure 33:
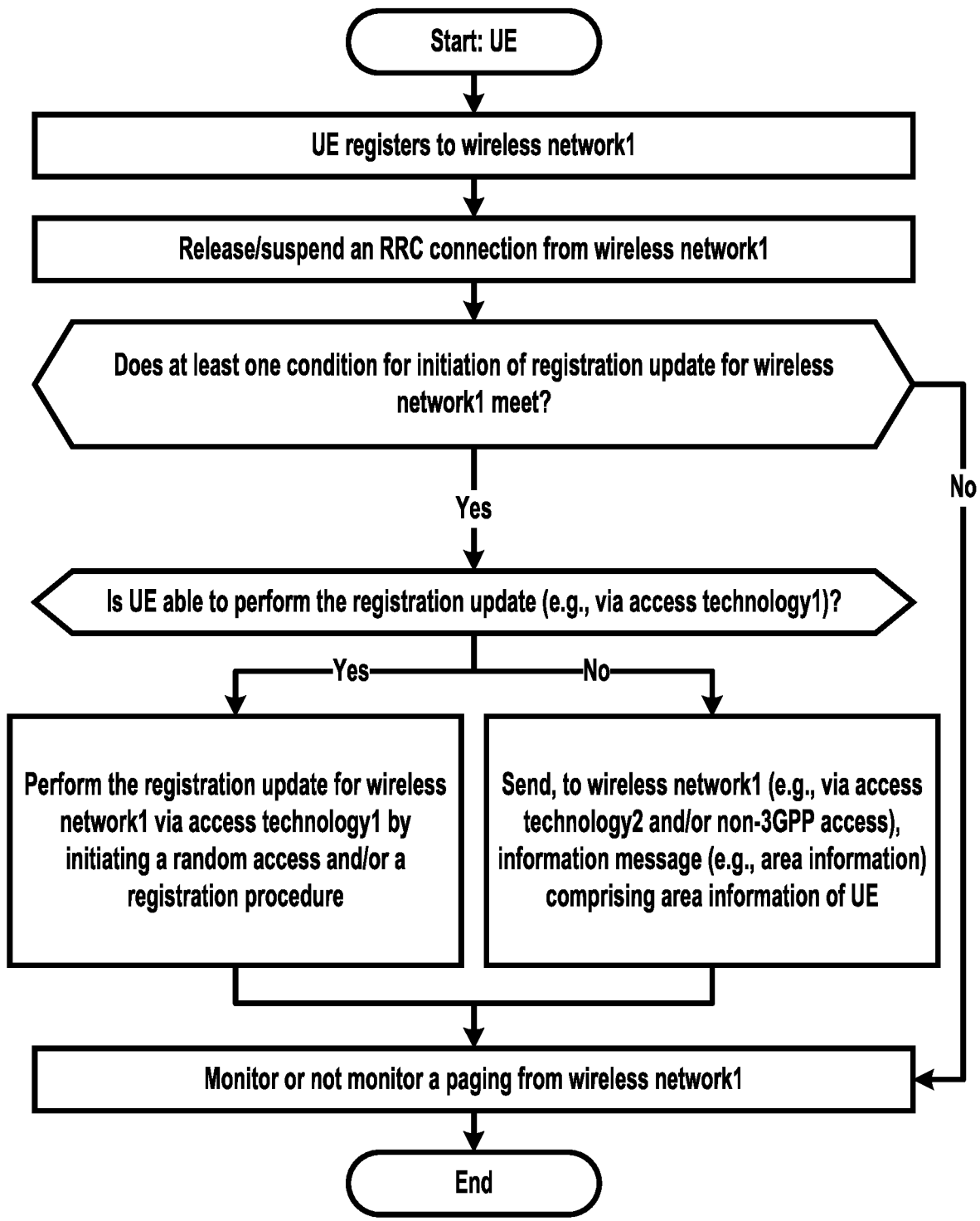
FIG. 33 is an example diagram of an aspect of an embodiment of the present disclosure.

In an example, as shown in FIG. 33, a wireless device may receive a radio resource control (RRC) message indicating release/suspension of an RRC connection with a first wireless network. The wireless device may determine that the wireless device meets at least one condition for initiation of a registration procedure for the first wireless network. The wireless device may determine unavailability of the initiation of the registration procedure via a first radio access technology. The wireless device may transmit/send, to an access node of a second radio access technology and/or based on the determining the unavailability, an information message. The information message may comprise area information of the wireless device.

In an example, the wireless device may support at least one subscriber identity module (SIM) comprising at least one of: a first SIM for communication with the first wireless network; and/or a second SIM for communication with a second wireless network. The receiving the RRC message may comprise receiving the RRC message from a first base station of the first wireless network. The RRC message may comprise an RRC (connection) release message. In an example, the first wireless network may comprise at least one of: a first public land mobile network (PLMN); a first communication system (e.g., V2X system, cellular-V2X system, intelligent transportation system (ITS), IoT system, cellular communication system, etc.); a first access technology (e.g., system, network); a first 5th generation (5G) wireless network; a first long-term evolution (LTE) wireless network; and/or a first universal mobile telecommunications service (UMTS) wireless network. In an example, the first wireless network may comprise at least one of: the first radio access technology (e.g., 3GPP access network); and/or the second radio access technology (e.g., non-3GPP access network).

In an example, the at least one condition may comprise at least one of: the wireless device detects entering a tracking area that is not in a list of tracking areas that the wireless device previously registered in an access and mobility management function; a periodic registration updating timer (e.g., T3512) expires; the wireless device receives a configuration update command message indicating registration requested (e.g., configuration update indication information element); the wireless device (e.g., in 5GMM-REGISTERED.ATTEMPTING-REGISTRATION-UPDATE state) receives a paging; the wireless device receives a notification message with access type indicating 3GPP access over a non-3GPP access for PDU sessions associated with 3GPP access; an inter-system change from S1 mode to N1 mode; the wireless device experiences an RRC connection failure and/or does not have signaling or user uplink data pending (e.g., the wireless device receives an indication of an RRC connection failure from lower layers and/or does not have signaling or user uplink data pending) (e.g., when NAS signaling connection recovery is needed); the wireless device changes a 5GMM capability and/or S1 UE network capability; a usage setting of the wireless device changes; the wireless device needs to change at least one network slice that the wireless device is registered to; the wireless device changes a UE specific DRX parameters; the wireless device (e.g., in 5GMM-REGISTERED.ATTEMPTING-REGISTRATION-UPDATE state) needs to establish an emergency PDU session and/or perform emergency services fallback; the wireless device needs to register for SMS over NAS, indicate a change in requirements to use SMS over NAS, and/or de-register from SMS over NAS; the wireless device needs to indicate a PDU session status to the first wireless network after local release of at least one PDU session; the wireless device (e.g., in 5GMM-IDLE mode) changes a radio capability for NG-RAN; the wireless device receives a fallback indication from a lower layer without resume request from NAS (i.e. when the lower layer requests NAS signaling connection recovery); the wireless device experiences an RRC connection failure and/or has user uplink data pending (the wireless device receives an indication of an RRC connection failure from a lower layer and/or has user uplink data pending) (e.g., when the lower layer requests NAS signaling connection recovery); the wireless device needs to request new LADN information; the wireless device needs to request a use of (e.g., transition to) MICO mode and/or needs to stop a use of (e.g., transition from) MICO mode; the wireless device (e.g., in 5GMM-CONNECTED mode with RRC inactive indication) enters a shared network cell in a current registration area belonging to an equivalent PLMN of a registered PLMN and/or not belonging to the registered PLMN; the wireless device receives a service reject message with a 5GMM cause value set to a restricted service area (e.g., #28); and/or the like.

In an example, the registration procedure may be for at least one of: a tracking area update (TAU) (e.g., location area update (LAU), routing area update (RAU), etc.); a radio access network (RAN) area update; a registration area update; and/or the like. In an example, the wireless device may determine the unavailability of the initiation of the registration procedure based on at least one of: a reference signal received power (RSRP) of the first wireless network is smaller than a power value; the wireless device locates in a coverage hole (e.g., out of service area) of the first wireless network; and/or the like. In an example, the wireless device may determine the unavailability of the initiation of the registration procedure based on communication with a second wireless network. In an example, the second wireless network may comprise at least one of: a second public land mobile network (PLMN); a second communication system (e.g., V2X system, cellular-V2X system, intelligent transportation system (ITS), IoT system, cellular communication system, etc.); a second access technology (e.g., system, network); a second 5th generation (5G) wireless network; a second long-term evolution (LTE) wireless network; a second universal mobile telecommunications service (UMTS) wireless network; and/or the like.

In an example, the wireless device may determine the unavailability of the initiation of the registration procedure based on a band/frequency/carrier of a first cell of the first wireless network being unavailable during communicating with a second cell of the second wireless network. The second cell may employ a second band/frequency/carrier that may be: overlapping with the band/frequency/carrier of the first cell; and/or belonging to the same band combination associated with the band/frequency/carrier of the first cell.

In an example, the wireless device may determine the unavailability of the initiation of the registration procedure based on at least one of: the wireless device is in an RRC connected state at the second wireless network; the wireless device is in an active state at the second wireless network; the wireless device communicates with the second wireless network; the wireless device transmits transport blocks to the second wireless network; the wireless device receives one or more signal from the second wireless network; and/or the like. In an example, the wireless device may determine the unavailability of the initiation of the registration procedure based on an active state of the wireless device at the second wireless network. The active state may comprise at least one of: an RRC connected state; a time duration that a discontinuous reception (DRX) is not operating; an on-duration of a DRX when the wireless device employs the DRX; an on-duration of a power saving mode (PSM); a time duration that a measurement gap is not configured and/or is released; a time duration that the wireless device employs a service (e.g., voice, URLLC, V2X, emergency service, etc.); an activation state of a first cell (e.g., first carrier, first bandwidth part, first beam); a time duration of that the wireless device employs a first cell (e.g., first carrier, first bandwidth part, first beam); and/or the like.

In an example, the wireless device may transmit a second RRC message for a second RRC connection with the second wireless network. The unavailability may be based on the second RRC connection with the second wireless network. In an example, the second RRC message may comprise at least one of: an RRC (connection) setup request message; an RRC (connection) complete message; an RRC (connection) resume request message; an RRC (connection) resume complete message; an RRC (connection) reestablishment request message; an RRC (connection) reestablishment complete message; an RRC (connection) reconfiguration complete message; and/or the like. In an example, the wireless device may receive a third RRC message for the second RRC connection with the second wireless network. The third RRC message may comprise at least one of: an RRC setup message; an RRC resume message; an RRC reestablishment message; an RRC reconfiguration message; an RRC connection setup message; an RRC connection resume message; an RRC connection reestablishment message; an RRC connection reconfiguration message; and/or the like.

In an example, the initiation of the registration procedure may comprise at least one of: performing a random access process comprising transmitting a random access preamble to a base station of the first radio access technology; transmitting an RRC message comprising at least one of an identifier of the wireless device, an RRC resume request message, an RRC request message, and/or a non-access stratum (NAS) message; and/or the like.

In an example, the first radio access technology may comprise at least one of: a 3rd generation partnership project (3GPP) access network; a base station of the first wireless network; a next generation nodeB (gNB) of the first wireless network; an evolved nodeB (eNB) of the first wireless network; nodeB; and/or the like. In an example, the access node may comprise at least one of: a wireless access point (WAP); an access point (AP); a Wi-Fi router; a non-3GPP access node; and/or the like. In an example, the second radio access technology may be connected to the first wireless network. In an example, the second radio access technology may comprise at least one of: a non-3GPP access network; a wireless local area network (WLAN); a Wi-Fi network; and/or the like.

In an example, the information message may comprise at least one of: a non-access stratum (NAS) message; an identifier of the wireless device; and/or the like. In an example, the information message indicate at least one of: a registration update is suspended; a registration update is delayed/postponed; a random access to the first wireless network was failed; a registration update for the first wireless network was failed; an area update is suspended; an area update is delayed/postponed; and/or the like. In an example, the information message may comprise at least one of: information of a band that the wireless device is able to monitor; information of a band that the wireless device is not able to monitor; information of a band that the wireless device monitors; and/or the like. In an example, the information message may comprise at least one of: a public land mobile network (PLMN) identifier indicating a first PLMN of a second wireless network that the wireless device communicates with; a field indicating that the wireless device employs multiple SIMs (e.g., dual-SIM); information of a band (e.g., carrier, frequency) that the wireless device employs for communication with a second wireless network; information of a band (e.g., carrier, frequency) that the wireless device is available for communication with the first wireless network during communicating with a second wireless network; and/or the like.

In an example, the information message may indicate that a registration update for the first wireless network is suspended/delayed/postponed due to a band/frequency of a first cell of the first wireless network is unavailable during communicating with a second wireless network (e.g., because of the same band/frequency or the same band combination). In an example, the information message may indicate at least one of: the wireless device is unreachable via the first radio access technology for the first wireless network; the wireless device is in a first tracking area; the wireless device is in a coverage of a first cell; the wireless device camps on a first cell; the wireless device monitors a first cell; the wireless device is in a first radio access network area; and/or the like.

In an example, the information message may indicate at least one of: the wireless device is out of a second tracking area (e.g., last updated tracking area); the wireless device is out of a service coverage of the first wireless network; a received power from the first wireless network is smaller than a power value; a received quality from the first wireless network is smaller than a quality value; the wireless device is at an unallowed area (e.g., restricted service area); the wireless device is out of a second radio access network area (e.g., last updated radio access network area); and/or the like.

Figure 35:
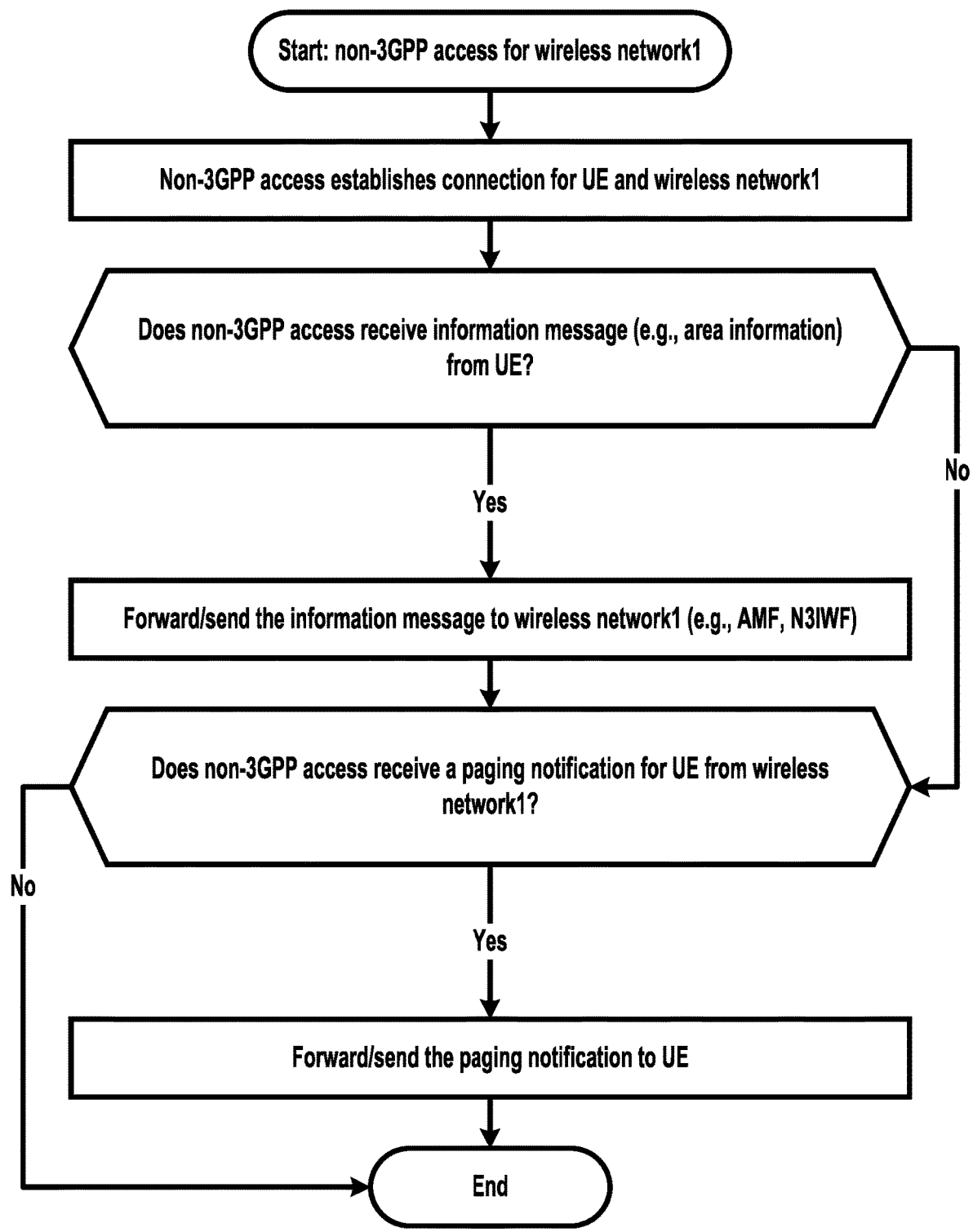
FIG. 35 is an example diagram of an aspect of an embodiment of the present disclosure.

In an example, as shown in FIG. 35, the access node may forward/send/transmit the information message to an access and mobility management function (AMF) of the first wireless network. In an example, the AMF may determine, based on the information message, paging configurations for the wireless device. The paging configurations may comprise at least one of: configuring to transmit a paging indication for the wireless device via at least one of a non-3GPP access node, a WLAN, a non-3rd generation partnership project interworking function (N3IWF), a wireless access node (e.g., WAP, AP), and/or the like; configuring to suspend a paging for the wireless device; and/or the like. In an example, the access node may forward/send/transmit the information message to an N3IWF. The N3IWF may forward/send/transmit the information message to the AMF of the first wireless network.

In an example, the wireless device may receive, from the first wireless network, a paging indication based on the information message (e.g., via a non-3GPP access network, via the second radio access technology). In an example, the wireless device may receive the paging indication via an access node (e.g., WAP, AP, etc.) of a WLAN.

In an example, the wireless device may perform the registration procedure for the first wireless network. The wireless device may perform the registration procedure for the first wireless network based on transitioning to an inactive state at a second wireless network. The transitioning to the inactive state may be based on at least one of: receiving an RRC release message indicating release and/or suspension of the RRC connection with the second wireless network; transitioning to a time duration that a discontinuous reception (DRX) is operating; transitioning to an off-duration of a DRX when the wireless device employs the DRX; transitioning to an off-duration of a power saving mode; transitioning to a time duration that a measurement gap is configured; stopping employing a service (e.g., voice, URLLC, V2X, emergency service, etc.); transitioning a second cell (e.g., second carrier, second bandwidth part, second beam) to a deactivation state; transitioning a second cell (e.g., second carrier, second bandwidth part, second beam) to a dormant state; stopping employing a second cell (e.g., second carrier, second bandwidth part, second beam); and/or the like. In an example, the wireless device may transition, based on the receiving the RRC release message, to at least one of: an RRC idle state at the second wireless network and/or an RRC inactive state at the second wireless network.

Figure 34:
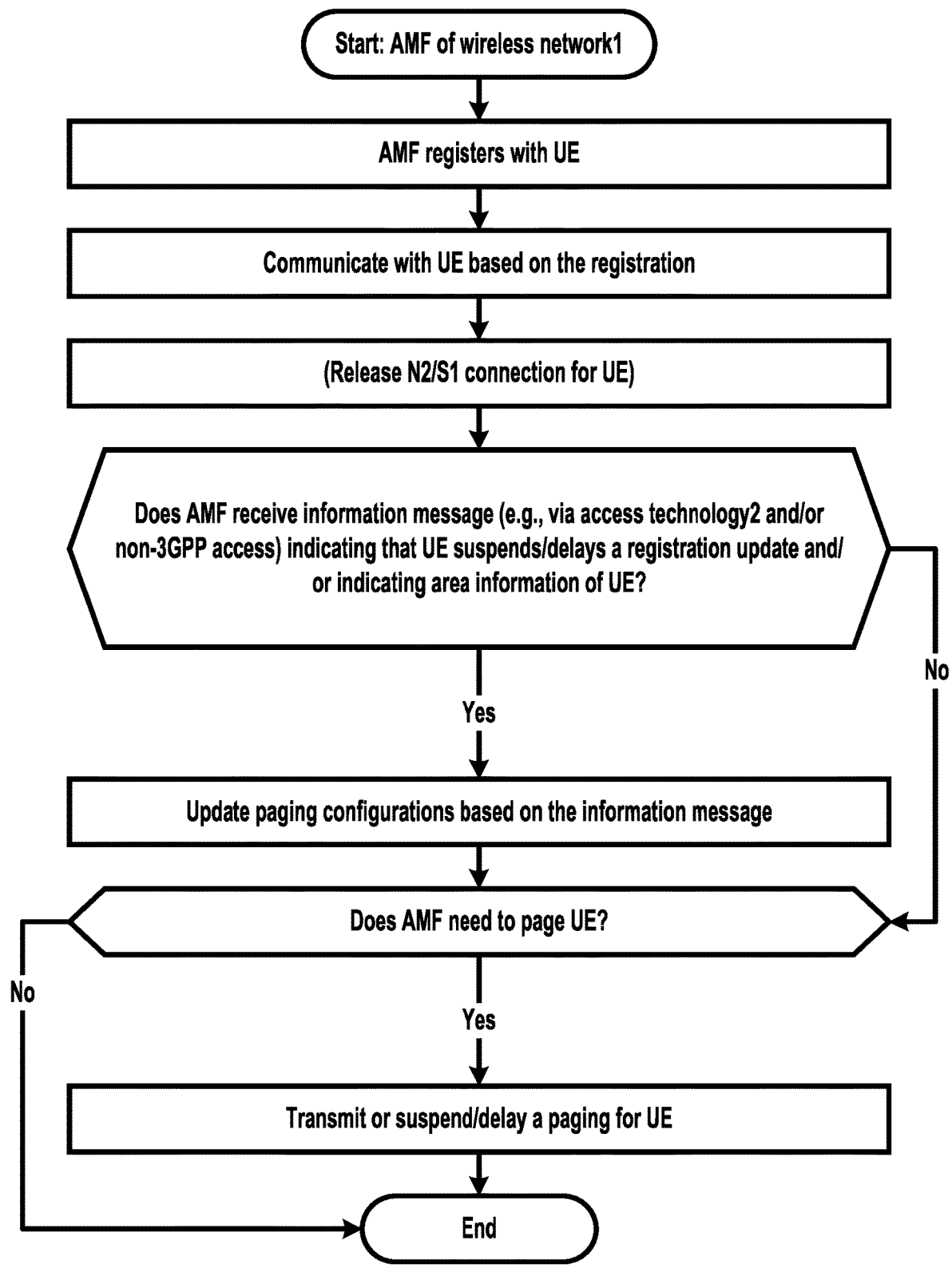
FIG. 34 is an example diagram of an aspect of an embodiment of the present disclosure.

In an example, as shown in FIG. 34, an AMF of the first wireless network may send/transmit, to the wireless device, configuration parameters for the first wireless network. The AMF may receive, from the wireless device (e.g., via a second radio access technology (e.g., non-3GPP access network)), an information message. The information message may comprise area information of the wireless device. The AMF may determine, based on the information message, paging configurations for the wireless device. The AMF may send, to the wireless device, a paging indication based on the paging configurations. In an example, the paging configurations may comprise at least one of: configuring to transmit a paging indication for the wireless device via at least one of: a non-3GPP access node, a WLAN, a N3IWF, and/or a wireless access node (e.g., access point, wireless access point); configuring to suspend/delay/postpone a paging for the wireless device; and/or the like. In an example, the information message may indicate that the wireless device is unreachable via a first radio access technology (e.g., 3GPP access network) for the first wireless network.

In an example, a wireless device may receive an RRC message indicating release of an RRC connection with a first wireless network. The wireless device may determine unavailability of a registration procedure via a first radio access technology of the first wireless network. The wireless device may transmit, to an access node of a second radio access technology and/or based on the determining the unavailability, an information message comprising area information of the wireless device.

In an example, a wireless device may receive an RRC message indicating release of an RRC connection with a first wireless network. The wireless device may determine unavailability of a registration procedure for the first wireless network. The wireless device may transmit/send, to a wireless local area network (WLAN) and/or based on the determining the unavailability, an information message comprising area information of the wireless device.

In an example, a wireless device may receive an RRC message indicating release/suspension of an RRC connection with a first wireless network. The wireless device may determine that the wireless device meets at least one condition for initiation of a registration procedure for the first wireless network. The wireless device may determine unavailability of the initiation of the registration procedure via a first radio access technology. The wireless device may transmit, to an access node of a second radio access technology and/or based on the determining the unavailability, an information message indicating that the wireless device is unreachable via the first radio access technology for the first wireless network.

In an example, a wireless device may receive an RRC message indicating release/suspension of an RRC connection with a first wireless network. The wireless device may determine that the wireless device meets at least one condition for initiation of a registration procedure for the first wireless network. The wireless device may determine unavailability of the initiation of the registration procedure via a first radio access technology. The unavailability may be based on communication with a second wireless network. The wireless device may transmit/send, to an access node of a second radio access technology and based on the determining the unavailability, an information message comprising area information of the wireless device.

In an example, a wireless device may receive, an RRC message indicating release/suspension of an RRC connection with a first wireless network. The wireless device may determine that the wireless device meets at least one condition (e.g., expiration of a periodic registration update timer; a time duration passed since/from a previous (periodic) registration update) for initiation of a registration procedure for the first wireless network. The wireless device may determine unavailability of the initiation of the registration procedure via a first radio access technology. The unavailability may be based on communication with a second wireless network. The wireless device may transmit, to an access node of a second radio access technology and based on the determining the unavailability, an information message indicating that the registration procedure is delayed/postponed/suspended. In an example, the information message may further indicate that the registration procedure is delayed/postponed/suspended based on (e.g., due to) communication with the second wireless network. In an example, the information message may further indicate that the wireless device stays in a tracking area where the wireless device performed a previous registration procedure. The at least one condition may comprise expiration of a timer (e.g., T3512) for a periodic registration update. The at least one condition may comprise that a time duration (e.g., corresponding to the timer, T3512) passes since/from a previous (periodic) registration update.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 36 may be a flow diagram of an aspect of an example embodiment of the present disclosure. At 3610, a wireless device may receive, from a base station, a radio resource control (RRC) message for an RRC connection with a first public land mobile network (PLMN). At 3620, a message may be transmitted to a second PLMN. The message may indicate a state of the RRC connection of the wireless device with the first PLMN.

According to an embodiment, a wireless device may receive, from a base station, a radio resource control (RRC) message for an RRC connection with a first public land mobile network (PLMN). According to an embodiment, a first message may be transmitted to an access and mobility management function (AMF) of a second PLMN via an access point of a wireless local area network. The first message may indicate a state of the RRC connection of the wireless device with the first PLMN. According to an embodiment, transport blocks based on the RRC connection may be transmitted to the base station of the first PLMN.

According to an embodiment, the wireless device may determine that the wireless device transitioned to an inactive state at the first PLMN. The wireless device may transmit to the AMF via a second wireless local area network, a second message may indicate that the wireless device may be in the inactive state at the first PLMN.

According to an embodiment, the second message may comprise a service type information of a service that may be allowable with the second PLMN during the inactive state at the first PLMN. The second message may comprise service type information of a service that the wireless device employs at the first PLMN. The second message may comprise a PLMN identifier may indicate the first PLMN. The second message may comprise a field may indicate that the wireless device employs multiple subscriber identity modules. The second message may comprise information of a band that the wireless device employs for communication with the first PLMN. The second message may comprise information of a band that the wireless device may be available for communication with the second PLMN.

According to an embodiment, the AMF may determine, based on the second message, second paging configurations for the wireless device. The second paging configurations may be for configuring to transmit a paging indication for the wireless device via at least one of: a 3rd generation partnership project access node; a base station; or a next generation node-b. The second paging configurations may be for configuring to transmit a paging for a service of the wireless device. The second paging configurations may be for configuring to transmit a paging indication for a service. The second paging configurations may be for configuring to transmit a paging indication with unincreased repetitions. The second paging configurations may be for configuring to transmit a paging indication with unshifted paging cycle.

According to an embodiment, the wireless device may maintain the RRC connection with the first PLMN during the transmitting the first message. According to an embodiment, the wireless device may not have a second RRC connection with the second PLMN during the transmitting the first message. According to an embodiment, the wireless device may be in an RRC idle state or an RRC inactive state with the second PLMN during the transmitting the first message. According to an embodiment, the access point may be a Wi-Fi access node. According to an embodiment, the access point may be of a non-3GPP network.

According to an embodiment, the wireless device may receive, based on the first message, a paging from an access node of the second PLMN. According to an embodiment, the wireless device may support at least one subscriber identity module (SIM) comprising at least one of: a first SIM for communication with the first PLMN; or a second SIM for communication with a second PLMN.

According to an embodiment, the first PLMN may comprise a first wireless network. The first PLMN may comprise The first PLMN may comprise a first radio access technology. The first PLMN may comprise a first 5th generation wireless network. The first PLMN may comprise a first long-term evolution wireless network. The first PLMN may comprise a first universal mobile telecommunications service wireless network. According to an embodiment, the first message may be for a second PLMN. According to an embodiment, the wireless local area network may be connected to the second PLMN. According to an embodiment, the second PLMN may comprise the wireless local area network.

According to an embodiment, the second PLMN may comprise a second wireless network. The second PLMN may comprise a second radio access technology. The second PLMN may comprise a second 5th generation wireless network. The second PLMN may comprise a second long-term evolution wireless network. The second PLMN may comprise a second universal mobile telecommunications service wireless network. According to an embodiment, the access point may send the first message to the AMF of the second PLMN.

According to an embodiment, the AMF may determine, based on the first message, first paging configurations for the wireless device. The first paging configurations may comprise configuring to transmit a paging indication for the wireless device via at least one of: a wireless local area network; a non-3rd generation partnership project interworking function; or a wireless access node. The first paging configurations may comprise configuring to suspend a paging for a service of the wireless device. The first paging configurations may comprise configuring to transmit a paging indication for a service. The first paging configurations may comprise configuring to transmit a paging indication with increased repetitions. The first paging configurations may comprise configuring to transmit a paging indication with shifted a paging cycle.

According to an embodiment, the first message may comprise a non-access stratum message for the second PLMN. According to an embodiment, a paging indication based on the first message may be received from the second PLMN. According to an embodiment, the wireless device may receive the paging indication via at least one of: the access point of the wireless local area network; or a second base station of the second PLMN.

According to an embodiment, the first message may comprise service type information of a service that may be allowable with the second PLMN during an active state at the first PLMN. The first message may comprise service type information of a service that the wireless device employs at the first PLMN. The first message may comprise a PLMN identifier may indicate the first PLMN. The first message may comprise a field may indicate that the wireless device employs multiple subscriber identity modules. The first message may comprise information of a band that the wireless device employs for communication with the first PLMN. The first message may comprise information of a band that the wireless device may be available for communication with the second PLMN during the active state at the first PLMN.

According to an embodiment, the active state may comprise an RRC connected state. The active state may comprise an on-duration of a discontinuous reception (DRX). The active state may comprise an on-duration of a power saving mode. The active state may comprise a time duration that a measurement gap may not be configured. The active state may comprise a time duration that the wireless device employs a service. The active state may comprise an activation state of a first cell. According to an embodiment, the transport blocks may be associated with at least one of: a signaling radio bearer; or a data radio bearer. According to an embodiment, the wireless device may determine, the transitioning to an inactive state is based on at least one of: receiving an RRC release message may indicate release or suspension of the RRC connection with the first PLMN; transitioning to a time duration that a discontinuous reception (DRX) may be operating; transitioning to an off-duration of a DRX when the wireless device employs the DRX; transitioning to an off-duration of a power saving mode; transitioning to a time duration that a measurement gap may be configured; stopping employing a service; transitioning a first cell to a deactivation state; transitioning a first cell to a dormant state; or stopping employing a first cell. According to an embodiment, the wireless device, based on the receiving the RRC release message, may transition to at least one of: an RRC idle state at the first PLMN; or an RRC inactive state at the first PLMN. According to an embodiment, the radio resource control message may comprise an RRC setup message; an RRC resume message; an RRC reestablishment message; or an RRC reconfiguration message.

FIG. 37 may be a flow diagram of an aspect of an example embodiment of the present disclosure. At 3710, a wireless device may receive, from a base station, a radio resource control (RRC) message for an RRC connection with a first public land mobile network (PLMN). At 3720, wireless device may transmit to a second PLMN, a message indicating a state of the RRC connection of the wireless device with the first PLMN.

According to an embodiment, a wireless device may receive, from a base station, a radio resource control (RRC) message for an RRC connection with a first public land mobile network (PLMN. The wireless device may transmit, to a second PLMN and via an access point of a wireless local area network, a message may indicate a state of the RRC connection of the wireless device with the first PLMN. According to an embodiment, the RRC message may indicate at least one of: an establishment of the RRC connection; a reconfiguration of the RRC connection; a resume of the RRC connection; or a release of the RRC connection. According to an embodiment, the RRC message may indicate at least one of: parameters of a discontinuous reception (DRX); parameters of a power saving mode; or parameters of a cell. According to an embodiment, the state of the RRC connection may comprise: an active state; or an inactive state. According to an embodiment, the state of the RRC connection may comprise: an RRC connected state; an RRC idle state; or an RRC inactive state. According to an embodiment, the state of the RRC connection may comprise: an on-duration of a discontinuous reception (DRX); an on-duration of a power saving mode; a time duration that a measurement gap may not be configured; a time duration that the wireless device employs a service; or an activation state of a first cell. According to an embodiment, the state of the RRC connection may comprise: an off-duration of a discontinuous reception (DRX); an off-duration of a power saving mode; a time duration that a measurement gap may be configured; a time duration that the wireless device does not employs a service; a deactivation state of a first cell; or a dormant state of a first cell.

According to an embodiment, the wireless device may receive from the second PLMN, a paging indication based on the message may indicate the state of the RRC connection. According to an embodiment, the transmitting the message to the second PLMN may comprise transmitting the message to an access and mobility management function (AMF) of the second PLMN. According to an embodiment, transport blocks based on the RRC connection may be transmitted to the base station of the first PLMN.

According to an embodiment, a wireless device may receive, from a base station, a radio resource control (RRC) message for an RRC connection with a first public land mobile network (PLMN). A message may be transmitted to an access point of a wireless local area network associated with a second PLMN. The message may indicate a state of the RRC connection of the wireless device with the first PLMN. Transport blocks based on the RRC connection may be transmitted to the base station of the first PLMN.

According to an embodiment, a wireless device may receive, from a base station, a radio resource control (RRC) message to establish an RRC connection with a first public land mobile network (PLMN). Based on the RRC message, the RRC connection with the first PLMN may be established. A message may be transmitted to an access point of a wireless local area network associated with a second PLMN. The message may indicate the establishment of the RRC connection of the wireless device with the first PLMN.

According to an embodiment, a wireless device may receive, from a base station, a radio resource control (RRC) message to release an RRC connection with a first public land mobile network (PLMN). Based on the RRC message, the RRC connection with the first PLMN may be released. A message may be transmitted to an access point of a wireless local area network associated with a second PLMN. The message may indicate the release of the RRC connection of the wireless device with the first PLMN.

According to an embodiment, a wireless device may transmit a radio resource control message for a radio resource control connection with a first wireless network. The wireless device may transmit, to a first access node of a first wireless local area network and based on the radio resource control connection, a first information message indicating that the wireless device may be in an active state at the first wireless network. Transport blocks based on the radio resource control connection may be transmitted to the first wireless network.

According to an embodiment, a wireless device may transmit a radio resource control message for a radio resource control connection with a first wireless network. The wireless device may determine to transition, based on the radio resource control connection, to an inactive state at the first wireless network. A second information message may be transmitted to a second access node of a second wireless local area network, based on the determining. The second information message may indicate that the wireless device may be in the inactive state at the first wireless network.

According to an embodiment, an access and mobility management function (AMF) of a second wireless network may transmit to a wireless device, configuration parameters for the second wireless network. A first information message may be received from the wireless device. The first information message may indicate that the wireless device may be in an active state at a first wireless network. The AMF may determine, based on the first information message, first paging configurations for the wireless device. The AMF may transmit a first paging indication for the wireless device based on the first paging configurations. a second information message may be received from the wireless device. The second information message may indicate that the wireless device may be in an inactive state at the first wireless network. The AMF may determine, based on the second information message, second paging configurations for the wireless device. The AMF may transmit a second paging indication for the wireless device based on the second paging configurations.

According to an embodiment, the AMF may receive the first information message via a first access node of a first wireless local area network. According to an embodiment, the first paging configurations may be for configuring to transmit a paging indication for the wireless device via at least one of: a wireless local area network; a non-3rd generation partnership project interworking function; or a wireless access node. The first paging configurations may be for configuring to suspend a paging for a service of the wireless device. The first paging configurations may be for configuring to transmit a paging indication for a service. The first paging configurations may be for configuring to transmit a paging indication with increased repetitions. The first paging configurations may be for configuring to transmit a paging indication with shifted a paging cycle.

According to an embodiment, the second paging configurations may be for configuring to transmit a paging indication for the wireless device via at least one of: a 3rd generation partnership project access node; a base station; or a next generation node-b. The second paging configurations may be for configuring to transmit a paging for a service. The second paging configurations may be for configuring to transmit a paging indication for a service. The second paging configurations may be for configuring to transmit a paging indication with unincreased repetitions. The second paging configurations may be for configuring to transmit a paging indication with unshifted paging cycle.

According to an embodiment, the AMF may transmit the first paging indication or the second paging indication based on determining to transmit signal for the wireless device, wherein the signal may comprise a control plane signal; or a user plane signal. The AMF may transmit the first paging indication or the second paging indication based on updating the configuration parameters for the second wireless network. The AMF may transmit the first paging indication or the second paging indication based on receiving, from a session management function, a data notification for the wireless device.

According to an embodiment, a wireless device may receive, from a first base station, a first radio resource control (RRC) message may indicate release of a first RRC connection with a first public land mobile network (PLMN). The wireless device may receive from a second base station, a second RRC message for a second RRC connection with a second PLMN. The wireless device may determine that at least one condition for initiation of an area update procedure for the first PLMN may be met. A message may be transmitted to an access and mobility management function (AMF) of the first PLMN via an access point of a wireless local area network. The message may comprise area information of the wireless device. According to an embodiment, the wireless device may determine unavailability of the initiation of the area update procedure via a 3GPP network. According to an embodiment, the determining the unavailability may be based on at least one of: a reference signal received power of the first PLMN being smaller than a power value; or the wireless device locates in a coverage hole of the first PLMN. According to an embodiment, the determining the unavailability may be based on communication with the second PLMN. According to an embodiment, the determining the unavailability may be based on a frequency of a first cell of the first PLMN being unavailable during communicating with a second cell of the second PLMN. The second cell may employ a second frequency that is: overlapping with the frequency of the first cell; or belonging to the same band combination group associated with the frequency of the first cell. According to an embodiment, the determining the unavailability may be based on at least one of: the wireless device may be in an RRC connected state at the second PLMN; the wireless device may be in an active state at the second PLMN; the wireless device communicates with the second PLMN; the wireless device transmits transport blocks to the second PLMN; or the wireless device receives one or more signal from the second PLMN. According to an embodiment, the determining the unavailability may be based on an active state of the wireless device at the second PLMN, the active state comprising at least one of: an RRC connected state; a time duration that a discontinuous reception (DRX) may be not operating; an on-duration of a DRX when the wireless device employs the DRX; an on-duration of a power saving mode; a time duration that a measurement gap may be not configured or may be released; a time duration that the wireless device employs a service; an activation state of a first cell; or a time duration of that the wireless device employs a first cell.

According to an embodiment, the wireless device may maintain the second RRC connection with the second PLMN during the transmitting the message. According to an embodiment, the wireless device may not have the first RRC connection with the first PLMN during the transmitting the message. According to an embodiment, the wireless device may be in an RRC idle state or an RRC inactive state with the first PLMN during the transmitting the message. According to an embodiment, the access point may be a Wi-Fi access node. According to an embodiment, the access point may be of a non-3GPP access network. According to an embodiment, based on the message, a paging from an access node of the first PLMN may be received.

According to an embodiment, the wireless device may support at least one subscriber identity module (SIM) comprising at least one of: a first SIM for communication with the first PLMN; or a second SIM for communication with the second PLMN. According to an embodiment, the first PLMN may comprise: a first wireless network; a first access technology; a first 5th generation wireless network; a first long-term evolution wireless network; or a first universal mobile telecommunications service wireless network. According to an embodiment, the first PLMN may comprise: a first radio access technology associated with a 3GPP access network; or a second radio access technology associated with the wireless local area network. According to an embodiment, the at least one condition may comprise: the wireless device detects entering a tracking area that may not be in a list of tracking areas that the wireless device previously registered in the AMF; a periodic tracking area update timer expires; a periodic registration updating timer expires; the wireless device detects entering a radio access network (RAN) area that may not be in a list of RAN areas of the first PLMN; or a periodic RAN area updating timer expires. According to an embodiment, the area update procedure may comprise: a tracking area update; a radio access network area update; or a registration area update. According to an embodiment, the second PLMN may comprise: a second wireless network; a second access technology; a second 5th generation wireless network; a second long-term evolution wireless network; or a second universal mobile telecommunications service wireless network. According to an embodiment, the second RRC message may comprise: an RRC setup message; an RRC resume message; an RRC reestablishment message; or an RRC reconfiguration message. According to an embodiment, the initiation of the area update procedure may comprise performing a random access process comprising transmitting a random access preamble to a base station of the first PLMN. The initiation of the area update procedure may comprise transmitting an RRC message comprising at least one of: an identifier of the wireless device; an RRC resume request message; or an RRC request message; or a non-access stratum message.

According to an embodiment, a first radio access technology of the first base station may comprise: a 3rd generation partnership project access network; a base station of the first PLMN; a next generation nodeb (gNB) of the first PLMN; or an evolved nodeb (eNB) of the first PLMN. According to an embodiment, the access point may comprise: a wireless access point; a Wi-Fi router; or a non-3GPP access node.

According to an embodiment, the message may comprise: a non-access stratum message; or an identifier of the wireless device. According to an embodiment, the message indicates at least one of: a registration update may be suspended; a tracking area update may be suspended; a radio access network area update may be suspended; a random access to the first PLMN was failed; or a registration update for the first PLMN was failed. According to an embodiment, the message may comprise: information of a band that the wireless device may be able to monitor; information of a band that the wireless device may be not able to monitor; or information of a band that the wireless device monitors. According to an embodiment, the message may comprise at least one of: a public land mobile network (PLMN) identifier may indicate the second PLMN that the wireless device communicates with; a field may indicate that the wireless device employs multiple subscriber identity modules; information of a frequency that the wireless device employs for communication with a second PLMN; or information of a frequency that the wireless device may be available for communication with the first PLMN during communicating with the second PLMN. According to an embodiment, the message may indicate that the area update procedure for the first PLMN may be suspended due to a frequency of a first cell of the first PLMN may be unavailable during communicating with the second PLMN. According to an embodiment, the message may indicate at least one of: the wireless device may be unreachable via a first radio access technology for the first PLMN; the wireless device may be in a first tracking area; the wireless device may be in a coverage of a first cell; the wireless device camps on a first cell; the wireless device monitors a first cell; or the wireless device may be in a first radio access network (RAN) area. According to an embodiment, the message may further indicates at least one of: the wireless device may be out of a second tracking area; the wireless device may be out of a service coverage of the first PLMN; a received power from the first PLMN may be smaller than a power value; a received quality from the first PLMN may be smaller than a quality value; the wireless device may be at an unallowed area; or the wireless device may be out of a second radio access network (RAN) area.

According to an embodiment, the access point may send, the message to the AMF of the first PLMN. According to an embodiment, the AMF may determine, based on the message, paging configurations for the wireless device. The paging configurations may comprise configuring to transmit a paging indication for the wireless device via at least one of: a non-3rd generation partnership project access node; a wireless local area network; a non-3rd generation partnership project interworking function; or a wireless access node. The paging configurations may comprise configuring to suspend a paging for the wireless device.

According to an embodiment, the access point may send the message to a non-3GPP interworking function (N3IWF); and the N3IWF may send the message to the AMF of the first PLMN.

According to an embodiment, the wireless device may receive from the first PLMN, a paging indication based on the message via non-3GPP network.

According to an embodiment, the wireless device may receive the paging indication via an access point of a wireless local area network.

According to an embodiment, the wireless device may perform, via a base station of the first PLMN, the area update procedure for the first PLMN based on transitioning to an inactive state at the second PLMN. The transitioning to the inactive state may be based on receiving an RRC release message may indicate release or suspension of the RRC connection with the second PLMN. The transitioning to the inactive state may be based on transitioning to a time duration that a discontinuous reception (DRX) may be operating at the second PLMN. The transitioning to the inactive state may be based on transitioning to an off-duration of a DRX when the wireless device employs the DRX at the second PLMN. The transitioning to the inactive state may be based on transitioning to an off-duration of a power saving mode at the second PLMN. The transitioning to the inactive state may be based on transitioning to a time duration that a measurement gap may be configured at the second PLMN. The transitioning to the inactive state may be based on stopping employing a service at the second PLMN. The transitioning to the inactive state may be based on transitioning a second cell to a deactivation state at the second PLMN. The transitioning to the inactive state may be based on transitioning a second cell to a dormant state at the second PLMN. The transitioning to the inactive state may be based on stopping employing a second cell at the second PLMN. According to an embodiment, based on the receiving the RRC release message, the wireless device may transition to at least one of: an RRC idle state at the second PLMN; or an RRC inactive state at the second PLMN.

According to an embodiment, a wireless device may receive a radio resource control message indicating release of a radio resource control connection with a public land mobile network (PLMN). Area information of a cell of the base station may be received from a base station of the PLMN. A message comprising the area information of the wireless device may be transmitted to an access point of a wireless local area network. According to an embodiment, the area information may comprise: tracking area information; radio access network area information; or registration area information. According to an embodiment, the receiving the area information may comprise receiving a system information block comprising the area information. According to an embodiment, the transmitting the message to the access point may be for transmitting the message to an access and mobility management function of the PLMN via the access point. According to an embodiment, unavailability of an area update procedure may be determined via the cell of the base station.

According to an embodiment, a wireless device may receive a radio resource control message indicating release of a radio resource control connection with a first public land mobile network (PLMN). A first tracking area information may be received from a first base station of the first PLMN. A second tracking area information may be received from a second base station of the first PLMN. Based on the first tracking area information and the second tracking area information, the wireless device may transmit, to an access and mobility management function via an access point of a wireless local area network, a tracking area update message comprising the second tracking area information of the wireless device.

According to an embodiment, a wireless device may receive a radio resource control message indicating release of a radio resource control connection with a public land mobile network (PLMN). A tracking area update message may be transmitted to an access and mobility management function via an access point of a wireless local area network. The tracking area update message may comprise tracking area information of the wireless device.

According to an embodiment, an access and mobility management function (AMF) of a first wireless network may send, to a wireless device, configuration parameters for the first wireless network. An information message may be received from the wireless device via a second radio access technology. The information message may comprise area information of the wireless device. Paging configurations for the wireless device may be determined based on the information message. A paging indication based on the paging configurations may be sent to the wireless device. According to an embodiment, the paging configurations may be for configuring to transmit a paging indication for the wireless device via at least one of: a non-3rd generation partnership project access node; a wireless local area network; a non-3rd generation partnership project interworking function; or a wireless access node. The paging configurations may be for configuring to suspend a paging for the wireless device. According to an embodiment, the information message may indicate that the wireless device may be unreachable via a first radio access technology for the first wireless network. According to an embodiment, the area information may comprise: tracking area information; radio access network area information; or registration area information. According to an embodiment, the second radio access technology may comprise a wireless local area network.

According to an embodiment, a wireless device may receive, a radio resource control message indicating release of a radio resource control connection with a first wireless network. The wireless device may determine unavailability of an area update procedure via a first radio access technology of the first wireless network. An information message comprising area information of the wireless device may be transmitted to an access node of a second radio access technology based on the determining the unavailability.

According to an embodiment, the information message may indicate at least one of: that the wireless device may be unreachable via the first radio access technology for the first wireless network; that the wireless device may be unreachable via the first radio access technology for the first wireless network due to communication with a second wireless network; that the area update procedure may be suspended; or that the wireless device stays in a tracking area where the wireless device performed a previous area update procedure. According to an embodiment, the unavailability may be based on communication with a second wireless network.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A wireless device comprising:
one or more processors; and
memory storing instructions that, when executed by the one or more processors, cause the wireless device to:
receive, from a base station, a first message for communicating with a first public land mobile network (PLMN); and
transmit, to a second PLMN, a second message indicating a bandwidth for communicating with a second PLMN while communicating with the first PLMN.

2. The wireless device of claim 1, wherein the second message further indicates a second bandwidth is unavailable.

3. The wireless device of claim 2, wherein the wireless device communicates with the first PLMN via the second bandwidth.

4. The wireless device of claim 1, wherein the second message further indicates a bandwidth combination is unavailable.

5. The wireless device of claim 1, wherein the second message further indicates that the wireless device comprises at least one subscriber identity module (SIM) for communicating with the first PLMN and the second PLMN.

6. The wireless device of claim 1, wherein the second message further indicates that the wireless device is in a restricted service area.

7. The wireless device of claim 1, wherein the first PLMN comprises the base station.

8. The wireless device of claim 1, wherein the second message further indicates an identifier of the first PLMN.

9. A base station of a second public land mobile network (PLMN) comprising:
one or more processors; and
memory storing instructions that, when executed by one or more processors, cause the base station of the second PLMN to:
receive, from a wireless device, a second message indicating a bandwidth for communicating with the wireless device while the wireless device communicates with a first PLMN.

10. The base station of the second PLMN of claim 9, wherein the second message further indicates a second bandwidth is unavailable.

11. The base station of the second PLMN of claim 10, wherein the wireless device communicates with the first PLMN via the second bandwidth.

12. The base station of the second PLMN of claim 9, wherein the second message further indicates a bandwidth combination is unavailable.

13. The base station of the second PLMN of claim 9, wherein the second message further indicates that the wireless device comprises at least one subscriber identity module (SIM) for communicating with the first PLMN and the second PLMN.

14. The base station of the second PLMN of claim 9, wherein the second message further indicates that the wireless device is in a restricted service area.

15. The base station of the second PLMN of claim 9, wherein the second message further indicates an identifier of the first PLMN.

16. A non-transitory computer-readable medium comprising instructions that, when executed by one or more processors of a wireless device, cause the wireless device to:
receive, from a base station, a first message for communicating with a first public land mobile network (PLMN); and
transmit, to a second PLMN, a second message indicating a bandwidth for communicating with a second PLMN while communicating with the first PLMN.

17. The non-transitory computer-readable medium of claim 16, wherein the second message further indicates a second bandwidth is unavailable.

18. The non-transitory computer-readable medium of claim 17, wherein the wireless device communicates with the first PLMN via the second bandwidth.

19. The non-transitory computer-readable medium of claim 16, wherein the second message further indicates a bandwidth combination is unavailable.

20. The non-transitory computer-readable medium of claim 16, wherein the second message further indicates that the wireless device comprises at least one subscriber identity module (SIM) for communicating with the first PLMN and the second PLMN.

* * * * *